United States Patent
Bandara et al.

(10) Patent No.: US 12,085,917 B2
(45) Date of Patent: *Sep. 10, 2024

(54) GENERATIVE DESIGN SHAPE OPTIMIZATION WITH SINGULARITIES AND DISCONNECTION PREVENTION FOR COMPUTER AIDED DESIGN AND MANUFACTURING

(71) Applicant: Autodesk, Inc., San Francisco, CA (US)

(72) Inventors: Konara Mudiyanselage Kosala Bandara, Beckenham (GB); Anthony Christopher Kipkirui Yegon Ruto, Basingstoke (GB); Nigel Jed Wesley Morris, Toronto (CA); Andrew Gareth Lewis Jones, Bristol (GB)

(73) Assignee: Autodesk, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,218

(22) Filed: Apr. 28, 2023

(65) Prior Publication Data

US 2023/0324882 A1    Oct. 12, 2023

Related U.S. Application Data

(63) Continuation of application No. 17/346,154, filed on Jun. 11, 2021, now Pat. No. 11,675,333.
(Continued)

(51) Int. Cl.
*G05B 19/4099*   (2006.01)
*B22F 10/80*     (2021.01)
(Continued)

(52) U.S. Cl.
CPC .......... *G05B 19/4099* (2013.01); *B22F 10/80* (2021.01); *B33Y 50/00* (2014.12);
(Continued)

(58) Field of Classification Search
CPC ................ G05B 19/4099; G05B 19/41; G05B 2219/35134; G05B 2219/49023;
(Continued)

(56) References Cited

U.S. PATENT DOCUMENTS 7,068,851 B1 *   6/2006   Berkner ................... G06T 5/75
                                                         382/265
7,451,013 B2    11/2008   Coleman et al.
(Continued)

FOREIGN PATENT DOCUMENTS

CN    103294843    9/2013
CN    107748916    3/2018
(Continued)

OTHER PUBLICATIONS

Wikipedia.org [online], "PID Controller," published on Sep. 28, 2019, [retrieved on Sep. 30, 2019], retrieved from URL<https://en.wikipedia.org/w/index.php?title=PID_Controller&oldid=918304036 >, 22 pages.
(Continued)

*Primary Examiner* — Chun Cao
*Assistant Examiner* — Michael Tang
(74) *Attorney, Agent, or Firm* — Fish & Richardson P.C.

(57) ABSTRACT

Methods, systems, and apparatus, including medium-encoded computer program products, for computer aided design of physical structures using generative design processes. A method includes obtaining one or more load cases and one or more design criteria for a modeled object; iteratively modifying a three dimensional shape of the modeled object in accordance with the one or more design
(Continued)

criteria and the one or more load cases, the iteratively modifying comprising regulating shape change velocities for an implicit surface representation of the three dimensional shape that exceed a reference velocity, where the reference velocity is set based on a mean and a standard deviation of a shape derivative on the implicit surface; and providing the three dimensional shape of the modeled object for use in manufacturing a physical structure corresponding to the modeled object using one or more computer-controlled manufacturing systems.

36 Claims, 25 Drawing Sheets

Related U.S. Application Data

(60) Provisional application No. 63/044,651, filed on Jun. 26, 2020.

(51) Int. Cl.
*B33Y 50/00* (2015.01)
*G05B 19/41* (2006.01)
*G06F 30/10* (2020.01)
G06F 111/10 (2020.01)
G06F 119/18 (2020.01)

(52) U.S. Cl.
CPC ............ *G05B 19/41* (2013.01); *G06F 30/10* (2020.01); *G05B 2219/35134* (2013.01); *G05B 2219/49023* (2013.01); *G06F 2111/10* (2020.01); *G06F 2119/18* (2020.01)

(58) Field of Classification Search
CPC ......... B22F 10/80; B33Y 50/00; G06F 30/10; G06F 2111/10; G06F 2119/18; Y02P 10/25; Y02P 80/40; B29C 64/386
USPC ........................................... 700/98; 703/1, 2
See application file for complete search history.

(56) References Cited

U.S. PATENT DOCUMENTS

| 9,370,609 | B2 | 6/2016 | Grohowski, Jr. |
| 10,467,807 | B1 | 11/2019 | Strater et al. |
| 10,635,088 | B1 | 4/2020 | Bandara et al. |
| 11,321,508 | B2 | 5/2022 | Harris et al. |
| 11,663,379 | B2 | 5/2023 | Harris et al. |
| 11,669,660 | B2 | 6/2023 | Schmidt et al. |
| 2004/0024472 | A1 | 2/2004 | Evans et al. |
| 2007/0047810 | A1 | 3/2007 | Grady |
| 2008/0015827 | A1 | 1/2008 | Tryon et al. |
| 2009/0161724 | A1 | 6/2009 | Timans |
| 2010/0185312 | A1 | 7/2010 | Wang et al. |
| 2010/0292966 | A1 | 11/2010 | Wang et al. |
| 2012/0059637 | A1 | 3/2012 | Yu |
| 2013/0063512 | A1 | 3/2013 | Takagi et al. |
| 2013/0124149 | A1 | 5/2013 | Carr et al. |
| 2014/0156229 | A1 | 6/2014 | Norato et al. |
| 2015/0190971 | A1 | 7/2015 | Musuvathy et al. |
| 2016/0034621 | A1 | 2/2016 | Huang |
| 2017/0024910 | A1 | 1/2017 | Griffin et al. |
| 2017/0348901 | A1 | 12/2017 | Hara et al. |
| 2018/0032060 | A1 | 2/2018 | Zeng et al. |
| 2018/0046732 | A1 | 2/2018 | Bergin et al. |
| 2018/0079149 | A1 | 3/2018 | Suresh et al. |
| 2018/0345647 | A1 | 12/2018 | Morris et al. |
| 2018/0349531 | A1 | 12/2018 | Morris et al. |
| 2019/0366703 | A1* | 12/2019 | Bächer ................ B22F 3/1103 |
| 2020/0015128 | A1 | 1/2020 | Stojanovski et al. |
| 2020/0089826 | A1 | 3/2020 | Liu et al. |
| 2020/0134918 | A1 | 4/2020 | Wang |
| 2020/0150623 | A1 | 5/2020 | Bandara et al. |
| 2020/0151286 | A1 | 5/2020 | Willis et al. |
| 2020/0376552 | A1 | 12/2020 | Fukuda et al. |
| 2021/0232120 | A1 | 7/2021 | Marinov et al. |
| 2021/0350036 | A1 | 11/2021 | Burla et al. |
| 2021/0365004 | A1 | 11/2021 | Weinberg et al. |
| 2021/0365007 | A1 | 11/2021 | Kim et al. |
| 2022/0004678 | A1 | 1/2022 | Harris et al. |
| 2022/0004679 | A1 | 1/2022 | Harris et al. |
| 2022/0004682 | A1 | 1/2022 | Bandara et al. |
| 2022/0091580 | A1 | 3/2022 | Bandara et al. |
| 2022/0237344 | A1 | 7/2022 | Harris et al. |
| 2023/0145217 | A1 | 5/2023 | Harris et al. |
| 2023/0325555 | A1 | 10/2023 | Harris et al. |

FOREIGN PATENT DOCUMENTS

| CN | 107145663 | 3/2020 |
| CN | 110992356 | 4/2020 |
| CN | 111144038 | 5/2020 |
| CN | 111259255 | 6/2020 |
| CN | 111274730 | 6/2020 |
| EP | 2778992 | 9/2014 |
| JP | 2018167565 | 11/2018 |
| KR | 1020160012996 | 2/2016 |
| WO | WO2016141474 | 9/2016 |
| WO | WO2017186786 | 4/2017 |
| WO | WO2020097216 | 5/2020 |

OTHER PUBLICATIONS

Xia et al., "A Level Set Based Method for the Optimization of Cast Part," Struct. Multidisc. Optim. (2010) 41:735-747.
Covarrubias et al., "Effect of Build Angle on Surface Properties of Nickel Superalloys Processed by Selective Laser Melting", Journal of Metals, Dec. 2017, 70(3):336-342.
Dzugan et al., "Effects of thickness and orientation on the small scale fracture behaviour of additively manufactured Ti-6A1-4V," Materials Characterization, Apr. 2018. 143:94-109.
Garland et al., "Multi-Objective Optimal Design of Functionally Gradient Materials," In International Design Engineering Technical Conferences and Computers and Information in Engineering Conference, Aug. 21, 2016, 50107:V02AT03A026, American Society of Mechanical Engineers, 11 pages.
Reddy et al., "Application of topology optimization and design for additive manufacturing guidelines on an automotive component," In International Design Engineering Technical Conferences and Computers and Information in Engineering Conference, Aug. 21, 2016, 50107:V02, 10 pages.
Ulu et al., "Enhancing the structural performance of additively manufactured objects through build orientation optimization," Journal of Mechanical Design, Nov. 2015, 137(11):12 pages.
Ulu et al., "Enhancing the Structural Performance of Additively Manufactured Objects", arXiv:1811.00548v1, Nov. 2018, 104 pages.
Wilczynski et al., "Optimal design of machine components using notch correction and plasticity models," Computers and Structures, Jul. 2007, 85(17-18):1382-1398.
Zhou et al., "Anisotropic Multicomponent Topology Optimization for Additive Manufacturing with Build Orientation Design and Stress-Constrained Interfaces", arXiv:1911.10393v1, Nov. 2019, 13 pages.
U.S. Appl. No. 62/758,053, filed Nov. 9, 2018, Marinov et al..
Arisoy et al., "Design and Topology Optimization of Lattice Structures Using Deformable Implicit Surfaces for Additive Manufacturing," in ASME 2015 International Design Engineering Technical Conferences and Computers and Information in Engineering Conference (2015) 11 pages.
Arrieta et al., "Optimal design of aircraft structures with damage tolerance requirements," Structural and Multidisciplinary Optimization, Aug. 2005, 30(2):155-163.
Brackett et al., "Topology Optimization for Additive Manufacturing," in Proceedings of the Solid Freeform Fabrication Symposium (2011) 15 pages.

(56) References Cited

OTHER PUBLICATIONS

Dakshnamoorthy, "Automated Lattice Optimization of Hinge Fitting with Displacement Constraint," Thesis for Master of Science in Mechanical Engineering, The University of Texas at Arlington, Dec. 2016, 57 pages.
Dapongy et al., "Geometric Constraints for Shape and Topology Optimization in Architectural Design," Computational Mechanics, 2017, 59(6):933-965.
Emmendoerfer, et al., "A level set approach for topology optimization with local stress constraints," Int. J. Numer. Meth. Engng 2014; 99:129-156 (Year: 2014).
Gibou et al., "A Review of Level-set Methods and Some Recent Applications," Journal of Computational Physics (2018) 353:82-109.
Gournay, et al., "Shape and Topology Optimization of The Robust Compliance Via the Level Set Method," ESAIM: COCV vol. 14, No. 1, 2008, pp. 43-70 (Year: 2008).
Guest and Zhu, "Casting and Milling Restrictions in Topology Optimization via Projection-based Algorithms," in ASME 2012 International Design Engineering Technical Conferences and Computers and Information in Engineering Conference (2012) 8 pages.
Hoglund, "An Anisotropic Topology Optimization Method for Carbon Fiber-Reinforced Fused Filament Fabrication," Thesis for Master of Science in Mechanical Engineering, Baylor University, Aug. 2016, 182 pages.
Ikeya and Shimoda, "Multi-objective Free-form Optimization for Shape and Thickness of Shell Structures with Composite Materials," in 11th World Congress on Structural and Multidisciplinary Optimisation (2015) 6 pages.
James, et al., "Stress-based topology optimization using an isoparametric level set method," Finite elements in Analysis and Design 58 (2012) 20-30 (Year: 2012).
Joshi et al., "CAD-integrated Topology Optimization (BGCE Honours Project)," Department of Informatics, Technical University of Munich (2016) 77 pages.

Langelaar, "Topology Optimization for Multi-axis Machining," Comput. Methods Appl. Mech. Engrg. (2019) 351:226-252.
Liu and Ma, "A Survey of Manufacturing Oriented Topology Optimization Methods," Advances in Engineering Software (2016) 100:161-175.
Liu et al., "Current and Future Trends in Topology Optimization for Additive Manufacturing," Structural and Multidisciplinary Optimization (2018) 57:2457-2483.
Lu et al., "Build-to-Last: Strength to Weight 3D Printed Objects," ACM Trans. Graph. (2014) 33(4):97:1-97:10.
Nakayama and Shimoda, "Shape-topology Optimization for Designing Shell Structures," in VII European Congress on Computational Methods in Applied Sciences and Engineering (2016) 10 pages.
Novotny, et al., "Topological Sensitivity Analysis for Three-dimensional Linear Elasticity Problem," Comput. Methods Appl. Mech. Engrg. 196 (2007) 4354-4364 (Year: 2007).
Shapes and Geometries: Metrics, Analysis, Differential Calculus and Optimization, 2nd ed., Delfour et al., 2011, Chapter 1, Sections 10-11, pp. 36-54.
Shapes and Geometries: Metrics, Analysis, Differential Calculus and Optimization, 2nd ed., Delfour et al., 2011, Chapters 9-10, pp. 457-570.
Sigmund and Maute, "Topology Optimization Approaches—a Comparative Review," Struct. Multidisc. Optim. (2013) 48:1031-1055.
Unknown author, "Topology Optimization R18.0 Feature and Usage Highlights," @ 2016 ANSYS, Inc., Mar. 12, 2017, 29 pages.
Van Dijk et al., "Level-set Methods for Structural Topology Optimization: a Review," Struct. Multidisc. Optim. (2013) 48:437-472.
Vatanabe et al., "Topology Optimization with Manufacturing Constraints: a Unified Projection-based Approach," Advances in Engineering Software (2016) 100:97-112.
Wikipedia.org [online], "Dirichlet Boundary Condition," published on Sep. 4, 2019 [retrieved on Feb. 11, 2020], retrieved from URL<https://en.wikipedia.org/wiki/dirichlet_boundary_condition>, 2 pages.

* cited by examiner

0th iso-contour

GENERATIVE DESIGN SHAPE OPTIMIZATION WITH SINGULARITIES AND DISCONNECTION PREVENTION FOR COMPUTER AIDED DESIGN AND MANUFACTURING

CROSS-REFERENCE TO RELATED APPLICATIONS

This is a continuation of U.S. application Ser. No. 17/346,154, filed on Jun. 11, 2021, and titled "GENERATIVE DESIGN SHAPE OPTIMIZATION WITH SINGULARITIES AND DISCONNECTION PREVENTION FOR COMPUTER AIDED DESIGN AND MANUFACTURING," which claims priority to U.S. Provisional Application No. 63/044,651, filed on Jun. 26, 2020, and titled "GENERATIVE DESIGN SHAPE OPTIMIZATION WITH SINGULARITIES AND DISCONNECTION PREVENTION FOR COMPUTER AIDED DESIGN AND MANUFACTURING." The disclosures of the prior applications are considered part of and are incorporated by reference in the disclosure of this application.

BACKGROUND

This specification relates to computer aided design of physical structures, which can be manufactured using additive manufacturing, subtractive manufacturing and/or other manufacturing systems and techniques.

Computer Aided Design (CAD) software has been developed and used to generate three-dimensional (3D) representations of objects, and Computer Aided Manufacturing (CAM) software has been developed and used to evaluate, plan and control the manufacture of the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries between a solid portion and a non-solid portion of the modelled 3D object. In a B-Rep model (often referred to as a B-Rep), geometry is stored in the computer using smooth and precise mathematical surfaces, in contrast to the discrete and approximate surfaces of a mesh model, which can be difficult to work with in a CAD program.

CAD programs have been used in conjunction with subtractive manufacturing systems and techniques. Subtractive manufacturing refers to any manufacturing process where 3D objects are created from stock material (generally a "blank" or "workpiece" that is larger than the 3D object) by cutting away portions of the stock material. Such manufacturing processes typically involve the use of multiple CNC machine cutting tools in a series of operations, starting with a roughing operation, an optional semi-finishing operation, and a finishing operation. In addition to CNC machining, other subtractive manufacturing techniques include electrode discharge machining, chemical machining, waterjet machining, etc. In contrast, additive manufacturing, also known as solid free form fabrication or 3D printing, refers to any manufacturing process where 3D objects are built up from raw material (generally powders, liquids, suspensions, or molten solids) in a series of layers or cross-sections. Examples of additive manufacturing include Fused Filament Fabrication (FFF) and Selective Laser Sintering (SLS). Other manufacturing techniques for building 3D objects from raw materials include casting and forging (both hot and cold).

In addition, CAD software has been designed so as to perform automatic generation of 3D geometry (generative design) for a part or one or more parts in a larger system of parts to be manufactured. This automated generation of 3D geometry is often limited to a design space specified by a user of the CAD software, and the 3D geometry generation is typically governed by design objectives and constraints, which can be defined by the user of the CAD software or by another party and imported into the CAD software. The design objectives (such as minimizing the waste material or weight of the designed part) can be used to drive the geometry generation process toward better designs. The design constraints can include both structural integrity constraints for individual parts (i.e., a requirement that a part should not fail under the expected structural loading during use of the part) and physical constraints imposed by a larger system (i.e., a requirement that a part not interfere with another part in a system during use). Further, examples of design constraints include maximum mass, maximum deflection under load, maximum stress, etc.

Some CAD software has included tools that facilitate 3D geometry enhancements using lattices and skins of various sizes, thicknesses and densities, where lattices are composed of beams or struts that are connected to each other or directly to solid parts at junctions, and skins are shell structures that overlay or encapsulate the lattices. Such tools allow redesign of a 3D part to be lighter in weight, while still maintaining desired performance characteristics (e.g., stiffness and flexibility). Such software tools have used lattice topologies of various types that can be used to generate lattice structures that can be manufactured.

Moreover, the inputs to a generative design process can include a set of input solids (B-Rep input) that specify boundary conditions for the generative design process, but many modern generative design solvers do not operate directly on the exact surface boundary representation of their input solids. Instead, B-Reps are sampled and replaced with volumetric representations such as level sets or tetrahedral or hexahedral meshes, which are significantly more convenient and efficient for the physical simulations and material synthesis computed by the solver. The set of input solids can include "preserve bodies", which should always be present in the design and which represent interfaces to other parts of the systems or locations on which boundary conditions should be applied (for example mechanical loads and constraints). Other regions in which geometry should or should not be generated can also be provided in a similar manner, such as input solids that define "obstacle bodies", which represent regions where new geometry should not be generated.

SUMMARY

This specification describes technologies relating to computer aided design of physical structures using generative design processes, where the three dimensional (3D) models of the physical structures can be produced with singularities and disconnection prevention, and where the physical structures thus produced can then be manufactured using additive manufacturing, subtractive manufacturing and/or other manufacturing systems and techniques.

In general, one or more aspects of the subject matter described in this specification can be embodied in one or more methods, including: obtaining, by a computer aided design program, a design space for a modeled object, for which a corresponding physical structure will be manufactured, one or more design criteria for the modeled object, and one or more in-use load cases for the physical structure; iteratively modifying, by the computer aided design program, a generatively designed three dimensional shape of the modeled object in the design space in accordance with the one or more design criteria and the one or more in-use load cases for the physical structure, wherein the iteratively modifying includes performing numerical simulation of the modeled object in accordance with a current version of the three dimensional shape and the one or more in-use load cases to produce a current numerical assessment of a physical response of the modeled object, computing shape change velocities for an implicit surface in a level-set representation of the three dimensional shape, changing the shape change velocities in accordance with a polynomial function that has been fit to at least a portion of the shape change velocities above a reference velocity, updating the level-set representation using the shape change velocities to produce an updated version of the three dimensional shape of the modeled object, and repeating at least the performing, the computing, the changing and the updating until a predefined number of shape modification iterations have been performed or until the generatively designed three dimensional shape of the modeled object in the design space converges to a stable solution for the one or more design criteria and the one or more in-use load cases; and providing, by the computer aided design program, the generatively designed three dimensional shape of the modeled object for use in manufacturing the physical structure corresponding to the modeled object using one or more computer-controlled manufacturing systems.

The one or more methods can include setting the reference velocity based on a mean and a standard deviation of a shape derivative on the implicit surface.

The one or more methods can include fitting the polynomial function being a cubic polynomial to velocity values above the reference velocity.

The iteratively modifying can include, after the updating and before the repeating: checking for an excessive change having been made during the updating; making the current version of the three dimensional shape be the updated version of the three dimensional shape for a next iteration to undue the excessive change; and slowing shape changes for the next iteration of the iteratively modifying.

Checking for the excessive change can include comparing a change in the one or more design criteria resulting from the updating with a predefined limit on an amount of change allowed for the one or more design criteria in a single iteration of the iteratively modifying.

Slowing the shape changes for the next iteration can include reducing a target volume change for the generatively designed three dimensional shape of the modeled object for the next iteration of the iteratively modifying.

The iteratively modifying can include, before performing the numerical simulation: identifying any elements, generated from the current version of the three dimensional shape for the numerical simulation, that are partially but not entirely within the implicit surface; and removing any of the identified elements that are not connected to any nodes of the current version of the three dimensional shape with Dirichlet boundary conditions, before performing the numerical simulation.

The iteratively modifying can include, before performing the numerical simulation: identifying any elements, generated from the current version of the three dimensional shape for the numerical simulation, that are partially but not entirely within the implicit surface; and setting densities of the identified elements equal to respective volume fractions of the identified elements, wherein a volume fraction of an identified element is a fractional amount of the identified element that falls within the implicit surface; wherein performing the numerical simulation includes penalizing stiffness of the identified elements according to the densities.

These and other methods described herein can be implemented using a non-transitory computer-readable medium encoding a computer aided design program operable to cause one or more data processing apparatus to perform the method(s). In some implementations, a system includes: a non-transitory storage medium having instructions of a computer aided design program stored thereon; and one or more data processing apparatus configured to run the instructions of the computer aided design program to perform the method(s). Further, such systems can include an additive manufacturing machine, or other manufacturing machines, and the one or more data processing apparatus can be configured to run the instructions of the computer aided design program to generate instructions for such machines (e.g., toolpath specifications for the additive manufacturing machine) from the three dimensional model, and manufacture the physical structure corresponding to the object with the machines using the instructions (e.g., the additive manufacturing machine using the toolpath specifications).

Particular embodiments of the subject matter described in this specification can be implemented to realize one or more of the following advantages.

Singularities, e.g., caused by sharp re-entrant corners or bad meshing, and geometric disconnections, e.g., caused by the use of Ersatz materials, can be mitigated or outright avoided. The techniques described can be implemented for automatic detection and correction, allowing for shape and topology optimization to continue where otherwise it may halt as a result of detecting a disconnection or singularity. Objects can be optimized even in limited design spaces. Identified regions of improvement, i.e., regions containing singularities or disconnections, can be corrected for to prevent affecting the stress constraint defined for the object during design optimization.

The process can be performed automatically and in conjunction with other techniques, such as the level-set method, conventional body-fitted solvers, backup-and-recovery, load case-specific advection to prevent disconnected geometry, Proportional-Integral-Derivative (PID) controllers, other adaptive controllers and related technologies, including adaptive PID tuning, PID auto-tuning, the latter of which can be used to meet arbitrary design constraints.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
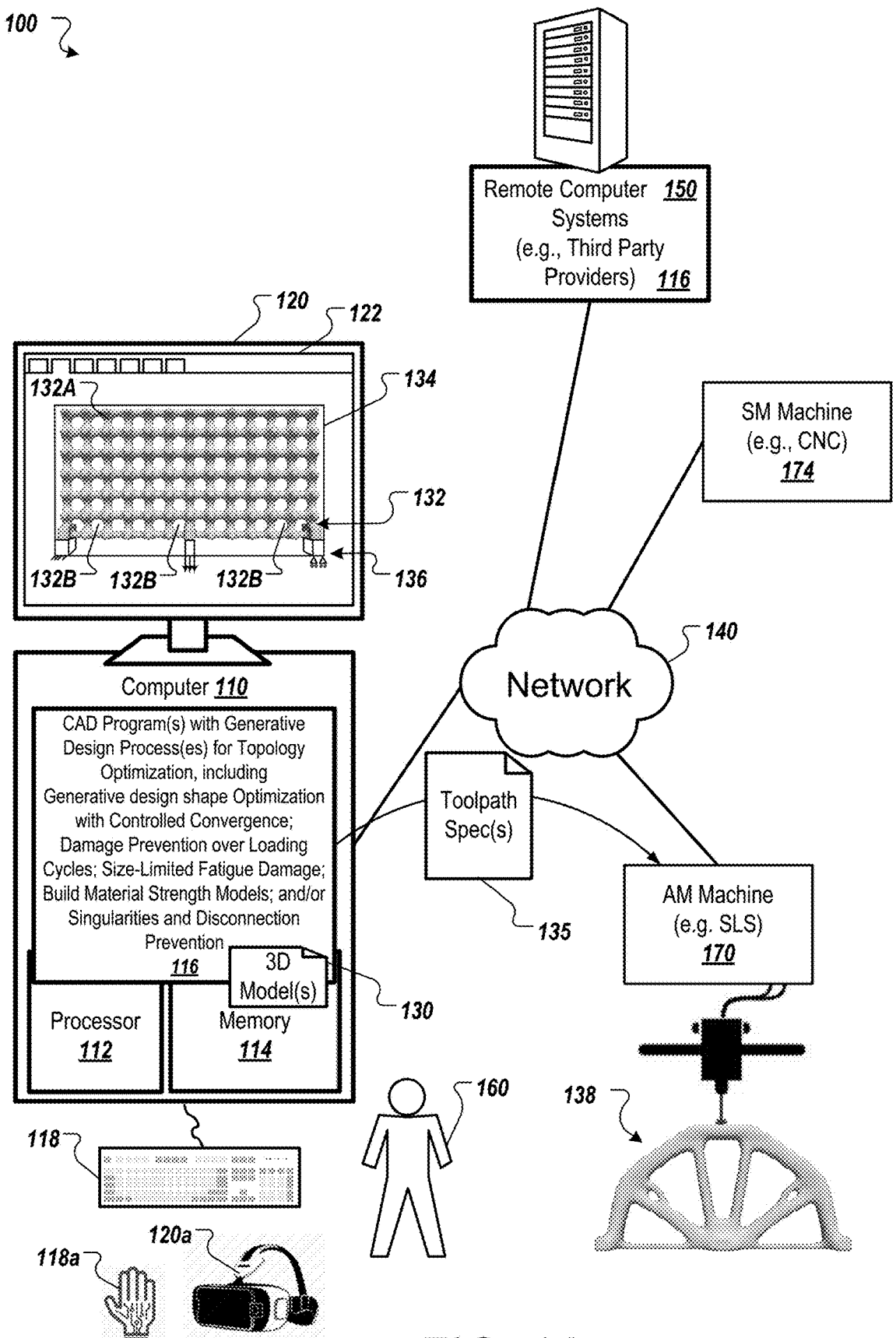
FIG. 1A shows an example of a system usable to design and manufacture physical structures.

FIG. 1A shows an example of a system 100 usable to design and manufacture physical structures. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions and includes one or more generative design processes for topology optimization using numerical simulation, and including material or microstructure shape optimization techniques, geometrical or macrostructure shape optimization techniques, or both (e.g., using one or more level-set based topology optimization processes).

The numerical simulation performed by the CAD program(s) 116 can simulate one or more physical properties and can use one or more types of simulation to produce a numerical assessment of physical response (e.g., structural response) of the modelled object. For example, finite element analysis (FEA), including linear static FEA, finite difference method(s), and material point method(s) can be used. Further, the simulation of physical properties performed by the CAD program(s) 116 can include Computational Fluid Dynamics (CFD), Acoustics/Noise Control, thermal conduction, computational injection molding, electric or electro-magnetic flux, and/or material solidification (which is useful for phase changes in molding processes) simulations. Moreover, the CAD program(s) 116 can potentially implement hole and/or fixture generation techniques to support clamping during manufacturing and/or manufacturing control functions.

As used herein, CAD refers to any suitable program used to design physical structures that meet design requirements, regardless of whether or not the CAD program is capable of interfacing with and/or controlling manufacturing equipment. Thus, CAD program(s) 116 can include Computer Aided Engineering (CAE) program(s), Computer Aided Manufacturing (CAM) program(s), etc. The CAD program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that one or more programs 116 operating locally at computer 110 can offload processing operations (e.g., generative design and/or numerical simulation operations) "to the cloud" by having one or more programs 116 on one or more computers 150 perform the offloaded processing operations.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1A, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) and/or augmented reality (AR) system. For example, the input/output devices 118, 120 can include a VR/AR input glove 118a and/or a VR/AR headset 120a. In any case, a user 160 interacts with the CAD program(s) 116 to create and modify 3D model(s), which can be stored in 3D model document(s) 130.

In the example shown, an initial 3D model 132 is a seed model for input to a generative design process. In this example, the user 160 has defined a mechanical problem, for a generative design process to operate on, to produce a new 3D model from a starting 3D model 132. In this case, the defined problem is the Michell type arch problem, where the user 160 has specified a domain 134 and loading cases 136. However, this is but one of many possible examples.

In some implementations, the user 160 (or other person or program) can specify a design space for an object to be manufactured, a numerical simulation setup (e.g., load(s) and material(s)) for numerical simulation (e.g., FEA, CFD, Acoustics/Noise Control, thermal conduction, computational injection molding simulations, electric or electromagnetic flux, material solidification, etc.) of the object, at least one design objective (e.g., minimize material usage) for the object, and at least one design constraint (e.g., a volume constraint) for the object. In some implementations, the inputs for use in numerical simulation and generative design processes can include one or more regions of a current 3D model in which to generate new 3D geometry, loading case(s) defining one or more loads in one or more different directions to be borne by a physical structure being designed, one or more materials (e.g., one or more isotropic solid materials identified as a baseline material model for the design space), one or more seed model types to use as input to a generative design process, one or more generative design processes to use, and/or one or more lattice topologies to use in one or more regions of the design space. Inputs to the generative design and numerical simulation processes can include non-design spaces, different types of components (e.g., rods, bearings, shells), one or more target manufacturing processes and associated parameters, obstacle geometries that should be avoided, preserve geometries that should be included in the final design, and parameters related to various aspects, such as resolution of the design, type of synthesis, etc.

Moreover, the CAD program(s) 116 provide user interface elements in the UI 122 to enable the user 160 to specify the various types of inputs noted above, and all (or various subsets) of these inputs can be used in the generative design and numerical simulation processes described in this document. Further, the user 160 can be enabled by the UI 122 of the CAD program(s) 116 to design a part using traditional 3D modelling functions (to build precise geometric descriptions of the 3D design model) and then use generative design and simulation processes in a design space specified within one or more portions of the 3D design model. Thus, as will be appreciated, many possible types of physical structures can be designed using the systems and techniques described in this document, the UI 122 can be used to create a full mechanical problem definition for a part to be manufactured, and the generative design and numerical simulation processes can accelerate new product development by enabling increased performance without time consuming physical testing.

Further, as described herein, the CAD program(s) 116 implement at least one generative design process, which enables the CAD program(s) 116 to generate one or more portions of the 3D model(s) automatically (or the entirety of a 3D model) based on design objective(s) and constraint(s), i.e., design criteria, where the geometric design is iteratively optimized based on simulation feedback. Note that, as used herein, "optimization" (or "optimum") does not mean that the best of all possible designs is achieved in all cases, but rather, that a best (or near to best) design is selected from a finite set of possible designs that can be generated within an allotted time (e.g., as specified by a predefined number of shape modification iterations) given the available processing resources. The design criteria can be defined by the user 160, or by another party and imported into the CAD program(s) 116. The design criteria can include structural integrity constraints for individual parts (e.g., a requirement that a part should not fail under the expected structural loading during use of the part) and physical constraints imposed by a larger system (e.g., a requirement that a part be contained within a specified volume so as not to interfere with other part(s) in a system during use).

Various generative design processes can be used, which can optimize the shape and topology of at least a portion of the 3D model. The iterative optimization of the geometric design of the 3D model(s) by the CAD program(s) 116 involves topology optimization, which is a method of light-weighting where the optimum distribution of material is determined by minimizing an objective function subject to design constraints (e.g., structural compliance with volume as a constraint). Topology optimization can be addressed using a variety of numerical methods, which can be broadly classified into two groups: (1) material or microstructure techniques, and (2) geometrical or macrostructure techniques. Microstructure techniques are based on determining the optimum distribution of material density and include the Solid Isotropic Material with Penalization (SIMP) method and the homogenization method. In the SIMP method, intermediate material densities are penalized to favor either having $\rho=0$ or $\rho=1$, denoting a void or a solid, respectively. Intermediate material densities are treated as composites in the homogenization method.

In contrast, macrostructure techniques treat the material as being homogeneous, and the three dimensional topology of the modeled object being produced is represented as one or more boundaries between one or more solid regions (having the homogenous material therein) and one or more void regions (having no material therein) within the design space (also referred to as the domain or a sub-space of the domain for topology optimization). The shape(s) of the one or more boundaries are optimized during the generative design process, while the topology is changed in the domain as a result of the shape optimization in combination with adding/removing and shrinking/growing/merging the void region(s). Thus, the types of final optimized topologies that can result from a generative design process using a macro-structure technique can depend significantly on the number and sizes of voids within the seed geometry along with the addition and removal of voids during the optimization process.

Note that, while only one seed model 132 is shown in FIG. 1A (where this model 132 includes a complex solid region 132A surrounding many holes 132B of the void region) it should be appreciated that the generative design processes described in this document can employ two or more seed geometries/models for any given generative design process iteration, so as to improve the final result of shape and topology optimization. Further, during the shape and topology optimization process, one or more voids can be introduced into the solid domain and/or one or more solids can be introduced into the void domain, so as to improve the final result of the shape and topology optimization. Thus, the CAD program(s) 116 can include various types of available seed geometries and mid-process geometry introductions, along with a user interface element allowing the user 160 to design their own seed geometries and mid-process geometry introductions. Likewise, the user 160 can run two or more generative design process iterations (saving the results from each) until a preferred generative design is produced.

In various implementations, the CAD program(s) 116 provide generative design shape optimization processes (1) controlled convergence, (2) with damage prevention over loading cycles, (3) with size limited fatigue damage, (4) using a build material strength model, and/or (5) with singularities and disconnection prevention, as described herein. In some implementations the CAD program(s) 116 implement all of the above-listed processes, while in other implementations the CAD program(s) 116 implement a subset of the above-listed processes.

Once the user 160 is satisfied with a generatively designed 3D model, the 3D model can be stored as a 3D model document 130 and/or used to generate another representation of the model (e.g., an .STL file for additive manufacturing). This can be done upon request by the user 160, or in light of the user's request for another action, such as sending the 3D model 132 to an additive manufacturing (AM) machine 170, or other manufacturing machinery, which can be directly connected to the computer 110, or connected via a network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the CAD program(s) 116 can provide a document 135 (having toolpath specifications of an appropriate format) to the AM machine 170 to produce a complete structure 138, which includes the optimized topology and shape (in this example, an arch design generated for the Michell type arch problem). The AM machine 170 can employ one or more additive manufacturing techniques, such as granular techniques (e.g., Powder Bed Fusion (PBF), Selective Laser Sintering (SLS) and Direct Metal Laser Sintering (DMLS)), extrusion techniques (e.g., Fused Deposition Modelling (FDM), which can include metals deposition AM). In addition, the user 160 can save or transmit the 3D model for later use. For example, the CAD program(s) 116 can store the document 130 that includes the generated 3D model.

In some implementations, subtractive manufacturing (SM) machine(s) 174 (e.g., a Computer Numerical Control (CNC) milling machine, such as a multi-axis, multi-tool milling machine) can also be used in the manufacturing process. Such SM machine(s) 174 can be used to prepare initial work-pieces on which AM machine(s) 170 will operate. In some implementations, a partially complete structure 138 is generated by the AM machine(s) 170 and/or using casting methods (e.g., investment casting (IC) using ceramic shell or sand casting (SC) using sand cores), and this partially complete structure 138 then has one or more portions removed (e.g., finishing) by the CNC machine 174 in order to form the completed structure. In some implementations, the CAD program(s) 116 can provide a corresponding document 135 (having toolpath specifications of an appropriate format, e.g., a CNC numerical control (NC) program) to the SM machine 174 for use in manufacturing the part using various cutting tools, etc. Moreover, in some implementations, the complete structure 138 is produced in its entirely using SM machine(s) 174.

In various implementations, the CAD program(s) 116 of the system 100 can implement one or more generative design processes as described in this document. Generative design processes seek an optimal geometric shape, topology, or both. For example, generative design processes seek an optimal geometric shape among alternative designs by minimizing a performance-related objective function subject to constraints:

| minimize | $J(s,u(s)) s \in \mathbb{R}^{n_s}$ | (1) |
| such that | $g_i(s, u(s)) = 0\ i = 1, \ldots, n_g$ | (2) | where s is a vector of design variables related to a geometric shape of the domain, and u is a vector of state variables (e.g., displacement) that depend on s. Additional constraints (e.g., equilibrium) are denoted by a set g. For simplicity, equality constraints are assumed here. Mathematical programming methods used to minimize (1) can be gradient-based or non-gradient-based. Gradient-based methods (versus non-gradient-based methods) generally use more information associated with design sensitivity, for example:

$$\frac{dJ}{ds}(s, u(s)) = \frac{\partial J}{\partial s} + \frac{\partial J}{\partial u}\frac{du}{ds} \quad (3)$$

which is a derivative of the performance-related objective function with respect to the design variables. In lattice-based methods, s represents a lattice thickness. In level-set based topology optimization methods, s represents a boundary of a solid region.

Figure 1B:
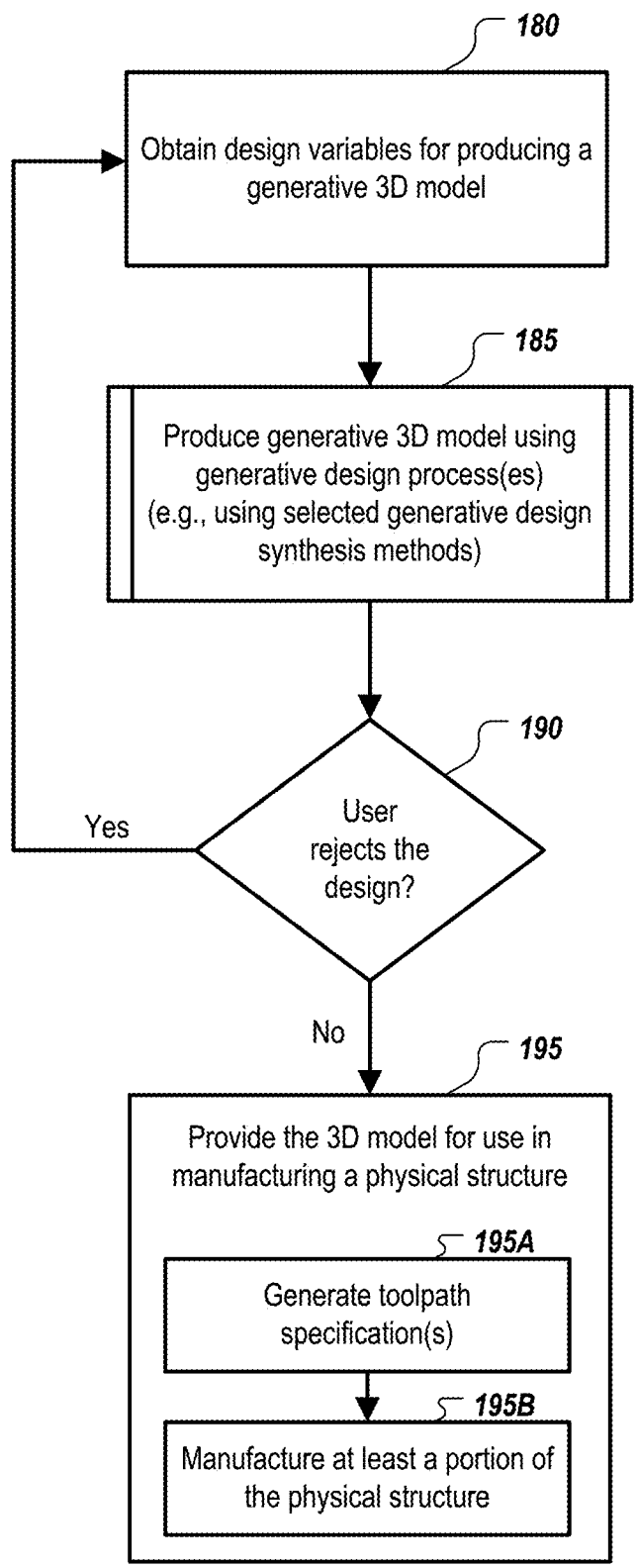
FIG. 1B shows an example of a process of designing and manufacturing physical structures.

FIG. 1B shows an example of a process of designing and manufacturing physical structures. Design variables are obtained 180, e.g., by CAD program(s) 116, for use in producing a generative 3D model. Different generative design processes can be formulated by using different combinations of design variables, which can include lattices, density fields, and level-sets. In some implementations, the design variables can include various types of inputs, e.g., received through UI 122, such as selection among different generative design synthesis methods made available by CAD program(s) 116 in the system 100. In some implementations, the available generative design synthesis methods include (1) a level-set-based topology optimization that provides a basic level-set method for topology optimization, (2) a lattice and skin optimization that provides a thickness optimization of lattice and skin, (3) a hybrid topology optimization that provides a topology optimization with lattice infill, (4) an inside-out hybrid topology optimization in which the lattice infill is present in a negative space between the topology-optimized design and the original design space, (5) a hollow topology optimization that provides a method for topology optimization with internal hollow regions, and/or (6) a hybrid-hollow topology optimization that provides a method for topology optimization with lattice infill and internal hollow regions. For further details regarding such generative design synthesis methods, see PCT/US2019/060089, filed Nov. 6, 2019, published as PCT Publication No. WO 2020/097216 A1 on May 14, 2020, and titled, "MACROSTRUCTURE TOPOLOGY GENERATION WITH DISPARATE PHYSICAL SIMULATION FOR COMPUTER AIDED DESIGN AND MANUFACTURING," which is hereby incorporated by reference. Moreover, the available generative design synthesis methods can employ one or more of the systems and techniques described below in connection with FIGS. 3A-8C.

Additional design variables are possible, such as (1) a design space for generative design geometry production, e.g., a boundary representation (B-Rep) 3D model designed or loaded into CAD program(s) 116 that serves as a sub-space of an optimization domain of a described generative design process, and/or (2) a set of input solids that specify boundary conditions for generative design geometry production, e.g., B-Reps selected using UI 122 to specify sub-space(s) that are preserved for use as connection point(s) with other component(s) in a larger 3D model or separate 3D model(s). Different combinations of design variables can be used, e.g., by CAD program(s) 116 in response to input from the user 160. For example, a user 160 may select different generative design synthesis methods to use within respective different design spaces within a single 3D model.

Other design variables can include a setup for numerical simulation, e.g., densities of elements in an FEA model or a homogenized lattice material representation for a selected lattice topology to be used with a topology optimized 3D shape of the part being generatively designed. The design variables can include various design objectives and constraints, such as described in this document. Furthermore, functions can be provided, e.g., by CAD program(s) 116, that assist the user in specifying design variables. For example, a lattice recommender can provide predictions for suitable lattice settings for a given problem using a single solid simulation. In some implementations, the lattice recommender described in PCT Publication No. WO 2017/186786 A1, filed 26 Apr. 2017, titled "METHOD AND SYSTEM FOR GENERATING LATTICE RECOMMENDATIONS IN COMPUTER AIDED DESIGN APPLICATIONS," which is hereby incorporated by reference, is used.

With the generative design variables specified, one or more 3D model(s) are produced 185, e.g., by CAD program(s) 116, using one or more generative design processes (e.g., using one or more selected generative design synthesis methods). In some implementations, the one or more generative design processes can use described level-set methods, where s, from Equations 1, 2 & 3, represents a boundary of a solid region that is implicitly represented using one or more level-sets, which are signed distance values computed on a Cartesian background grid. In a level-set-based topology optimization method, the outer shape of a structure is represented by a one-dimensional high-level level set function, and a change in shape and configuration is replaced by a change in the level set function value, so as to obtain an optimum structure. The level set function refers to a function that indicates whether each part of the design domain where the initial structure is set corresponds to a material domain (material phase) that forms the structure and is occupied by a material, a void domain (void phase) where a void is formed, or a boundary between these two domains, wherein a predetermined value between a value representing the material domain and a value representing the void domain represents the boundary between the material domain and the void domain.

In some implementations that use level-set based topology optimization methods, one or more octree data structures are used for resolving geometry accurately. Level-set based topology optimization generally involves optimizing the shape of a design domain using a shape derivative, which is the derivative of a constrained minimization problem with respect to the shape. The shape changes are applied on a level-set, which allows topology changes during shape modifications. The outcome of this type of generative design process is the partitioning of the design space into solid and void regions, resulting in an optimized shape, often with topology changes. For this type of level-set-based topology optimization, as well as the variations on this type of level-set-based topology optimization described in this document, one or more of the following approaches can be used.

Linear Elastic Topology Optimization

Consider the linear elastic boundary value problem for a solid body with the domain $\Omega$:

$$-\nabla \cdot D\epsilon(u) = f \text{ in } \Omega \quad (4)$$

$$u = 0 \text{ on } \Gamma_D \quad (5)$$

$$D\epsilon(u)n = \bar{t} \text{ on } \Gamma_N \quad (6)$$

where $\epsilon(u)$ is the linear strain tensor, D is the fourth order constitutive tensor, u is the displacement vector, f is the external load vector and $\bar{t}$ is the prescribed traction on the Neumann boundary $\Gamma_N$ with the outward normal n. For simplicity, homogeneous Dirichlet boundary conditions can be assumed on $\Gamma_D$. The constrained topology optimization problem can then be

| minimize | $J(\Omega, u)$ | | (7) |
|---|---|---|---|
| subject to | $-\nabla \cdot D\epsilon(u) = f$ | in $\Omega$ | (8) |
| | $u = 0$ | on $\Gamma_N$ | (9) |
| | $D\epsilon(u)n = t$ | on $\Gamma_N$ | (10) | where compliance minimization can be used as the objective function $$J(\Omega, u) = \int_\Omega f \cdot u \, d\Omega + \int_{\Gamma_N} \bar{t} \cdot u \, d\Gamma = \frac{1}{2} \int_\Omega D\epsilon(u):\epsilon(u) d\Omega \quad (11)$$

Figure 2A:
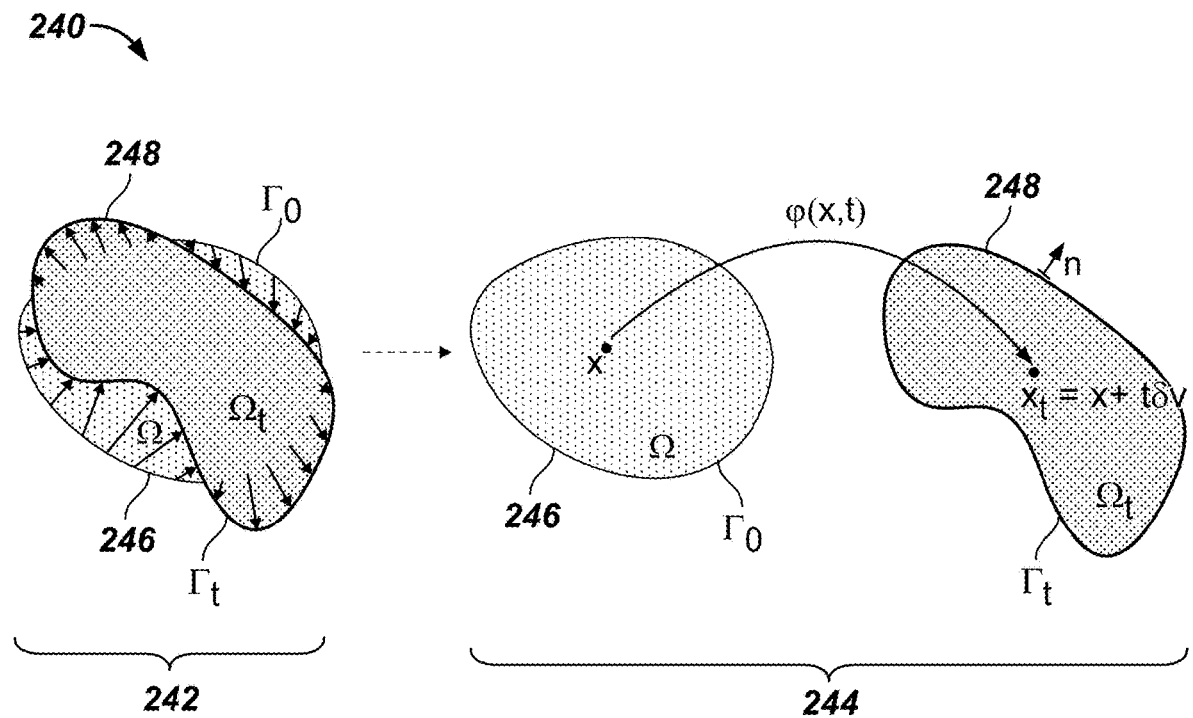
FIG. 2A shows a graphical representation of an example of geometry mapping between an initial design configuration and a current design configuration.

FIG. 2A shows a graphical representation of an example of geometry mapping 240 between an initial design configuration and a current design configuration. The solution space in topology optimization can be defined by different perturbations of the geometric shape within the design space. In this context, a linear mapping 242 which maps a given domain 246 $\Omega$, into a perturbed domain 248 $\Omega t$ can be defined. With this mapping, a material point with the coordinate $x \in \Omega$ can be mapped 244 onto $$x_t = x + t\delta v, t \geq 0 \qquad (12)$$

where $\delta v$ is a prescribed constant vector field, and t is a scalar parameter (see FIG. 2A). Note that solving equations using gradient based mathematical programming methods involves using the directional derivative of the objective function in the direction of the velocity field $\delta v$ $$\frac{dJ}{d\Omega}(\Omega, u(x))\delta v = \lim_{t \to 0} \frac{J(\Omega_t, u(x_t)) - J(\Omega, , u(x))}{t} \qquad (13)$$

More than one approach can be used to obtain the directional derivative of the objective function for use in gradient based optimization methods. Approaches that are suitable for use with gradient based optimization methods include direct differentiation, semi-analytical derivatives, adjoint method, and finite difference. Moreover, further approaches to obtaining values for a directional derivative of an objective function, including approximation techniques, are described in detail below in connection with FIGS. 4A-4F.

Adjoint Method

Evaluating the shape derivative (Equation 13) can require the directional derivative of the state variable u in the direction of the velocity vector $\delta v$. This is can be seen by using the chain rule $$\frac{dJ}{d\Omega}\delta v = \frac{\partial J}{\partial \Omega}\delta v + \frac{\partial J}{\partial u}\frac{\partial u}{\partial \Omega}\delta v \qquad (14)$$

But in some implementations, an adjoint method can be used which involves the formation of a Lagrangian $L(\delta, u, \lambda)$ which depends on domain shape $\Omega$, displacement field u, and Lagrange parameters $\lambda$ $$L(\Omega,u,\lambda) = J(\Omega,u) + \lambda[\int_\Omega f + \nabla \cdot D\varepsilon(u) d\Omega - \int_{\Gamma_D} u d\Gamma + \int_{\Gamma_N} \bar{t} - D\varepsilon(u) n d\Gamma] \qquad (15)$$

The stationary condition for the Lagrangian, i.e., $\delta L(\Omega, u, \lambda)=0$, can yield a complete set of shape optimization equations. For example, the adjoint problem for compliance minimization (Equation 11) can be given by considering the variation of the Lagrangian with respect to the displacements u. After introducing the cost function (Equation 11) and reformulating the domain term with the divergence theorem $$\int_\Omega f \cdot \delta u d\Omega + \int_{\Gamma_N} \bar{t} \cdot \delta u d\Gamma - \int_\Omega \delta u \cdot (\nabla \sigma(\lambda))$$
$$d\Omega - \int_{\Gamma_D} \lambda \cdot (D:\nabla(\delta u))n d\Gamma + \int_{\Gamma_N} \delta u \cdot \sigma(\lambda)n d\Gamma = 0 \qquad (16)$$

the corresponding boundary value problem, referred to as the adjoint problem, can become $$-\nabla \cdot \sigma(\lambda) = -f \text{ in } \Omega \qquad (17)$$

$$\lambda = 0 \text{ in } \Gamma_D \qquad (18)$$

$$\sigma(\lambda) \cdot n = \bar{t} \text{ in } \Gamma_N \qquad (19)$$

This can lead to determining that $\lambda = -u$ is the solution of the adjoint problem. This means that the adjoint problem (Equations 17-19) does not need to be solved explicitly for the compliance minimization problem (Equation 11). Such problems are called self-adjoint, where the solution of the direct problem also yields the adjoint solution. However, this is not often the case and different adjoint problems may have to be solved depending on the nature of the direct problem and the objective function. An advantage of the use of the Lagrangian as is includes the identity:

$$\frac{dJ}{d\Omega}(\Omega, u(x))\delta v = \frac{\partial L}{\partial \Omega}(\Omega, u(x), \lambda)\delta v \qquad (20)$$

This equation can enable the shape derivative (Equation 13) to be expressed as a boundary integral of the following form:

$$DJ(x, u(x))[\delta v] = \int_\Omega f(u, \lambda)(\nabla \cdot \delta v) d\Omega \qquad (21)$$
$$= \int_\Gamma f(u, \lambda)(\delta v \cdot n) d\Gamma$$

Without loss of generality, it can be assumed that some boundary variations are not relevant in practical shape optimization. In solid mechanics, the boundary variations can usually be of the form:

| | | | (22) |
|---|---|---|---|
| $\delta v = 0$ | on $\Gamma_D$ | | |
| $\delta v = 0$ | on $\Gamma_N$ | with $\sigma n = \bar{t}$, | |
| $\delta v \neq 0$ | on $\Gamma_N$ | with $\sigma n = 0$. | |

This means that only parts of the boundary $\Gamma_N$ with no traction are free to move during the shape optimization. In this context, the variation of the Lagrangian (Equation 15) in the direction $\delta \hat{v}$ with structural compliance (Equation 11) as the cost function can become:

$$\frac{\partial L}{\partial \Omega}\delta v = \int_{\Gamma_N} (2u \cdot f - \nabla u:\sigma(u))(\delta v \cdot n) d\Gamma \qquad (23)$$

Without restricting $\delta v$ as stated in Equation 22, the variation of the Lagrangian can contain several more terms. During iterative optimization of the shape, the shape derivative (Equation 23) can be used as gradient information. In order to achieve maximum decrease in the objective function, the boundary perturbation can be chosen as follows $$\delta v = -(2u \cdot f - D\varepsilon(u):\varepsilon(u)). \qquad (24)$$

This boundary perturbation can be applied along the direction of the normal $\delta \hat{v} = vn$, where v is the shape change velocity and is given by $$v = \frac{dJ}{d\Omega}(\Omega, u(x))\delta v = \int_\Gamma (2u \cdot f - D\varepsilon(u):\varepsilon(u))(\delta v \cdot n) d\Gamma \qquad (25)$$

Volume Control

Topology optimization using only a compliance minimization objective (Equation 11) can result in the optimum topology covering the full design space. Thus, some form of volume constraint is often required. Moreover, in some implementations, control over volume changes during topology optimization can be important for several reasons: 1) to enforce volume constraints; 2) to provide user control of topology optimization progress, e.g., more volume changes during initial iterations and fewer volume changes during later iterations; and 3) to ensure that arbitrary constraints not having shape derivatives are satisfied.

Note that the presence of shape derivatives for constraints can require modifying the shape change velocity in Equation 25. A modified objective function can be considered where the volume is penalized by a penalty parameter $\mu$ in:

$$J(\Omega, u) = \frac{1}{2}\int_\Gamma (D \in (u): \in (u)d\Omega + \mu V(\Omega))d\Gamma \quad (26)$$

The corresponding shape derivative (Equation 25) can then be given by:

$$\frac{dJ}{d\Omega}(\Omega, u(x))\delta v = \int_\Gamma (2u \cdot f - D \in (u) + \mu)(\delta v \cdot n)d\Gamma \quad (27)$$

wherein $\mu$ is constant along the boundary. The velocity term in the shape derivative (Equation 25) can now have an additional term as follows:

$$v = -(2u \cdot f - D \in (u): \in (u) + \mu) \quad (28)$$

Augmented Lagrangian Method

In some implementations, an Augmented Lagrangian method is used. Some approaches (see Volume Control above) can have limitations such as creating difficulty in meeting prescribed volume targets. Essentially, the final volume of the design can depend on the value of $\mu$ prescribed in Equation 26. In such cases, meeting prescribed design constraint targets can be achieved by using the Augmented Lagrangian method. Consider the following Lagrangian for compliance minimization with a final volume target of $V_f(\Omega)$:

$$L(\Omega, u) = \quad (29)$$
$$\frac{1}{2}\int_\Omega D \in (u): \in (u)d\Omega + \mu(V(\Omega) - V_f(\Omega)) + \frac{\lambda}{2}(V(\Omega) - V_f(\Omega))^2$$

The shape derivative can then be given by:

$$\frac{dJ}{d\Omega}(\Omega, u(x))\delta v = \quad (30)$$
$$\int_\Gamma \left(2u \cdot f - D \in (u): \in (u) + \mu + \frac{\lambda}{2}(V(\Omega) - V_f(\Omega))\right)(\delta v \cdot n)d\Gamma$$

where the penalty parameters $\lambda$, $\mu$ can be updated in an increasing sequence such that they converge to the optimal Lagrange multipliers. In some implementations, one or more heuristic methods are used for updating penalty parameters.

Body-Fitted Solvers

Figure 2B:
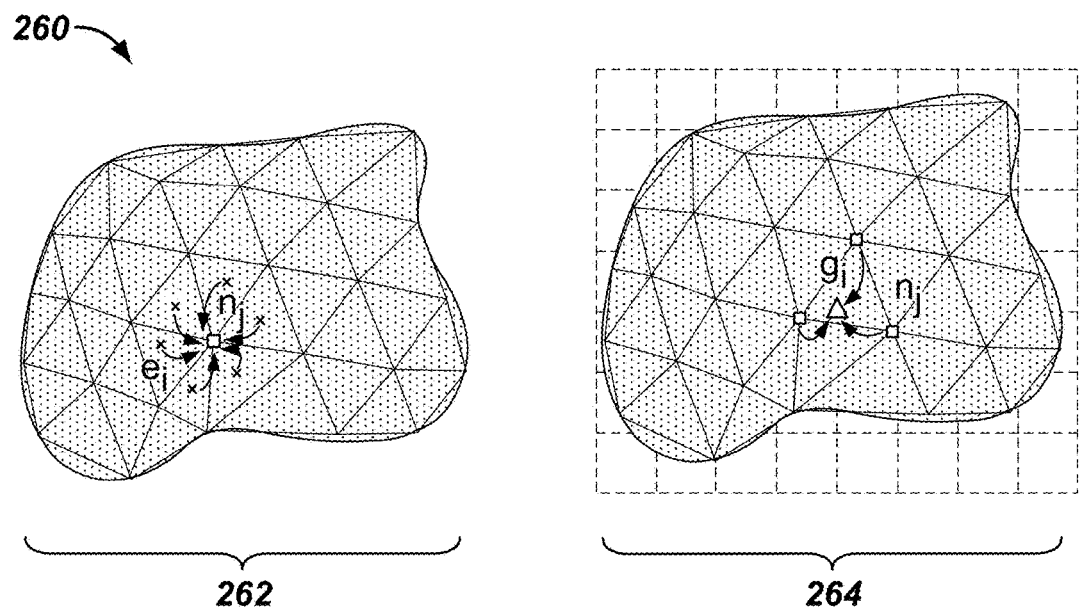
FIG. 2B shows a graphical representation of an example of a data mapping from solid mesh to level-set grid.

In some implementations, one or more body-fitted mesh based solvers are used. Using such body-fitted mesh based solvers with the level-set method involves mapping data from the solid mesh to a Cartesian grid (note that the inverse mapping is trivial due to the structured nature of the Cartesian grid). This involves two mappings as shown in FIG. 2B, which shows a graphical representation of an example of a data mapping 260 from solid mesh 262 to level-set grid 264.

Data in solid mesh elements (e.g., strain energy, Von Mises stress) can first be mapped to solid mesh nodes. This mapping can be achieved by data averaging. For example, by averaging solid mesh element $e_i$ data in the solid mesh 262 at solid node $n_j$. Further, data in the solid mesh nodes can be mapped to voxel grid points using linear shape functions. Data at solid mesh nodes $n_j$ can be linearly interpolated to level-set grid point $g_i$ in the level-set grid 264. Having such a mapping can allow the level-set method to be used with complex FEA models solved with body-fitted solvers.

A detailed example of a macrostructure topology optimization process is now described. For simplicity of presentation, the compliance minimization problem is used with a penalized volume (Equation 26). Moreover, for all the detailed examples below, it is presumed that FEA is used for numerical simulation for ease of presentation, but the other numerical simulation types noted above can also be used.

The starting shape can simply be the design space or the intersection of design space with a suitable seed geometry. The initial level-set $\psi_0$ can be created by converting the starting shape to a signed distance field (SDF). The conversion can be done using an implementation of an OpenVDB toolkit. Other methods are also possible. Next, the shape can be iteratively optimized until the objective function has converged. The FEA model used for simulation includes solid elements throughout the solid region(s) of the generative design space being optimized. In each iteration, the constitutive model D of each element e in the FEA model can be updated by changing the modulus of elasticity according to the relative location of the element with respect to the current level-set. For example, elements outside the level-set (called void elements) are given very low stiffness $D_v$, while the constitutive model of those inside are set to that of the original solid material $D_s$. This can be achieved by checking the average level-set of the element nodes:

$$\psi(e) = \frac{1}{n_e}\Sigma_j^{n_e} \psi(n_j) \quad (31)$$

where $n_j$ denotes the coordinates of element nodes. Once the FEA model is up-to-date with the current geometry represented by the level-set, the boundary value problem (Equations 4-6) can be solved in order to compute an advection velocity. Shape changes can be applied by advecting the level-set $\psi$ using, for example, the Hamilton-Jacobi equation:

$$\frac{\partial \psi}{\partial t} - v|\nabla \psi| = 0 \quad (32)$$

where v is the shape derivative (Equation 28). Note that one or more heuristic shape update methods can be used, and one or more methods to move the $0^{th}$ iso-contour of a level-set can be used given a movement direction specified by the shape derivative. A linear mapping between the FEA nodes and the level-set grid points (see Body-fitted Solvers above) can allow the FEA results, e.g., $D \in (u): \in (u)$, to be transferred to the level-set where the advection velocity v is computed.

Once the objective function has converged, the surface of the final level-set can be extracted using a contouring method which extracts the $0^{th}$ iso-contour of $\psi$. An example of the algorithm is as follows:

Level-Set Algorithm for Level-set Based Topology Optimization

Input: $(\Omega, D_v, D_s, \mu)$
Output: $(\Omega_s)$
// initiate level-set $\psi$ from design space
1: $\psi_0 = f_{SDF}(\Omega)$
// iterate until convergence tolerance c is met
2: $i = 0$
3: while $i = 0$ or $|J_i - J_{i-1}| > c$ do
// set constitutive model of FEA elements as void $D_v$ or solid $D_s$ 4: $K_e \begin{cases} B^T D_s B & \text{if } \psi_i(e) \leq 0 \\ B^T D_v B & \text{if } \psi_i(e) > 0 \end{cases}$ // formulate and solve FEA problem
5: $K = \Sigma_e^n K_e$
6: $u = K^{-1} f$
// compute advection velocity 7: $v = \frac{1}{2} D \in (u) : \in (u) + \mu$ // solve Hamilton- Jacobi and obtain new level-set $\psi_{i+1}$ 8: $\frac{\partial \psi_i}{\partial t} - v|\nabla \psi_i| = 0$ 9: $\psi_{i+1} \leftarrow \psi_i$
// compute objective 10: $J_{i+1} = \frac{1}{2} \int_\Omega D \in (u) : \in (u) d\Omega$ // increment iteration
11: $i \leftarrow i + 1$
12: end while
// obtain final level-set as solid region
13: $\Omega_s \leftarrow f_{SDF}^T(\psi_{i+1})$ Note that generalizing this algorithm for arbitrary objectives and constraints can require modifications, such as the following. In line 6, any adjoint problems (see Adjoint Method above) needed for computing shape derivatives of each objective and constraint should be addressed. In line 7, the augmented Lagrangian method (see Augmented Lagrangian Method above) should be used for combining the different shape derivatives to yield a single advection velocity. For further details regarding implementing these modifications to generative design processes generally, see Augmented Lagrangian Algorithm for Constrained Shape Optimization below.

Geometry

Let $\Sigma$ be a smooth, watertight, oriented surface in Euclidean space, with normal vector field $N_\Sigma$ pointing in the direction of "free space" outside of $\Sigma$. A solid object can be created out of $\Sigma$ by "thickening" it in the negative normal direction. That is: a small $h \in \mathbb{R}_+$ can be chosen to define $$\Omega_h := \{x - sN_\Sigma(x) : \text{for all } x \in [0,h]\} \quad (33)$$

In plain English, $\Omega_h$ consists of all points sandwiched between and an offset of by a distance h in the negative normal direction, which is denoted $$\Sigma_h := \{x - hN_\Sigma(x) : \text{for all } x \in \Sigma\} \quad (34)$$

The boundary $\partial\Omega_h$ of $\Omega_h$ consists of two disjoint surfaces: $\Sigma$ itself and the offset surface $\Sigma_h$.

Note that what is commonly referred to as the "outward" unit normal vector field of $\partial\Omega_h$ (which points from inside the solid material defined by $\Omega_h$ to outside the solid material) is equal to $N_\Sigma$ on $\Sigma$ but points in the opposite direction to $N_\Sigma$ on $\Sigma_h$. Its exact formula at $y \in \Sigma_h$ is $-N_\Sigma(\text{proj}_\Sigma(y))$ where $\text{proj}_\Sigma$ is the mapping that takes a point y to its closest point on $\Sigma$—so for example, if it is known that $y = x - hN_\Sigma(x)$ and h is sufficiently small, then $\text{proj}_\Sigma(y) = x$.

Deformations of the Geometry $\Sigma$ can be allowed to deform. The deformation can be generated by a surface normal speed function which can be denoted as $\theta^\perp : \Sigma \to \mathbb{R}$. Such a deformation can be achieved in a number of ways: for example, representing $\Sigma$ as the zero level set of a function on the background Euclidean space and using advection with respect to (an extension of) $\theta^\perp$. The methods can be equivalent to first order in the deformation. What matters is the infinitesimal variation of $\Sigma$ itself, which is precisely the surface normal speed function. Any deformation of $\Sigma$ will have a notion of the "magnitude" of the deformation, which is a positive scalar $\varepsilon$. For example, if the deformation is generated by advection, then the magnitude of the deformation corresponds to the advection time. The deformed surface can be denoted by $\Sigma_\varepsilon$.

Once $\Sigma$ deforms, then $\Sigma_h$ deforms as well. It is simply "dragged along" in such a way that the offset distance h is maintained between $\Sigma_\varepsilon$ and the deformed version of $\Sigma_h$. Consequently the deformation of the thickened object $\Omega_h$ is completely determined by the deformation of $\Sigma$. Note that it can be shown that the infinitesimal variation of $\Sigma_h$ at a point $y \in \Sigma_h$ is just $-\theta^\perp(\text{proj}_\Sigma(y))$ where $\text{proj}_\Sigma$ is the mapping that takes a point y to its closest point on $\Sigma$.

Optimization by Steepest Descent

An optimal $\Sigma$ can be found for some objective function: Surfaces $\to \mathbb{R}$ using a Steepest Descent method. This is based on the shape Taylor formula which says that the variation of $\Sigma$ by a magnitude E with respect to variations generated by some $\theta^\perp : \Sigma \to \mathbb{R}$ as above satisfies $$\Phi(\Sigma_\varepsilon) \approx \Phi(\Sigma) + \varepsilon D\Phi_\Sigma(\theta^\perp) \quad (35)$$

for sufficiently small $\varepsilon$, where $D\Phi_\varepsilon(\Phi^\perp)$ symbolizes the shape derivative of $\Phi$ at $\Sigma$.

Using a formula for the shape derivative in terms of $\theta^\perp$, a particular $\theta^\perp$ can be chosen such that the shape derivative term in the shape Taylor formula is guaranteed to be negative. As a result, the objective function will decrease if $\Sigma$ is varied with respect to this chosen $\theta^\perp$, at least for a sufficiently small $\varepsilon$. After $\Sigma$ is updated by performing the variation (e.g., by advection of the level set function representing $\varepsilon$), the updated shape represents an improvement with respect to the objective function. For further improvement, the procedure can be iteratively repeated until convergence occurs.

Shape Derivative for a Class of Objective Functions

Consider objective functions of the following form. Let $\Phi_0$: Domains $\to \mathbb{R}$ be some "volumetric" shape function (e.g., one which can be evaluated on a volumetric domain) such as a convex linear combination of the averaged structural compliance with respect to a set of load cases and the total mass. This allows definition of a "surface" shape function by $$\Phi(\Sigma) = \Phi_0(\Omega_h) \quad (36)$$

It can be assumed that it is known how to calculate the shape derivative of $\Phi_0$ at an arbitrary domain $\Omega$ and with respect to an arbitrary variation $\Omega_\varepsilon$ of $\Omega$ generated by a boundary normal speed function $V^\perp : \partial\Omega \to \mathbb{R}$ with respect to the outward unit normal vector field of $\Omega$. That is, $\Phi_0$ can be standard, meaning that the shape derivative satisfies the Hadamard-Zolésio structure theorem, and providing the formula $$\Phi_0(\Omega_\varepsilon) \approx \Phi_0(\Omega) + \varepsilon D\Phi_{0,\Omega}(\theta^\perp) \text{ where } D\Phi_{0,\Omega}$$
$$(\theta^\perp) := \int_{\partial\Omega} G_\Omega(x) V^\perp(x) d\sigma(x) \quad (37)$$

for sufficiently small ε. The function $G_\Omega$ of $\Omega$, is known as the shape gradient of $\Phi_0$ at the shape $\Omega$. The precise form of $G_\Omega$ depends on $\Phi_0$ and can be worked out by calculating the derivative $$\frac{d}{d\varepsilon}\Phi_0(\Omega_\varepsilon),$$

e.g., for averaged structural compliance and volume.

The shape derivative of $\Phi$ can be expressed in terms of the shape derivative of $\Phi_0$. This can be done by leveraging the above formula for the shape derivative of $\Phi_0$, applied to $\Omega_h$, almost exactly, and taking into account the nature of the boundary normal speed on the two disjoint surfaces making up $\partial\Omega_h$. That is: $\Sigma$ can have the boundary normal speed $V^\perp:=\theta^\perp$, whereas $\Sigma_h$ can have the boundary normal speed $V^\perp:=-\theta^\perp\circ\text{proj}_\Sigma$. Then, the first-order change in $\Phi$ under a variation $\Sigma_\varepsilon$ of $\Sigma$ generated by the normal speed function $\theta^\perp$ is given by $$\Phi(\Sigma^\varepsilon)\approx\Phi(\Sigma)+\varepsilon(\int_\Sigma G_{\Omega_h}(x)\theta^\perp(x)d\sigma(x)-\int_{\Sigma_h}G_{\Omega_h}(y)\theta^\perp(\text{proj}_\Sigma(y))d\sigma(y)) \quad (38)$$

Thus, the desired shape derivative formula is $$D\Phi_\Sigma(\theta^\perp):=\int_\Sigma G_{\Omega_h}(x)\theta^\perp(x)d\sigma(x)-\int_{\Sigma_h}G_{\Omega_h}(y)\theta^\perp(\text{proj}_\Sigma(y))d\sigma(y) \quad (39)$$

Note that y can be used as the dummy integration variable on $\Sigma_h$ simply to emphasize that the two integrals are over different spaces and cannot a priori be combined in any simple way.

Extracting a Descent Direction

Recall that the utility of the exact formula for the shape derivative is that it should allow $\theta^\perp$ to be chosen in such a way that the shape derivative becomes negative, resulting in a decrease of the objective function to first order according to the shape Taylor formula. It is, however, not immediately clear how to do this for the shape derivative of $\Phi$ calculated above. This is due to the fact that there are two competing terms (e.g., the integral over $\Sigma$ and the integral over $\Sigma_h$) and it is not clear how these balance out given $\theta^\perp$.

There are two ways to proceed. The first way is to apply the Hilbert space method of extracting a descent direction. The second way is to apply a change of variables to the integral over $\Sigma_h$, allowing it to be expressed as an integral over $\Sigma$. This is simple: recall that any point $y\in\Sigma_h$ can be written in the form $y=x-hN_\Sigma(x)$; for our purpose now, this should be viewed as a mapping from $\Sigma$ to $\Sigma_h$. Call this mapping $n:\Sigma\to\Sigma_h$, with $n(x):=x-hN_\Sigma(x)$. So by the change of variables formula for surface integrals $$\int_{\Sigma_h} G_{\Omega_h}(y)\theta^\perp(\text{proj}_\Sigma(y))d\sigma(y) = \int_{n(\Sigma)} G_{\Omega_h}(y)\theta^\perp(\text{proj}_\Sigma(y))d\sigma(y) \quad (40)$$

$$= \int_\Sigma G_{\Omega_h}(x-hN_\Sigma(x))\theta^\perp(\text{proj}_\Sigma(x-hN_\Sigma(x)))\text{Jac}(x)d\sigma(x) \quad (41)$$

$$= \int_\Sigma G_{\Omega_h}(x-hN_\Sigma(x))\theta^\perp(x)\text{Jac}(x)d\sigma(x) \quad (42)$$

where Jac is the Jacobian of n and is based on the fact that $\text{proj}_\Sigma(x-hN_\Sigma(x))=x$ for all $x\in\Sigma$.

It turns out that the Jacobian of n can be determined. With some help from differential geometry, it can be shown that $\text{Jac}(x)=1+hH_\Sigma(x)+h^2K_\Sigma(x)$ where $H_\Sigma$ is the mean curvature of $\Sigma$ and $K_\Sigma$ is the Gauss curvature of $\Sigma$, providing $$D\Phi_\Sigma(\theta^\perp)=\int_\Sigma(G_{\Omega_h}(x)-G_{\Omega_h}(x-hN_\Sigma(x))(1+hH_\Sigma(x)+h^2K_\Sigma(x)))\theta^\perp(x)d\sigma(x) \quad (43)$$

This manipulation of $D\Phi_\Sigma(\theta^\perp)$ provides a nice formula for the shape gradient of $\Phi$ at $\Sigma$, denoted as $$G_\Sigma(x):=G_{\Omega_h}(x)-G_{\Omega_h}(x-hN_\Sigma(x))(1+hH_\Sigma(x)+h^2K_\Sigma(x)). \quad (44)$$

Consequently, the choice of $\theta^\perp=-G_\Sigma$ makes $D\Phi_\Sigma(\theta^\perp)$ negative, as required for our steepest descent procedure updating $\Sigma$ towards optimality of $\Phi$.

Augmented Lagrangian Algorithm for Constrained Shape Optimization

Introduction

An algorithm can be developed that solves constrained shape optimization problems where a shape function is to be minimized (e.g., volume or compliance) subject to a mix of equality and inequality constraints. These constraints can use shape functions (e.g., a target volume, an aggregated stress measure, or an aggregated displacement measure). A different algorithm can be used for dealing with non-aggregated (a.k.a. pointwise) constraints, such as the norm of the stress at each point of the shape. Generically, the optimization problems can be of the form $$\min_{\Omega\in Adm} F(\Omega, u_\Omega) \quad (45)$$

$$\text{s.t. } G_E(\Omega, u_\Omega) = 0 \quad (46)$$

$$G_I(\Omega, u_\Omega) = 0 \quad (47)$$

for $u_\Omega$ satisfying a linear elastic PDE in $\Omega$
where Adm is a set of admissible shapes, F is a scalar-valued shape-differentiable shape function, and $G_E$ and $G_I$ are vector-valued shape-differentiable shape functions that can depend explicitly on the shape, or implicitly on the shape through its elastic response under loads.

The Classical Augmented Lagrangian Algorithm
Equality Constraints

The augmented Lagrangian method in the classical setting of optimizing a scalar function of a vector variable can apply most simply to equality-constrained optimization problems of the form $$\min_{x\in\mathbb{R}^n} f(x) \quad (48)$$

$$\text{s.t. } g_i(x) = 0 \text{ for } i = 1, \ldots, k$$

The augmented Lagrangian method is an enhancement of a so-called penalty method. The penalty method considers a penalized objective function $$L_c(x) := f(x) + \frac{c}{2}\Sigma_i[g_i(x)]^2$$

and a sequence $c:=c_k$ tending to infinity. Then, one can define $x_k:=\text{argmin}_x L_{c_k}(x)$. It is by no means the case that $g_i(x_k)=0$ for any i. But since the increasing sequence of c-values penalizes the constraints more and more heavily, it can be expected that $x_k$ eventually satisfies the constraints, in the sense that if $x_k$ converges to $x^*$ then $g_i(x^*)=0$ for all i. Additionally, it can be expected that $x^*$ is a solution of Equation 48.

A problem with the penalty method is that the increasing sequence of c-values can make it harder and harder to minimize $L_c(x)$ numerically due to poor conditioning. The augmented Lagrangian method can remedy this problem. This algorithm minimizes an "augmented Lagrangian"

$$L_c(x, \mu) := f(x) \sum_i \mu_k^i g_i(x) + \frac{c}{2} \sum_i [g_i(x)]^2 \qquad (49)$$

and also maintains a sequence of Lagrange multipliers in and increasing penalty parameters $c_k$. Again, one can define $x_k := \operatorname{argmin}_x L_{c_k}(x, \mu_k)$. These sequences are updated in such a way that $c_k$ stabilizes on some large but finite value (hence avoiding the ill-conditioning inherent to general penalty methods). This occurs while $x_k$ converges to a solution of Equation 48 (it is thus optimal and feasible) and $\mu_k$ converges to the Lagrange multiplier $\mu$, associated to it in the KKT conditions. Since the augmented Lagrangian method iterates on both the primal variable x and the "dual" variable $\mu$, this algorithm is an example of a primal-dual optimization method.

The general framework for the augmented Lagrangian algorithm can require a method to increase the penalty parameters and a method for tightening tolerances 1. Choose a final tolerance $T_{final}$.
2. Set k = 0. Start with an initial tolerance $c_0$, $\mu_0$. Start with an initial tolerance $T_0$ less restrained than $T_{final}$.
3. While not converged to within tolerance $T_{final}$:
   a. Apply an unconstrained optimization algorithm to the problem $\min_x L_{c_k}(x, \mu_k)$. Stop the algorithm when a convergence to within tolerance $T_k$ is reached. Output $x_{k+1}$ to be the x-value at this level of convergence.
   b. Check constraint satisfaction
      (i) If the constraints are not satisfied to within tolerance $T_k$, let $c_{k+1} :=$ Increase ($c_k$) and $\mu_{k+1} := \mu_k$.
      (ii) If the constraints are satisfied to within tolerance $T_k$, update the Lagrange multipliers by $\mu_{k+1}^i := \mu_k^i + c_k g_i(x_{k+1})$.
   c. Set the tolerance $T_{k+1} :=$ Tighten ($T_k$).
   d. Increment k.

Note the feature of the above algorithm that is the update of the Lagrange multiplier. It can be understood as follows. The unconstrained minimum of the augmented Lagrangian at iteration k satisfies $\nabla L_{c_k}(x_k, \mu_k) = 0$ or $$\nabla f(x_k) + \Sigma_i (\mu_k^i + c_k g_i(x_k)) \nabla g_i(x_k) = 0 \qquad (50)$$

Of course, the solution $x^*$ and the Lagrange multipliers $\mu^{i*}$, for the equality-constrained optimization Equation 48 satisfy $$\nabla f(x^*) + \Sigma_i \mu^{i*} \nabla g_i(x^*) = 0 \qquad (51)$$

$$g^i(x^*) = 0 \text{ for } i = 1, \ldots, k \qquad (52)$$

In the augmented Lagrangian algorithm, since it is desirable to ensure that the iterates $x_k$ converge to $x^*$, it is desirable to have $\mu_k^i \to \mu^*$ and $g_i(x_k) \to 0$ are consistent with this aim. Therefore, the Lagrange multiplier update can be construed as a fixed-point iteration scheme in the form $\mu_{k+1}^i := \mu_k^i + c_k g_i(x_{k+1})$ to achieve this.

Inequality Constraints

An elegant extension of the classical equality-constrained augmented Lagrangian algorithm to the classical inequality-constrained case can hinge on two facts. For fact 1, the problem $$\min_{x \in \mathbb{R}^n} f(x) \qquad (53)$$

$$\text{s.t. } g_i(x) \leq 0 \text{ for } i = 1, \ldots, k$$

is equivalent to the problem $$\min_{(x,z) \in \mathbb{R}^n \times \mathbb{R}^k} f(x) \qquad (54)$$

$$\text{s.t. } g_i(x) + z_i^2 = 0 \text{ for } i = 1, \ldots, k$$

The new z-variables in Equation 54 are known as slack variables and satisfy $z_i = \sqrt{-g_i(x^*)}$ at the feasible optimum, where $x^*$ is the feasible optimum for Equation 53.

For fact 2, the augmented Lagrangian for Equation 54 is $$L_c(x, z, \mu) := f(x) + \sum_i \mu^i [g_i(x) + z_i^2] + \frac{c}{2} \sum_i [g_i(x) + z_i^2]^2 \qquad (55)$$

and the unconstrained optimization arising in the augmented Lagrangian algorithm can be decomposed and partially solved as follows:

$$\min_{(x,z) \in \mathbb{R}^n \times \mathbb{R}^k} L_c(x, z, \mu) = \min_{x \in \mathbb{R}^n} \min_{z \in \mathbb{R}^k} L_c(x, z, \mu) = \qquad (56)$$

$$\min_{x \in \mathbb{R}^n} f(x) + \min_{x \in \mathbb{R}^k} \sum_i \mu^i [g_i(x) + z_i^2] + \frac{c}{2} \sum_i [g_i(x) + z_i^2]^2$$

$$= \min_{x \in \mathbb{R}^n} f(x) + \sum_i \mu^i g_i^+(x, \mu^i, c) + \frac{c}{2} \sum_i [g_i^+(x, \mu^i, c)]^2 \qquad (57)$$

which has introduced $$g_i^+(x, \mu, c) := \max\{g_i(x), -\frac{\mu^i}{c}\}.$$

This is because the minimization can be performed over $z \in \mathbb{R}^n$ explicitly using elementary calculus techniques and phrase the result in terms of the $g_i^+$ function.

The upshot is that one can solve the inequality constrained Equation 53 by applying the augmented Lagrangian algorithm (see Equality Constraints above) to the modified Lagrangian function $$\hat{L}_c(x, \mu) := f(x) + \sum_i \mu^i g_i^+(x, \mu^i, c) + \frac{c}{2} \sum_i [g_i^+(x, \mu^i, c)]^2 \qquad (58)$$

whose gradient (after some manipulation) is $$\nabla \hat{L}_c(x, \mu) = \nabla f(x) + \Sigma_i \max\{0, \mu^i + c g_i(x)\} \nabla g_i(x). \qquad (59)$$

Note that for completeness, the solution of the minimization over the z-variables appears in Equation 56. Substituting for this solution yields Equation 57. For simplicity, the minimization over the z-variables is rephrased in the form $$\min_{Z \in \mathbb{R}} a(s+z^2) + b(s+z^2)^2 \qquad (60)$$

where a, b, s are fixed parameters, which can be solved as follows.

The first step is to substitute $y:=z^2$ and replace the above minimization problem by $\min_{y \in \mathbb{R}_+} a(s+y)+b(s+y)^2$. This new problem is now quite simple, since the function $\Phi(y):=a(s+y)+b(s+y)^2$ is a simple parabola, and the problem $\min_{y \in \mathbb{R}_+} \Phi(y)$ finds the minimum of this parabola constrained to the region $y \geq 0$. Therefore the global constrained minimum is either at the global unconstrained minimum of $\Phi$ or else at the $y=0$ boundary of the constrained region, whichever is smaller. This results in either $y^*=-a/2b-s$, or $y^*=0$; from which is selected the result for which $\Phi^*:=\Phi(y^*)$ is least. Consequently $$\begin{aligned}\Phi_* &= \min\{\Phi(0), \Phi(-a/2b-s)\} \\ &= \min\{as+bs^2, -a^2/4b\} \\ &= a\max\{s, -a/2b\} + b[\max\{s, -a/2b\}]^2\end{aligned} \qquad (61)$$

after algebraic re-arrangement. With $s=g_i(x)$ and $a=\mu^i$ and $=c/2$, Equation 57 is obtained.

Application to Constrained Shape Optimization Problems

The augmented Lagrangian algorithm can be applied to solve the Equations 45-47 with one scalar equality constraint and one scalar inequality constraint for simplicity. Then, $\Omega \in \text{Adm}$ can be interpreted to mean that $\Omega$ satisfies admissibility constraints of the following form. The surface of every $\Omega \in \text{Adm}$ contains pre-defined ports; every $\Omega \in \text{Adm}$ contains pre-defined keep-in regions; and every $\Omega \in \text{Adm}$ avoids pre-defined keep-out regions.

The classical augmented Lagrangian algorithm (see Equality Constraints above) can be mimicked for both equality and inequality constraints but can be adapted for shapes satisfying admissibility constraints. The augmented Lagrangian is defined as $$L_c(\Omega, \mu^E, \mu^I) := F(\Omega) + \mu^E G_E(\Omega) + \frac{c}{2}[G_E(\Omega)]^2 + \mu^I G_I^+(\Omega, \mu, c)]^2 + \qquad (62)$$

$$\frac{c}{2}[G_I^+(\Omega, \mu, c)]^2$$

with $G_I^+(\Omega, \mu, c):=\max\{G_I(\Omega), -\mu^I/c\}$. The dependence of F, $G_E$, $G_I$ on the solution of $\mu_\Omega$ of the linear elastic PDE has not been indicated for simplicity. To consider only shape functions that are surface or volume integrals of shape-dependent quantities, it is known from general principles that the shape gradient of a function L of this type, evaluated at a given shape $\Omega$, is a scalar-valued function of $\partial \Omega$ that is denoted as $dL(\Omega):\partial\Omega \to \mathbb{R}^{T \times n}$. The shape gradient of the augmented Lagrangian at the shape $\Omega$ is $$dL_c(\Omega,\mu_E,\mu^I)=dF(\Omega)+(\mu^E+cG_E(\Omega))dG_E(\Omega)+\max\{0, \mu^I+cG_I(\Omega)\}dG_I(\Omega) \qquad (63)$$

where $dF(\Omega)$, $dG_E(\Omega)$, $dG_I(\Omega)$ are the shape gradients of the objective and constraint function, respectively, at the shape $\Omega$.

It is also known from general principles that updating the shape $\Omega$ to reduce the value of $L_c$ while maintaining the admissibility constraint can be achieved by advecting the level set function representing $\Omega$ for a certain time (determined via a line-search or related procedure) with respect to a speed function constructed from an extension of a projection of the shape gradient of $L_c$ (e.g., the shape gradient of $L_c$ can be zeroed out appropriately when a violation of admissibility is detected and use the Adalsteinsson-Sethian velocity extension algorithm to extend the values of $dL_c(\Omega)$ from $\partial\Omega$ to a narrow band of $\partial\Omega$). This is the basis for an unconstrained, gradient-based shape optimization algorithm for solving the problem $\min_{\Omega \in \text{Adm}} L_c(\Omega, \mu^E, \mu^I)$ at any fixed values of c, $\mu^E$, $\mu^I$.

The augmented Lagrangian algorithm for solving Equations 45-47 can now be given as follows. It requires a method to increase the penalty parameters and a method for tightening tolerances.

1. Choose a final tolerance $T_{final}$
2. Set $k = 0$. Start with initial $c_0$, $\mu_0^E$, $\mu_0^I$. Start with an initial tolerance $T_0$ less restrictive than $T_{final}$.
3. Initialize the shape $\Omega_0$.
4. While not converged to within tolerance $T_{final}$:
   a. Apply an unconstrained, gradient-based shape optimization algorithm to the problem $\displaystyle\min_{\Omega \in \text{Adm}} L_{c_k}(\Omega, \mu_k^E, \mu_k^I)$ until convergence occurs to within tolerance $T_k$. Output the shape $\Omega_{k+1}$ at this level of convergence
   b. Check constraint satisfaction.
      (i) If the constraints are not satisfied to within tolerance $T_k$, let $c_{k+1} :=$ Increase ($c_k$) multipliers by $\mu_{k+1}^E := \mu_k^E$ and $\mu_{k+1}^I := \mu_k^I$.
      (ii) If the constraints are satisfied to within tolerance $T_k$, update the Lagrange multipliers by $\mu_{k+1}^E := \mu_k^E + c_k G_E(\Omega_k)$ and $\mu_{k+1}^I := \max\{0, \mu_k^I + c_k G_I(\Omega_{k+1})\}$.
   c. Set the tolerance $T_{k+1} :=$ Tighten ($T_k$).
   d. Increment k.

Pre-Advection Operations

In some implementations, one or more operations are performed on the velocity field before the shape is advected, including (1) narrow-band velocity restriction, (2) advection prevention using an advection mask, and/or (3) velocity extension. For the first of these, narrow-band velocity restriction involves restricting the velocity to a narrow-band around the $0^{th}$ iso-contour of the level-set. For the second, the advection mask has values of 0 inside the ports (geometric interfaces containing Neumann and Dirichlet boundary conditions) and values of 1 elsewhere in the domain. Shape derivatives and advection velocity is multiplied by the advection mask to prevent any advection inside the ports. With regard to the third of these, the velocity field should be continuous on both negative and positive sides of the $0^{th}$ iso-contour of the level-set. However, the objective function (typically strain energy) is often only available inside the negative narrow-band. Velocity extension projects all velocities inside the domain to the positive narrow-band. This can be done by sampling the velocity at a point inside the domain found by moving along the negative normal a distance equal to the level-set:

$v(x)=v(x-\psi(x)n(x))x \notin \Omega$.

Figure 2C:
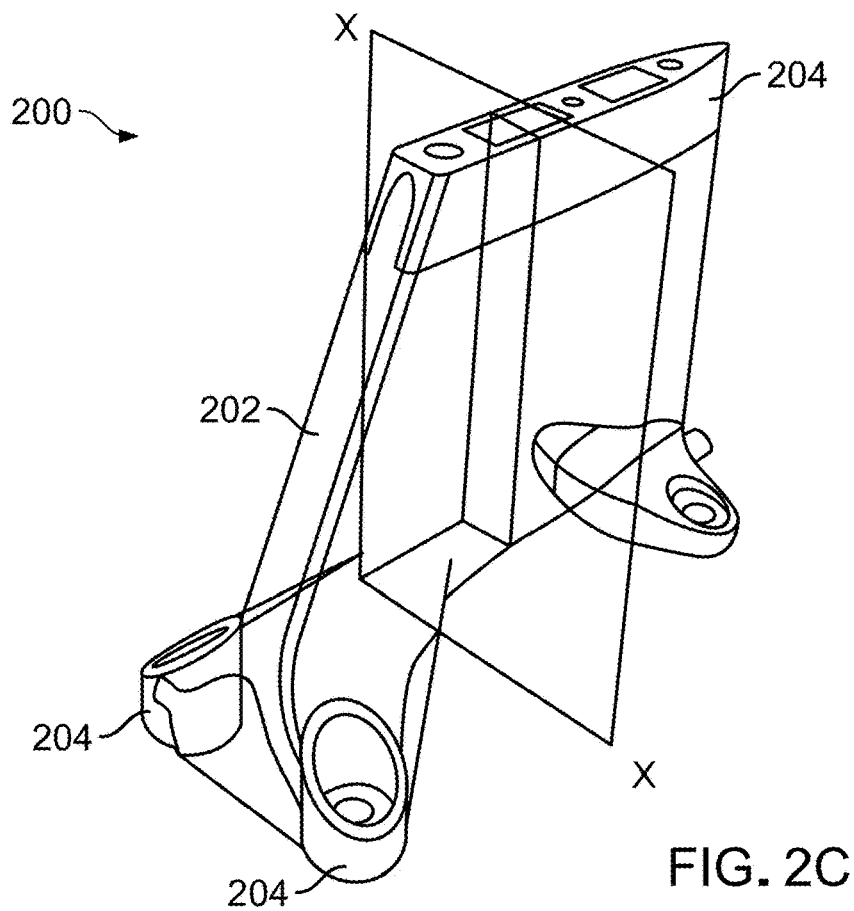
FIG. 2C shows an example of a problem set up for a level-set based topology optimization process.
Figure 2D:
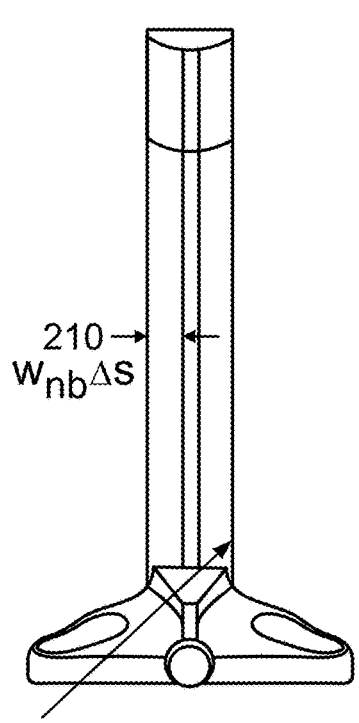
FIG. 2D shows a narrow-band velocity example for the problem set up from FIG. 2C.
Figure 2E:
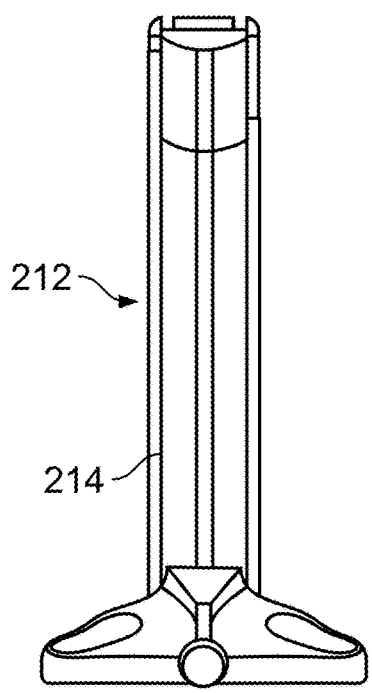
FIG. 2E shows the velocity from FIG. 2C, after extension.

An example of the first and third operations is shown in FIGS. 2C-2E.

FIG. 2C an example of a problem set up 200 for a level-set based topology optimization process. The problem set up 200 is intended to generate a pylon for a vehicle, where a design space 202 is specified with respect to ports 204 (also referred to as preserve geometries or preserve sub-spaces) for the pylon to be generated. A cross-section X, which is shown in perspective in FIG. 2C, is also shown in FIGS. 2D and 2E. FIG. 2D shows a narrow-band velocity 210. The number of voxels in the narrow band is denoted by $w_{nb}$, and $\Delta s$ denotes the size of a voxel. FIG. 2E shows the effects 212 of velocity extension with respect to the $0^{th}$ iso-contour 214 of the level-set.

The above approaches can be used with various types of level-set-based topology optimizations, which are described further below in connection with FIGS. 3A-8C. Returning to FIG. 1B, all of the generative design processes described in this document can be implemented, e.g., in CAD program(s) 116, to provide both (1) substantial user control over the generative design process, as well as post-processing of the generative design output to form a final, acceptable 3D model of an object, and (2) control functions for providing the generatively designed 3D model for use in manufacturing a physical structure corresponding to the object. Thus, the results of generative design processing can be presented to the user, e.g., in UI 122 on display device 120, along with an option 190 to accept or reject the design.

If the design is rejected, the process of FIG. 1B can return to obtain 180, e.g., by CAD program(s) 116, new design variable(s) for use in producing a new generative 3D model. For example, a new design variable can include selecting 180 a different void addition and/or removal technique for changing the topology of the three dimensional shape during shape optimization. For example, in implementations that use level-set based topology optimization methods, one or more void(s) can be introduced into the material domain based on topological derivatives of an objective function during the process of the structural optimization to allow a change in topology (a change in configuration) such as the introduction of a hole in the material domain. Further details regarding one or more examples of void introduction techniques are described below in connection with FIG. 3A. Moreover, the design variable(s) obtained 180 can include all of the various user inputs described in this document that can affect the generative design process.

Once a design is not rejected 190, the process of FIG. 1B can provide 195, e.g., by CAD program(s) 116, the 3D model for use in manufacturing a physical structure corresponding to the object using one or more computer-controlled manufacturing systems, e.g., AM machine 170, SM machine 174, and/or other manufacturing machines. The providing 195 can involve sending or saving the 3D model to a permanent storage device for use in manufacturing the physical structure corresponding to the object using the one or more computer-controlled manufacturing systems. In some implementations, the providing 195 involves generating 195A, e.g., by CAD program(s) 116, toolpath specifications for the computer-controlled manufacturing system(s) using the 3D model, and manufacturing 195B, e.g., by CAD program(s) 116, at least a portion of the physical structure corresponding to the object with the computer-controlled manufacturing system(s) using the toolpath specifications generated for the additive manufacturing machine.

Note that the 3D model that is provided 195 can be the 3D model produced 185 by a generative design synthesis method or a post-processed version of the generative design output. For example, in some implementations, a 3D mesh model produced by a generative design synthesis method can be converted into a watertight B-Rep 3D model before being provided 195. In some implementations, a generative design output can be post-processed using the systems and techniques described in U.S. Patent Application No. 62/758,053, filed Nov. 9, 2018, and titled "CONVERSION OF GENERATIVE DESIGN GEOMETRY TO EDITABLE AND WATERTIGHT BOUNDARY REPRESENTATION IN COMPUTER AIDED DESIGN," which systems and techniques are included in U.S. Pat. No. 11,016,470, issued on May 25, 2021, which claims priority to U.S. Patent Application No. 62/758,053 and is titled "CONVERSION OF MESH GEOMETRY TO WATERTIGHT BOUNDARY REPRESENTATION." Further, in some implementations, the post-processed generative design output can be edited using the systems and techniques described in U.S. application Ser. No. 16/186,136, filed on Nov. 9, 2018, issued as U.S. Pat. No. 10,467,807 on Nov. 5, 2019, and titled, "FACILITATED EDITING OF GENERATIVE DESIGN GEOMETRY IN COMPUTER AIDED DESIGN USER INTERFACE." Moreover, the generative design processes described below in connection with FIGS. 3A-8C can also be implemented to use the post-processing, editing, and/or provisioning 195 systems and techniques described above. Finally, while described in the context of a CAD program providing multiple options for generative design, each of the generative design processes described in this document can be implemented as a standalone generative design process in a CAD program. Thus, not all of the generative design processes described below in connection with FIGS. 3A-8C need be implemented together in any given implementation.

Figure 3A:
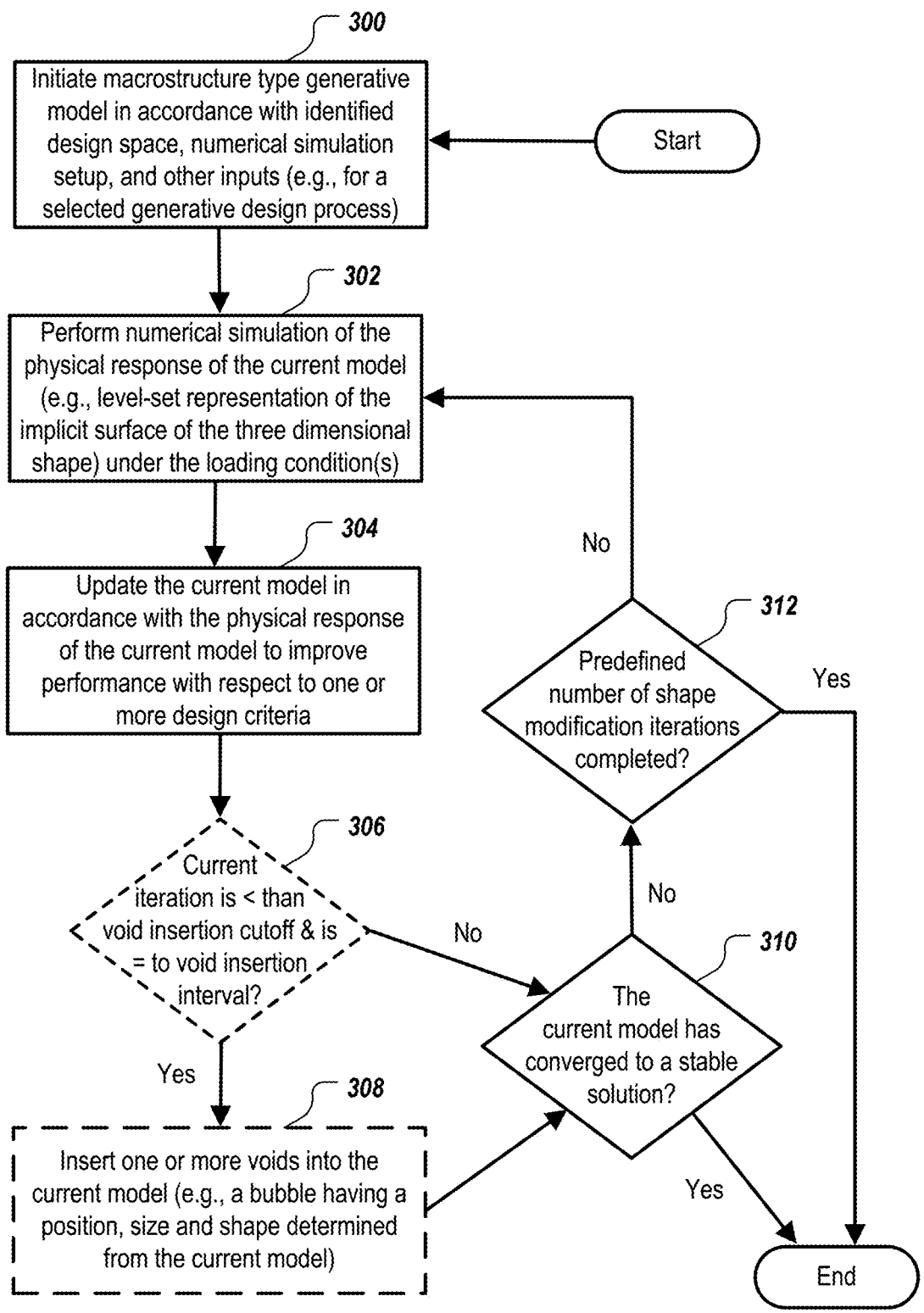
FIG. 3A shows an example of a process that generates one or more portions of a 3D model of an object to be manufactured, using one or more generative design processes.

FIG. 3A shows an example of a process (e.g., as performed by the CAD program(s) 116 of FIG. 1A) that generates one or more portions of a 3D model of an object to be manufactured, using one or more generative design processes, as described in further detail below in connection with FIGS. 3A-8C. The process of FIG. 3A is an example of the defined process 185 from FIG. 1B. A design space, a setup for numerical simulation, and other inputs for a selected generative design process are identified for use in initiating 300 a macrostructure (or geometrical) type of generative model (e.g., a level-set representation of the 3D model) that can be used with one or more selected generative design processes.

When the generative process to be used employs a basic level-set method for topology optimization, the level-set is initiated 300 for the design space. Note that a level-set method is an example of a macrostructure generative modeling technique, where the generative model represents the object being designed as one or more boundaries between one or more solid regions (having the homogenous material therein) and one or more void regions (having no material therein) within the design space. Further, identifying the inputs can involve receiving user input, e.g., via UI 122 on display device 120, importing information from another program or a third party source, and/or one or more of these inputs can be predefined in a given implementation.

The setup for numerical simulation can include one or more physical properties to be simulated and one or more types of simulation to be performed, as discussed above, as well as potentially surrogate modelling or other methods of approximation. In some implementations, the type of numerical simulation is predefined, either for all uses of the program or given a particular context in the program from which the generative design process has been launched. Further, the setup for numerical simulation includes at least one set of loading conditions and/or other physical environment information associated with the type of numerical simulation to be performed.

The design space can be an initial 3D model or one or more portions of an initial 3D model to be used as a starting geometry. In some cases, the design space can be determined as the bounding volume of all initial geometry used to specify loading or other physical environment information associated with the type of numerical simulation to be performed. In some cases, the design space can be unbounded. In some implementations, the portion of the design space to be used as starting geometry can be automatically set by a genetic algorithm or other process. For example, bubble-like holes (e.g., holes 132B) can be put in the domain and a genetic algorithm can be used to vary the bubble size and spacing.

Seeding and the Bubble Method
Initial Seeding

The design space can be initialized using a seeding process, in which the design space is defined by a Boolean intersection between the design space $\Omega$ and a seed geometry $\Omega_s$, shown as follows:

$$\Omega_0 = \Omega \cap \Omega_s \qquad (64)$$

where $\Omega_0$ is the resulting initialized domain after the seeding geometry $\Omega_s$ is applied to the initial design space $\Omega$. The seed geometry can be of a variety of different shapes, e.g., an array of bubbles or a mesh, with parametrized characteristics, e.g., bubble diameter and spacing. The parameters can be user-defined or defined automatically by some seeding process, e.g., bubble seeding, described below.

Initial seeding can result in more efficient optimization and flexibility in design variations. For example, initial seeding can be defined so as to avoid local minima and the need to restart optimizations. Further, initial seeding can aide in creating design variations. In some implementations, a seed geometry is user-defined, e.g., according to a final geometry generated from a previous execution of design process, a random process to randomly initialize the seeding geometry, according to other factors of interest to the user, or some combination of the preceding.

Figure 3B:
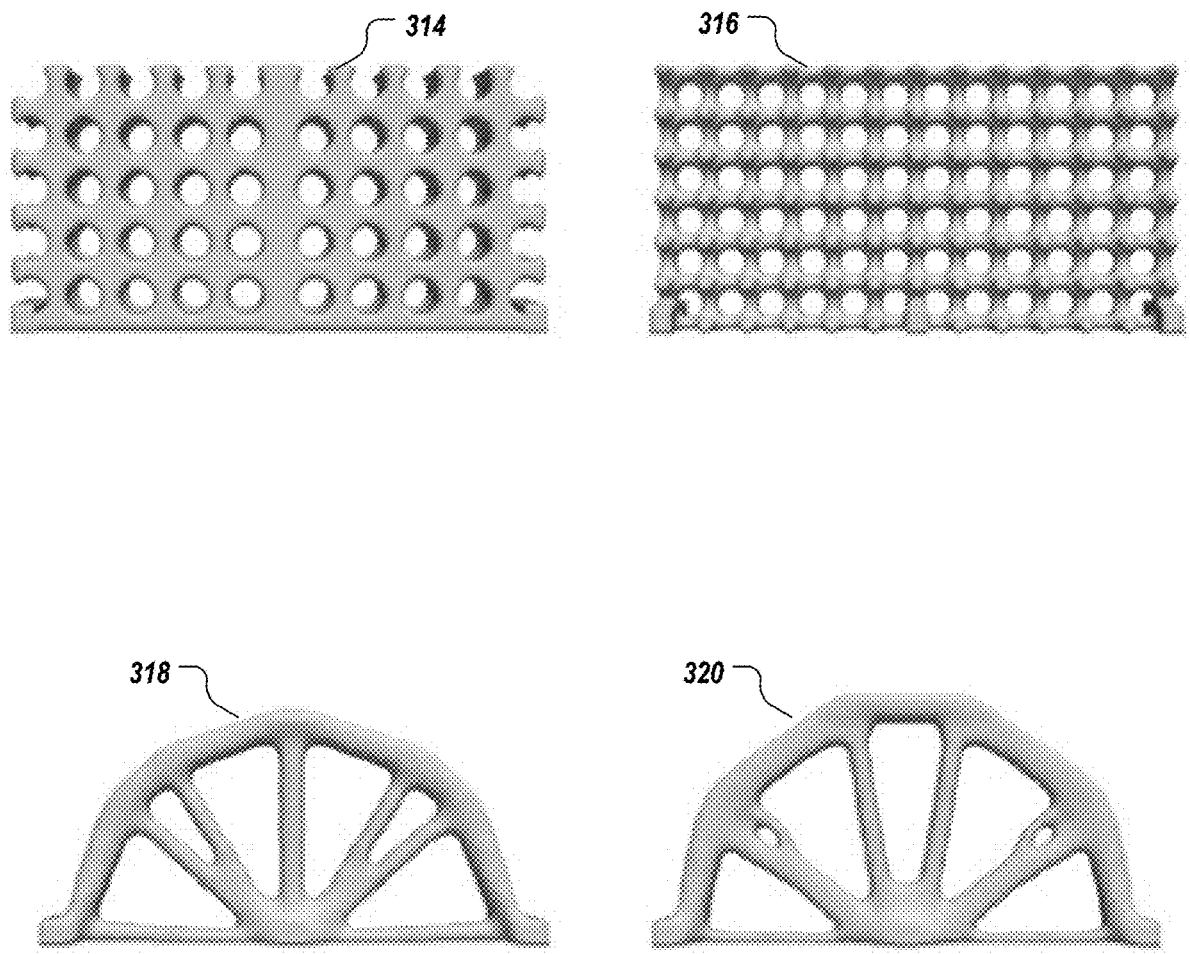
FIG. 3B shows a graphical representation of examples of initial seeding geometries applied to a design space and resulting designs for a Michell type arch problem after a generative design process is executed on the design space.

FIG. 3B shows a graphical representation of examples of initial seeding geometries applied to a design space and resulting designs for a Michell type arch problem after a generative design process is executed on the design space. Seeding geometries 314 and 316 represent different geometries for initializing a design space, and can be user-defined or according to some seeding process, e.g., bubble seeding, described below. The seeding geometry 316 is the same as the seed model 132 of FIG. 1A. Final designs 318 and 320 are designs generated by applying the same generative design process after a design space is seeded according to geometries 314 and 316, respectively. The final design 320 is the same as the complete structure 138 of FIG. 1A. The resultant final designs 318 and 320 have different geometries and different physical properties, e.g., different strain energies. Therefore, the seeding geometry can have a significant impact in a final design for different design spaces, even if the generative design process is the same.

Moreover, the other inputs can depend on the type of numerical simulation to be performed and/or the type of generative design process to be used. For example, when a lattice will be used in the generative design process, the other inputs can include lattice topology, volume fraction, unit size, and thickness. Various types of generative design processes can be used, either alone or in combination, but FIG. 3A shows a representative process for all these various types of generative design processes. After initiation 300 of the macrostructure type generative model, an iterative process of modifying this generative model is begun in order to satisfy the design criteria for the physical structure, e.g., one or more design constraints to be met and one or more design objectives to be maximized.

Numerical simulation of the physical response of the current model (e.g., a level-set representation of the implicit surface of the 3D shape) is performed 302 under the one or more defined loading conditions. In general, the numerical simulation 302 treats each solid region in the current model as a homogenous solid material, and each void region in the current model as having no material therein. However, in some implementations, this treatment can be altered. For example, in hybrid topology optimization, the numerical simulation of the modelled object is performed 302 with at least a portion of the solid region being treated as having at least one void in it (e.g., what the macrostructure generative modeling technique treats as a solid, the numerical simulation treats as partially containing a void in the form of a lattice) or at least a portion of the void region being treated as having at least one solid in it (e.g., what the macrostructure generative modeling technique treats as a void, the numerical simulation treats as partially containing a solid material in the form of a lattice). As another example, in the case of hollow topology optimization, the numerical simulation of the modelled object is performed 302 with at least a portion of the solid region being treated as having a void in it (i.e., what the macrostructure generative modeling technique treats as a solid, the numerical simulation treats as containing a hollow region). Finally, in a combination of these two, in hybrid hollow topology optimization, the numerical simulation of the modelled object is performed 302 with at least a portion of the solid region being treated as having both a partial void region and a complete void in it (i.e., what the macrostructure generative modeling technique treats as a solid, the numerical simulation treats as partially containing a lattice structure around a hollow region). For further details regarding hybrid, hollow and hybrid-hollow topology optimization, see PCT/US2019/060089, filed Nov. 6, 2019, and published as WO 2020/097216 A1 on May 14, 2020.

Results from the simulation are used to update 304 the current model (e.g., the level-set representation) in accordance with a current numerical assessment of the simulated physical response of the current model. For example, shape change velocities can be calculated for the implicit surface in the level-set representation of the 3D shape of the object being modeled, and this level-set representation can be updated 304 using the calculated shape change velocities to produce an updated version of the 3D shape of the modeled object. Note that in various implementations, other operations can be performed before, during or after the updating 304, as part of the iterative modification of the 3D shape of the modeled object, such as described below in connection with FIGS. 4A-8C.

In addition, to produce topology changes in the current model of the object, one or more voids can be inserted 308 into the current model at each or selected ones of the iterative modifications of the current model. For example, one or more bubbles having positions, sizes and shapes determined from the current model can be inserted 308. Moreover, in some implementations, the insertion 308 of void(s) is done only during an earlier portion of the iterative modification and/or only periodically (e.g., at a regular void insertion interval) during the iterative modification. In the example of FIG. 3A, the insertion of void(s) is done only when the current iteration is less than a predefined void insertion cutoff, and then only when the current iteration is equal to the void insertion interval.

Bubble Method

In general, an optional determining 306 and the inserting 308 can be performed as part of a bubble method. A bubble method allows for the topology of the design space to be changed from the inside, as default level-set methods only allow for changes from the boundary. A location for the bubble is identified using the topology derivative, for example computed using a topology-shape sensitivity method, which relates the shape derivative to the topology derivative.

In some implementations, a bubble method is applied with the following features:

1. Position: The shape derivative of the Lagrangian is used as a proxy for the topology derivative. The shape derivative is described in more detail below, with respect to Equation 105.
2. Frequency: Bubbles are not inserted at every iteration. Instead, bubbles are inserted according to user-defined or automatically determined intervals Bubbles are not inserted after the volume reduction iterations have been completed.
3. Size: The size of an inserted bubble at a given iteration is computed according to a user-defined or automatically determined ratio Pb of the current model volume:

$$V(B_t) = \beta_b V(\Omega_t). \tag{65}$$

where $V(B_t)$ is the volume of the bubble inserted at an iteration t, and $V(\Omega_t)$ is the volume of the model at the iteration t.

4. Shape: The shape of the inserted bubble is determined based on the distribution of the topology derivative for elements of the current model, as shown below:

$$\frac{d\mathcal{L}}{d\Omega}(e_1) < \frac{d\mathcal{L}}{d\Omega}(e_2) < \cdots \frac{d\mathcal{L}}{d\Omega}(e_k) \cdots < \frac{d\mathcal{L}}{d\Omega}(e_n) \tag{66}$$

Where $e_k$ is the k-th element of the current model at a given iteration t. In some implementations, the shape of the inserted bubble is optimized while the overall size of the inserted bubbles increases over multiple iterations.

Then, the volume of elements with the lowest shape derivative are added up, until the necessary bubble volume, i.e., according to Equation 64, is reached. The resultant shape, position, and volume of the bubble $B_t$ generated at iteration t therefore satisfies the following:

$$B_t = e_1 \cup e_2 \cup \ldots \cup e_k \text{ s.t. } V(B_t) = V(e_1) + V(e_2) + \ldots + V(e_k) \tag{67}$$

Returning to FIG. 3A, after the optional determining 306 that the current iteration is less than a void insertion cutoff and is equal to a void insertion interval, one or more voids are inserted 308 into the current model. The void insertion cutoff and the void insertion interval can be predetermined, e.g., by user input or automatically determined, prior to performing 302 the numerical simulation, or prior to initiating 300 the model. The one or more voids can be inserted according to a bubble method, e.g., the bubble method described above with reference to Equations 65-67.

Figure 3C:
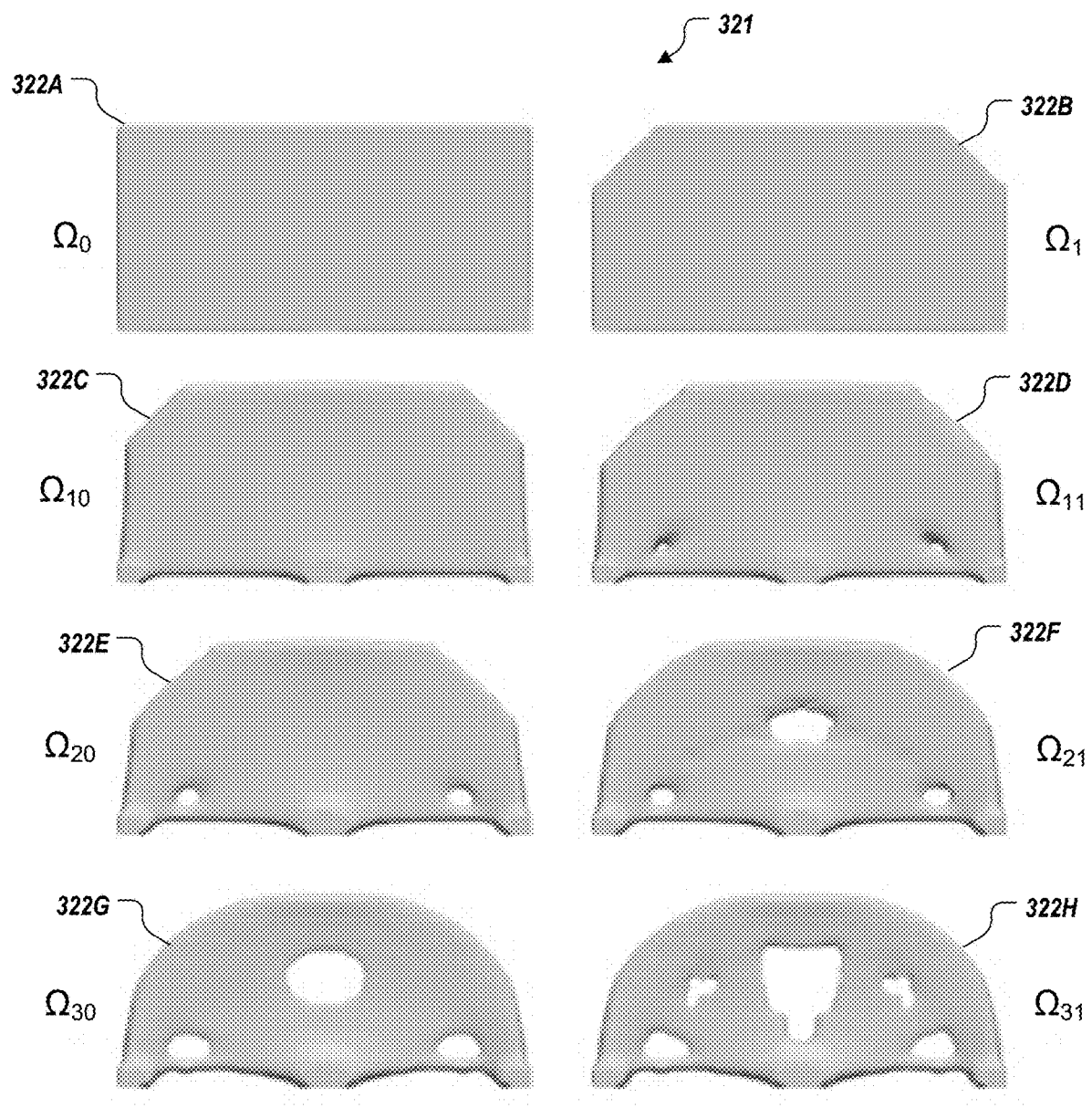
FIG. 3C shows a graphical representation of an example of a bubble insertion history for intermediate designs for a Michell type arch problem during execution of a generative design process.

FIG. 3C shows a graphical representation of an example of a bubble insertion history 321 for intermediate models for a Michell type arch problem during execution of a generative design process. Beginning with model $\Omega_0$ 322A at iteration 0, the bubble iteration history 321 includes model $\Omega_1$ 322B at iteration 1; model $\Omega_{10}$ 322C at iteration 10; model $\Omega_{11}$ 322D at iteration 11 (two bubbles inserted); model $\Omega_{20}$ 322E at iteration 20; model $\Omega_{21}$ 322F at iteration 21 (one bubble inserted); model $\Omega_{30}$ 322G at iteration 30; and model $\Omega_{31}$ 322H at iteration 31 (two bubbles inserted), with bubble insertions at t={0, 10, 20, 30}. Also in this example, the bubble volume ratio $\beta_b$ is set to 0.05, meaning that the volume of the inserted bubbles are each equal to 5 percent of the volume of the current domain, i.e., consistent with Equation 65.

Although the bubble insertion history 321 shows bubbles inserted after a first iteration, bubbles can also be inserted during the first iteration of a generative design process. In some implementations, multiple instances of a bubble method can be executed, with different initial conditions and parameters that result in different design variations. A system implementing the described techniques can provide the results of the design variations for the user to select a preferred variation. In some implementations, the system can automatically select a design variation accordingly to predetermined, e.g., user-provided, criteria.

Returning to FIG. 3A, a check 310 can be made for convergence during each iteration. To determine whether the generative design has converged to a stable solution, the check 310 can identify the condition in which all the design constraints are met and no design objectives have improved significantly since the last one or more iterations. The numerical simulation 302, update 304, any void insertion 308, and check 310 process iterates until convergence. Further, in some implementations, the iterative process ends once a check 312 shows that a predetermined number of shape modification iterations have been completed. Note that the predetermined number of shape modification iterations can be set high enough that it is essentially guaranteed that all design constraints will be met, and using the controlled convergence techniques described below with reference to FIGS. 4A-4H, it can also be essentially guaranteed that convergence to generally optimal values for any design objectives will be achieved within the predefined number of iterations, if not before.

Controlled Convergence

In a controlled convergence technique, a pre-determined time period or number of iterations is defined as the shape and topology optimization begins. For each design constraint, a target much closer to the current value for the constraint is specified for each iteration.

This can result in at least two improvements. First, a user may specify the time period or number of iterations. The convergence rates are then controlled to solve a given problem within the user-specified time period or number of iterations. Therefore, a design process using controlled convergence can arrive at a suitable solution given resource restrictions imposed by the user in how much time is allotted to generating a solution. Second, in specifying a target value for each constraint closer to the current value for the constraint, the likelihood of oscillations and radical changes can be reduced.

Figure 4A:
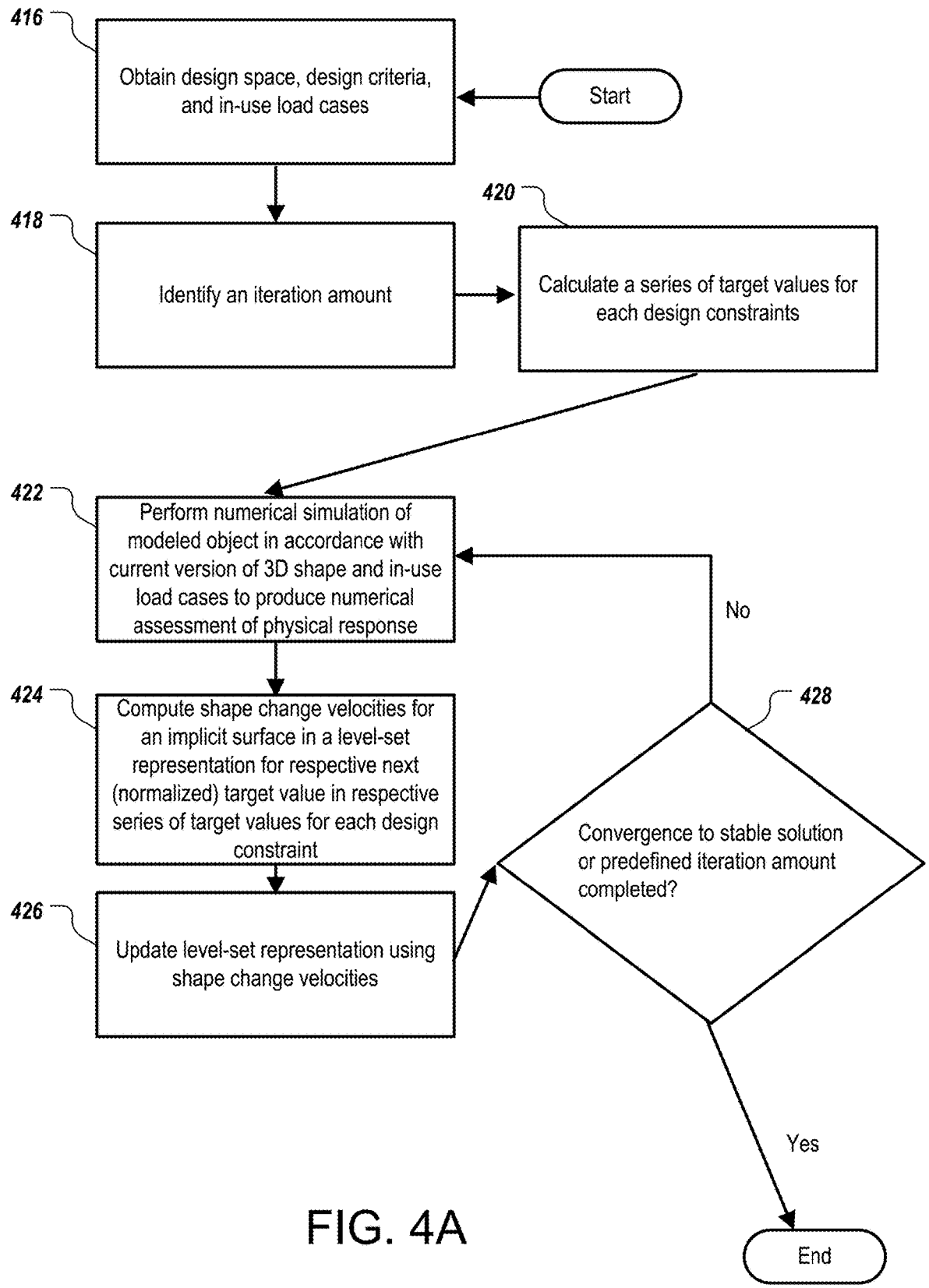
FIG. 4A shows an example of a process that generates one or more portions of a 3D model of an object to be manufactured, using one or more generative design processes implementing arbitrary constraint handling with controlled convergence.

FIG. 4A shows an example of a process that generates one or more portions of a 3D model of an object to be manufactured, using one or more generative design processes implementing arbitrary constraint handling with controlled convergence. Controlled convergence is described first, and then arbitrary constraint handling is introduced. A computer-aided design program obtains 416 a design space for a modeled object, for which a corresponding physical structure will be manufactured, one or more design criteria for the modeled object, and one or more in-use load cases for the physical structure, wherein the one or more design criteria include at least one design constraint. For example, the obtaining 416 can be done as part of the initiating 300, as described above with reference to FIG. 3A. As described above with reference to FIGS. 3B-3C, seeding techniques can be applied to the design space which can further improve the generative design process.

An iteration amount is identified 418. The iteration amount can be a time or a count of iterations from a user or calculated otherwise. A series of target values for the at least one design constraint is calculated 420 from an initial target value to a final target value, in accordance with the iteration amount and a function.

Let $g^j(s,u(s))-g_{T,n}^j=0$ j=1, ..., $n_g$ denote a sequence of constraints where $g_{T,n}^j$ is the final target value at iteration n. Define a target value for each constraint to meet in iteration t as $$g_{T,t}^j = g_{T,n}^j + \frac{N^d(\xi)}{N^d(0)}(g_0^j - g_{T,n}^j) \tag{68}$$

where $$\xi = \frac{t}{n}$$

and $N^d(\xi)$ is a B-spline of degree d computed using the recurring relationship $$Nd(\xi) = \frac{1}{d}(1-\xi)N^{d-1}(\xi) \tag{69}$$

where $N^0(\xi)=0$.

Although this description assumes the use of B-splines as the function for the calculating 420, any suitable smooth function can be used to achieve the same result. Different smooth functions include different orders of functions of the same class, e.g., B-Splines of different orders. The choice in smooth function and order of the function changes how quickly an ending design constraint target value is achieved over the identified 418 iteration amount. Other examples of smooth functions that can be used include polynomials of any order, Lagrange polynomials, and subdivision curves. In some implementations, a system implementing the described techniques can prompt a user for a plurality of reference points, and in response to receiving user-selected reference points, the system can generate a curve, e.g., using interpolation or any appropriate technique, that passes through the points.

Figure 4B:
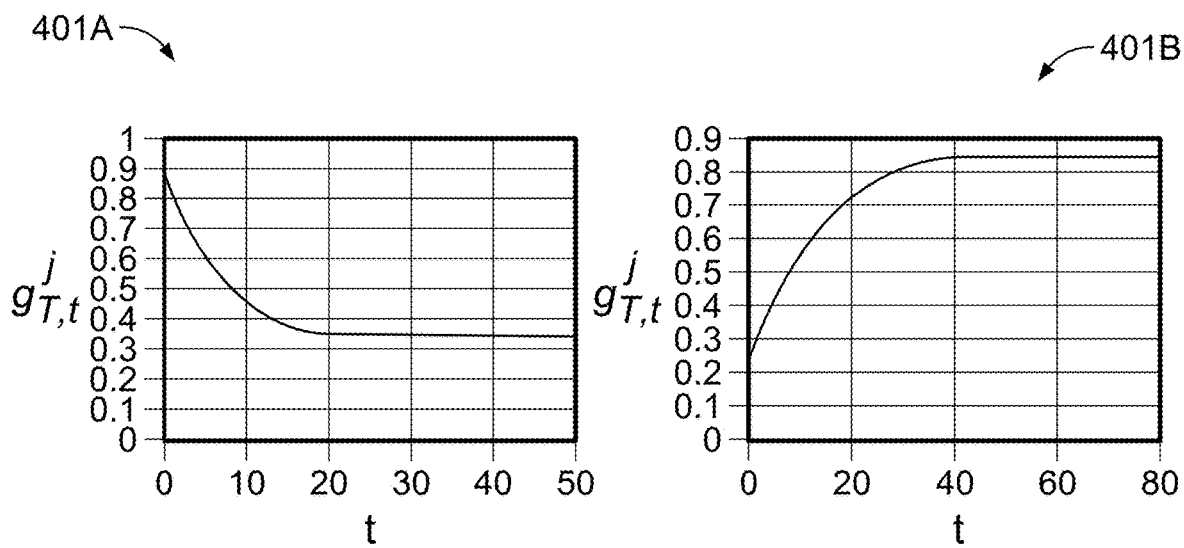
FIG. 4B shows examples of graphs tracking progressive reduction and increase of a target constraint value using B-splines, respectively.

FIG. 4B shows examples of graphs 401A, 401B tracking progressive reduction and increase of a target constraint value using B-splines, respectively. B-spline based transition from a starting value of constraint $g_0^j$ to final target $g_{T,t}^j$ is done during $t \leq n_v$ iterations. The final target value is maintained during iterations $n_v < t \leq n$. In the graphs 401A, 401B, the target value of the constraint is given by:

$$g_{T,t}^j = \begin{cases} g_{T,n}^j + \frac{N^d(\xi)}{N^d(0)}(g_0^j - g_{T,n}^j) & \text{if } t \leq n_v \\ g_{T,n}^j & \text{otherwise} \end{cases} \tag{70}$$

Note particularly that iterations are divided into two parts according to Equation 70. A first part, while the iterations are less than or equal to $n_v$, includes different target values for different iterations in that first part. In the second part, i.e., after $n_v$, the target value of the constraint at each iteration is the final target value $g_{T,n}^j$.

Graph 401A shows a constraint target $g_{T,n}^j=0.35$ from a starting constraint value of 0.9, $n_v=30$, n=50, and B-Splines of order d=4. Graph 401B shows a constraint target $g_{T,n}^j=0.85$ from a starting constraint value of 0.25, $n_v=80$, n=80, and B-Splines of order d=3. Therefore, optimization methods can be implemented with a variety of different starting and ending constraint values, as well as with different smooth functions and iteration amounts.

Approximate Volume Control

In some implementations, calculating 420 the series of target values for a design constraint includes calculating target changes in a volume fraction of the generatively designed three dimensional shape. Some constraints may have a shape gradient or shape derivative that is not well defined, approximate, or not defined at all. In these cases, a proxy shape derivative can be calculated to improve accuracy and exert more control.

Using a constant value it for all optimization iterations would result in converging to a final volume which depends on the relative magnitude it to velocity v, the latter of which depends on the boundary value problem, given by:

$$-\nabla \cdot D \in (u) = f \text{ in } \Omega \tag{71}$$

$$u = 0 \text{ on } \Gamma_D \tag{72}$$

$$D \in (u) = \bar{t} \text{ on } \Gamma_N \tag{73}$$

where $\Omega$ is the domain for a solid body, D is the fourth order constitutive tensor of the solid body, u is the displacement vector, f is the external load vector, $\bar{t}$ is the prescribed traction on the Neumann boundary $\Gamma_N$ with the outward normal n. For simplicity, only homogeneous Dirichlet boundary conditions are assumed on $\Gamma_D$. Instead, a variable value $\mu_t$ can be used such that a volume target $V_{T,t}$ is achieved during iteration t of the topology optimization. Let $V_{t-1}$ denote the volume after the (t−1)th iteration. The desired volume change during iteration t reads:

$$\Delta V_t = V_{T,t} - V_{t-1}. \tag{74}$$

This volume change can be approximated by $$\Delta V_t \approx T \int_\Gamma a(v_{se} + \mu) d\Gamma \tag{75}$$

where $a \in \{0,1\}$ is the advection mask and T is the time step used in solving the Hamilton-Jacobi equation. Note that the approximation error reduces to zero when smaller time steps are used:

$$\lim_{T \to 0} \Delta V_t - T \int_\Gamma a(v_{se} + \mu) d\Gamma = 0. \tag{76}$$

The maximum time step is bounded by the Courant-Friedrichs-Lewy (CFL) condition $$T \leq \frac{C \Delta s}{|v|\max} \tag{77}$$

$$T = \frac{m_t C \Delta s}{|v|\max} \text{ with } 0 \leq m_t \leq 1$$

where C is a constant, $\Delta s$ is the voxel size and $|v|_{max}$ is the maximum magnitude of advection velocity, given by $$v = -(2u \cdot f - D \in (u) : \in (u) + \mu \tag{78}$$

where variables are defined as they are in Equations 71-73.

Let $v_u$, $v_l$ denote the bounds of $v_{se}$ such that $v_l \leq v_{se} \leq v_u$. The maximum velocity magnitude is now given by $$|v|_{max} = v_u + \mu \geq |u_l + \mu| \tag{79}$$

$$|v|_{max} = -(v_l + \mu) \geq |u_u + \mu| \tag{80}$$

$$|v|_{max} = -(v_u + \mu) \geq |u_l + \mu| \tag{81}$$

$$|v|_{max} = v_l + \mu \geq |u_u + \mu| \tag{82}$$

Substituting the values for $|v|_{max}$ and T in Equation 76 yields:

$$\mu \approx \frac{\int \Gamma_{av_{se}} d\Gamma - A v_u}{A - \int \Gamma a d\Gamma} \text{ if } v_u + \mu \geq |u_l + \mu| \tag{83}$$

$$\mu \approx \frac{\int \Gamma_{av_{se}} d\Gamma + A v_l}{A + \int \Gamma a d\Gamma} \text{ if } -(v_l + \mu) \geq |u_u + \mu| \tag{84}$$

$$\mu \approx \frac{\int \Gamma_{av_{se}} d\Gamma + A v_u}{A + \int \Gamma a d\Gamma} \text{ if } -(v_u + \mu) \geq |u_l + \mu| \tag{85}$$

$$\mu \approx \frac{\int \Gamma_{av_{se}} d\Gamma - A v_l}{A - \int \Gamma a d\Gamma} \text{ if } v_l + \mu \geq |u_u + \mu| \tag{86}$$

$$A = \frac{\Delta V_t}{m_t C \Delta s}.$$

Note that the number of different cases for $\mu$ simplifies to Equations 83 and 84 when the body force term is zero in Equation 78 (f=0). This results in the strain energy component of the velocity being positive, i.e., $v_u$, $v_l \in R^+$, resulting in the maximum velocity magnitude being confined to either Equation 83 or Equation 84. The upper bound on $m_t$ in Equation 77 implies that a value cannot be found for an arbitrary high volume change $\Delta V_t$.

Figure 4C:
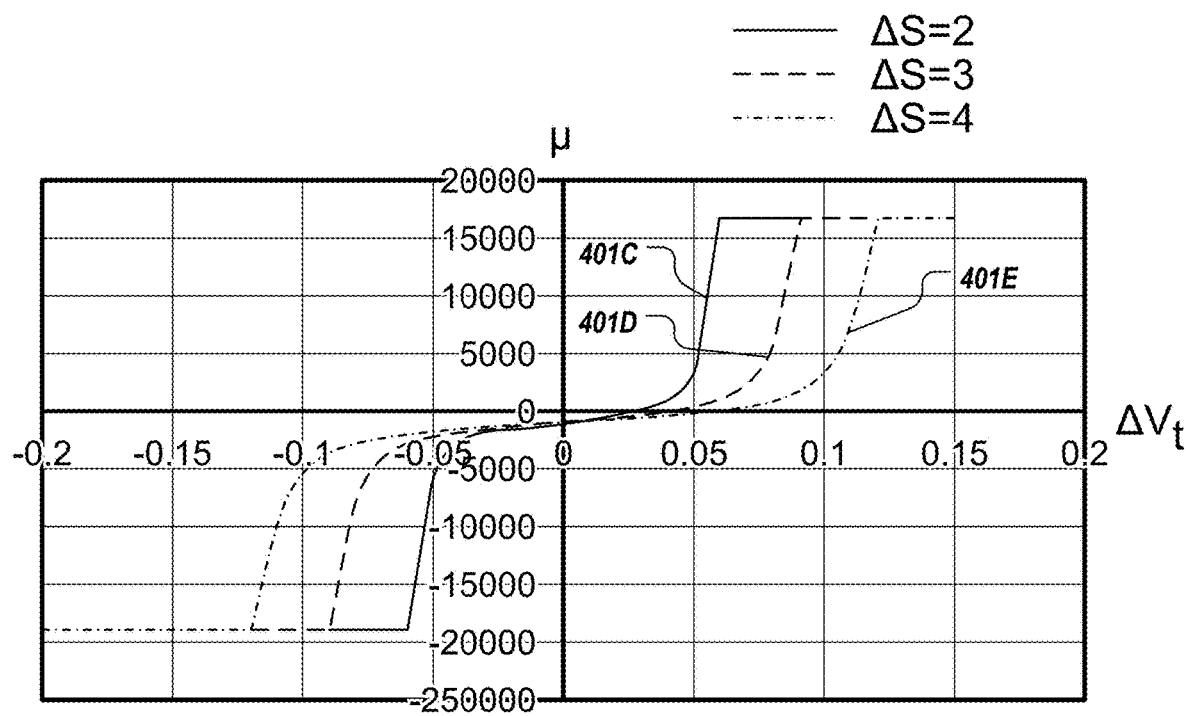
FIG. 4C shows a graphical representation of example variations of a value µ with a target volume change given different voxel sizes.

FIG. 4C shows a graphical representation of example variations of a value $\mu$ with a target volume change $\Delta V_t$ given different voxel sizes $\Delta s$. Curve 401C corresponds to a voxel size of 2, curve 401D corresponds to a voxel size of 3, and curve 401E corresponds to a voxel size of 4. In these example variations, the upper/lower bounds of $\mu$ are found using a bisection algorithm. Essentially, the upper/lower bound is initiated at $(0+\Delta V_t)/2$ and successively iterated until a valid $\mu$ is found from Equations 83-86 that satisfies the corresponding assumption in Equations 79-82. Alternatively, an advection time that violates the CFL condition may be used while using multiple advection steps, i.e., set $T=1/|v|_{max}$ and compute $\mu$ from $$\mu = \frac{\frac{\Delta V_t}{T} - \int \Gamma_{av_{se}} d\Gamma}{\int \Gamma a d\Gamma} \tag{87}$$

In this way, the volume derivative can be used as a proxy shape derivative for many optimization constraints, such as stress, fatigue safety factor, buckling safety factor, and displacement. As described below, accurate volume control can be achieved using adaptive controllers, including PID controllers.

Returning to FIG. 4A, the computer-aided design program iteratively modifies a generatively designed three-dimensional shape of the modeled object in the design space in accordance with the one or more design criteria and the one or more in-use load cases for the physical structure. The iteratively modifying includes performing 422 numerical simulation, computing 424 shape change velocities, and updating 426 level-set representation(s) using the shape change velocities. The modification of the three-dimensional shape can include modification of both a geometry of the 3D shape, as well as a topology of the 3D shape. The numerical simulation is performed 422, for example, as described above with reference to FIG. 3A. The performing 422 includes performing numerical simulation of the modeled object in accordance with a current version of the three dimensional shape and the one or more in-use load cases to produce a current numerical assessment of a physical response, e.g., a structural response, of the modeled object.

The computing 424 includes computing shape change velocities for an implicit surface in a level-set representation of the three dimensional shape in accordance with the respective next (e.g., normalized) target value in a respective series of target values calculated 420 for each design constraint. In some implementations, the techniques described can be applied to density-based methods, like SIMP. The target values can be normalized, the techniques for which are described below. The series of target values begins with the initial target value and ends with a final target value for the design constraint. As described above with reference to FIG. 4B and Equation 70, during a first part of the iterations (up to $n_v$), the target values are calculated 420 from a smooth function, e.g., a B-Spline. When the iteratively modifying passes $n_v$, the next target value used in the computing 424 is the final target value for the respective design constraint.

Volume Control Using Adaptive Controllers, Including Proportional-Integral-Derivative (PID) Controllers Next, accurate volume control using adaptive controllers is discussed.

In general, an adaptive controller is a technique for providing feedback to continuously compute an error value between a desired value and a measured value, and then applying a correction to some control parameter. A Proportional-Integral-Derivative (PID) controller is a type of adaptive controller that continuously computes an error value between a desired value and a measured value, based on proportional, integral, and derivative terms of the value to some control parameter. Different parameters that effect shape changes (e.g., the relative contribution of a particular constraint gradient) can be controlled using PID controllers. During the iteratively modifying, the proportional, integral and derivative components of the PID controller are adjusted to slow or speedup shape changes implicitly by applying varying amount of control on the controlled parameters in response to an oscillation in the generatively designed three dimensional shape.

The PID components of the PID controller are also adjusted to effect a first level of increase in the measured value in response to repetition of success or failure to satisfy the normalized next target value of the measured value. Increases and reductions to the components can be made using a multiplier value that is based on the average deviation of the measured value of the component from the target value. For example, the multiplier can be 1+abs(deviation). As described below, a PID controller can be used to accurately correct for the target volume of the model for each iteration of an optimization process, including a process implementing controlled convergence.

For convenience, the description below will reference volume fractions denoted by $V_{T,t}^f$, $V_t^f$ to indicate target volume fraction and actual volume fraction at the end of iteration t, respectively.

$$V_{T,t}^f = \frac{V_{T,t}}{V_o} \tag{88}$$

$$V_t^f = \frac{V_t}{V_o}.$$

where $V_0$ denotes the volume of the design space.

Given a maximum number of iterations n and a target final volume fraction $V_{T,n}^f$, the target volume fraction for each iteration can be computed using a controlled convergence process described above with reference to Equation 68:

$$V_{T,t}^f = V_{T,n}^f + \frac{N^d(\xi)}{N^d(0)}(V_{T,0}^f - V_{T,n}^f) \tag{89}$$

Next, the value for μ is computed (Equations 83-86) to achieve this volume target for every iteration. Notice that an error between the desired and actual volume fractions $V_{T,t}^f - V_t^f$ remains at the end of each process. This is caused by the approximation in Equation 75 which leads to an error of magnitude $V_{T,t} - V_t$ after iteration t. Note that this error is already accounted for in Equation 74 when computing the volume change for iteration t+1 which is the sum of volume change for the next iteration and the error from the previous iteration $$\Delta V_{t+1} = (V_{T,t+1} - V_{T,t}) + (V_{T,t} - V_t) = V_{T,t+1} - V_t. \tag{90}$$

However, in some cases, this is not sufficient to achieve a prescribed volume target. Therefore, PID controllers are used.

Figure 4D:
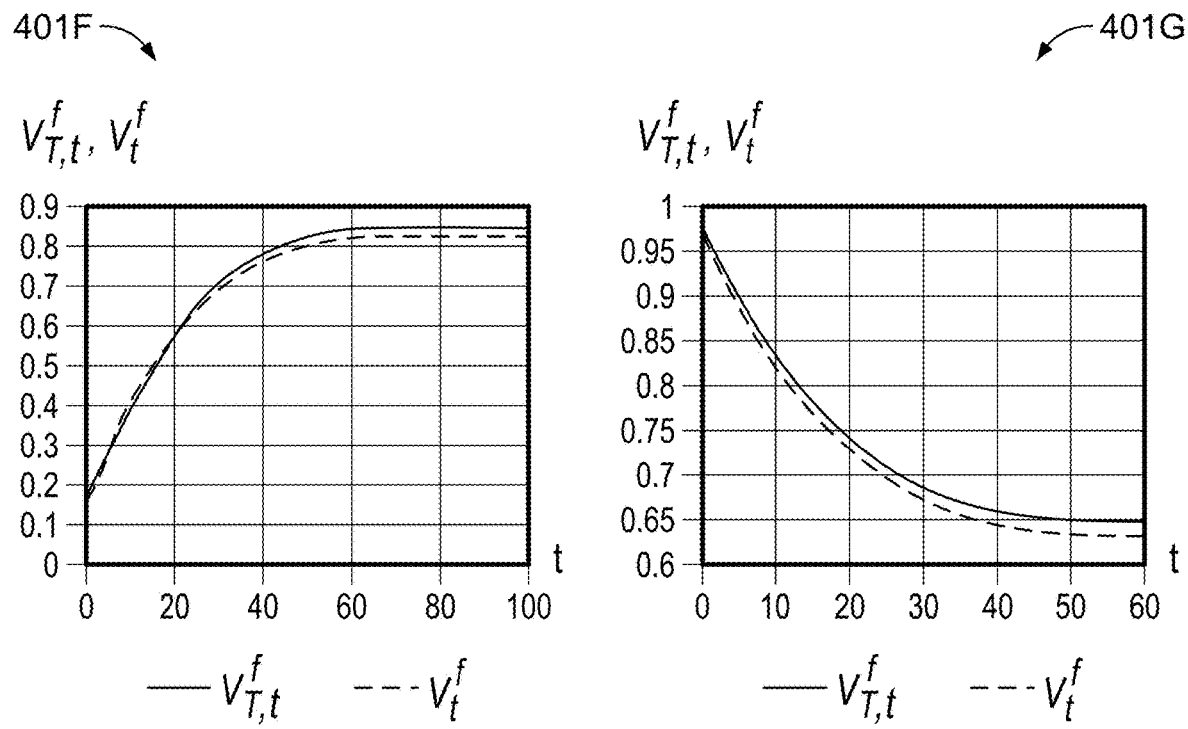
FIG. 4D shows examples of graphs tracking target volume versus actual volume fraction during an iterative optimization process with approximate volume control and without adaptive control.

FIG. 4D shows examples of graphs 401F, 401G tracking target volume versus actual volume fraction during an iterative optimization process with approximate volume control and without adaptive control. Graph 401F shows discrepancies between a target and actual volume for a modeled object as the volume is increased over a number of iterations. Graph 401G shows discrepancies between a target and actual volume for a modeled object as the volume is reduced over a number of iterations. In both cases, the target volume and the actual volume do not coincide, and the error can grow larger over longer iterations, with potentially disastrous results.

To address this issue, an adaptive, e.g., PID, controller can be used to adjust the volume target for each iteration, to maintain better control over volume changes. Define the error in volume fraction (between actual and target volume) at iteration t as follows:

$$e_t^V = V_{T,t}^f - V_{t-1}^f.$$

The target volume for iteration t is now computed by $$\Delta V_t = V_0 \left( K_p e_t^V + K_i \int_0^t e_\tau^V d\tau + K_d \frac{de_t^V}{dt} \right) \tag{92}$$

$$= V_0 \left( K_p e_t^V + K_i \int_0^t e_\tau^V d\tau + K_d (e_t^V - e_{t-1}^V) \right)$$

where $K_p, K_i, K_d \in R^+$ are the PID parameters. Note that the PID controller is applied on target volume fraction change instead of target volume, to ensure the PID parameters are not dependent on initial domain volume. Unless otherwise stated, $K_p=1$, $K_i=0.1$, $K_d=0.1$ are used hereafter. For simplicity, such PID controllers will be denoted as follows hereafter where the subscript t is dropped for clarity:

$$\Delta V_t = \int PID(e_t^V) \tag{93}$$

Figure 4E:
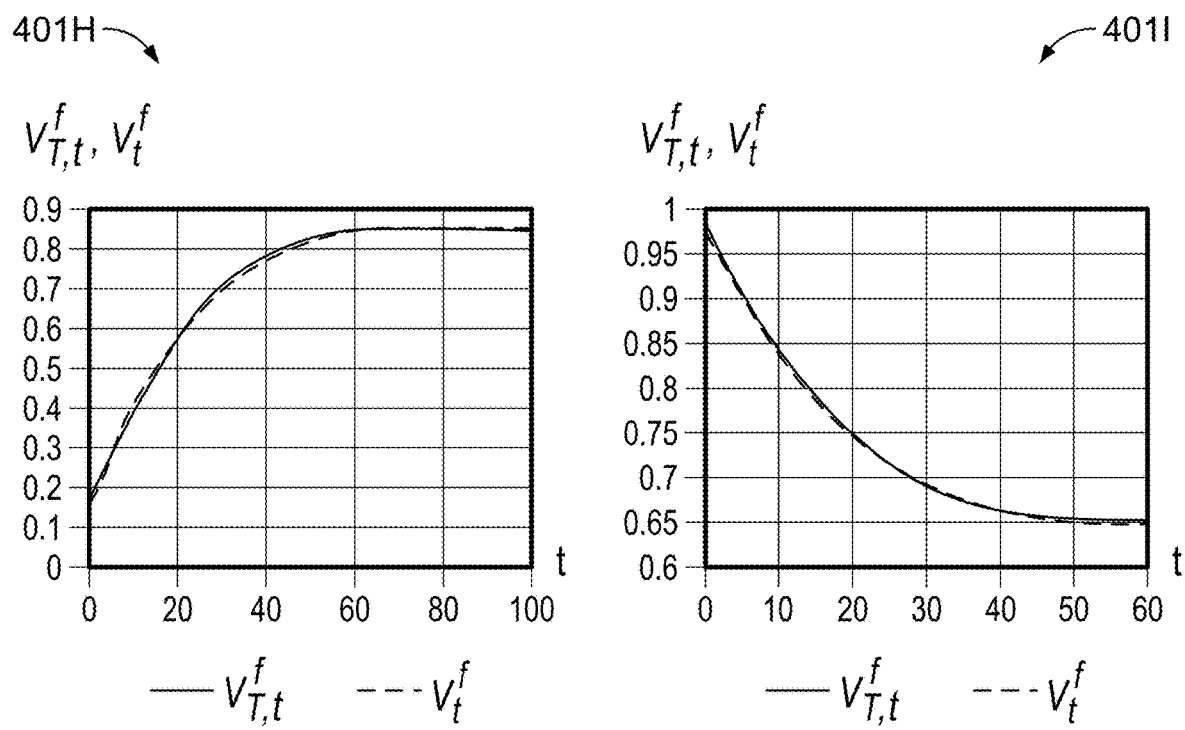
FIG. 4E shows examples of graphs tracking target volume versus actual volume fraction during an iterative optimization process with PID control (but without adaptive PID control).

FIG. 4E shows examples of graphs 401H, 401I tracking target volume versus actual volume fraction during an iterative optimization process with PID control (but without adaptive PID control, as described below). Graph 401H shows the positive volume case (in which volume is added to the model with subsequent iterations), while graph 401I shows the negative volume case (in which volume is subtracted from the model with subsequent iterations). In both cases, the target volume and the actual volume track closely, with the error being smaller than the same optimization performed without a PID controller, as described above with reference to FIG. 4D.

The end result of this process is applying control over a response parameter $e_t^V$, based on variations of a control parameter $\Delta V_t$. In addition, volume control using PID controllers, and adaptive controller techniques in general, can be applied in combination with all of the other systems and techniques described in this document, including for handling arbitrary equality and inequality constraints, described below, and in combination with the various other shape and topology optimization techniques described in connection with FIGS. 5A-8C.

Adaptive PID Tuning

In some implementations, to provide good control for a broad range of design problems, the $K_p$, $K_i$, $K_d$ parameters in an adaptive, e.g., a PID controller are modified in response to controller behavior, by applying a multiplier equal to the average deviation of the iteration result from target. Three key controller statuses monitored for can be:

Oscillations: Oscillations are defined as occurring when, during the observed time period, there exist more than 2 pairs of consecutive success and failure.

Repeat failure or success: A success or failure is considered repeated if it occurs over a number of iterations equal to some predetermined threshold, e.g., 10%, of the specified maximum iterations.

Repeat excessive failure or success: A success or failure is deemed excessive if the relative error between it and the target exceeds the predetermined threshold, e.g., 10%.

PID control theory indicates that the integral term should be used to reduce systematic error, while the derivative term should be used to dampen oscillations. The proportional term guides the speed of convergence. In practice, it is often found the derivative term can be hard to adjust and in fact contribute to oscillatory behavior (a phenomenon known as "derivative kick").

Figure 4F:
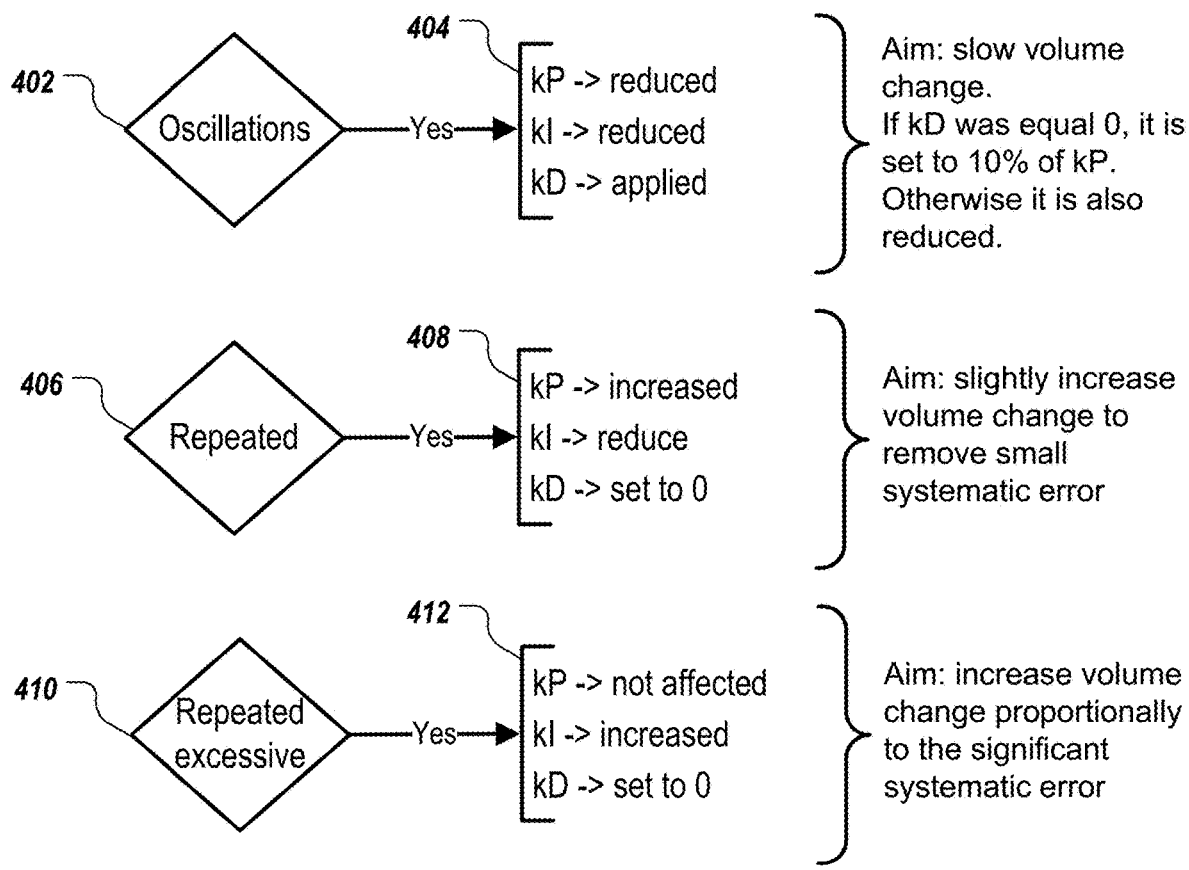
FIG. 4F shows an example of a process of adaptively modifying parameter values for a PID controller.

FIG. 4F shows an example of a process of adaptively modifying parameter values for a PID controller. If oscillations are determined 402, then the proportional and integral terms are reduced. The derivative term is set to a percentage of the proportional term if it is currently at zero, otherwise it is also reduced 404. An aim of these changes is to slow volume change. If repeated success or failure is determined 406, then the proportional term is increased, the integral term is reduced, and the derivative term is set to zero 408. An aim of these changes is to slightly increase volume change to remove small systematic error. If repeated excessive failure or success is determined 410, then the proportional term is not affected, the integral term is increased, and the derivative term is set to zero 412. The aim in this situation is to increase volume change proportionally to the significant systematic error.

For the newly adjusted parameters to take effect, a normal status can be applied for a set number of iterations after the adjustment. Similarly, periods accounted for in the determination of controller statuses can be modified to avoid overcompensation. In some implementations, the design problem is allowed to converge rapidly in the initial optimization stages. Hence, during that interval, only the oscillatory status is adapted for and all others are effectively ignored by the adaptive process.

Therefore, returning to FIG. 4A, as part of the computing 424, the proportional, integral and derivative components of an adaptive controller, e.g., a PID controller can also be adjusted to effect a second level of increase in shape changes in response to the repetition of success or failure having a relative error with respect to the next (e.g., normalized) target value that exceeds a threshold. In this example, the second level of increase in shape changes is greater than the first level of increase in shape changes.

An adaptive controller can also be implemented using any appropriate machine learning technique for predicting changes to a control parameter in response to one or more inputs. For example, a controller can be implemented as a neural network having a plurality of neural network layers. The neural network can include an input layer that receives one or more inputs, and an output layer that outputs a change to a control parameter in response to the inputs. The neural network can include one or more hidden layers between the input and output layer, each hidden layer applying one or more non-linear functions to a received input at the layer, where the functions are weighted according to learned parameter values.

An adaptive controller implemented as a neural network can be trained according to any appropriate supervised learning technique. In the case of supervised learning, a controller can be trained on a training data set that includes inputs to a PID controller paired with output changes to the Proportional, Integral, and Derivative changes of the constraint value in response to the input. The training data can include a subset of all input-output pairs generated from a PID controller, e.g., the previous N iterations where N is some pre-defined value. The training data can be further modified, e.g., with random oscillations or other variations added.

As described below with reference to Arbitrary Equality and Inequality Constraints, a separate adaptive controller can be implemented for each constraint. In some implementations, the adaptive controller can be implemented as a neural network or other machine learning model that receives, as input, the generated constraint change from each PID controller, and generates, as output, a final volume change considering all constraints. In implementations in which a single machine learning model is used, the training data for training the model can include a subset of input-output pairs, as described above, over a number of iterations, with or without random perturbations.

The adaptive controller can be trained to generate constraint values or a final volume change according to additional inputs besides the proportional, integral, and derivative terms. For example, the additional inputs can be from the topology optimization process, such as features extracted from the current shape of the part being designed for, or features of current stress, strain, and displacement results for the part. An adaptive controller can receive these additional inputs to learn parameter values to generate more accurate controlled values or final shape changes and further stabilize the optimization process.

The adaptive controller can be further trained in response to new test cases and design requirements. Additional training can be done offline, in real-time, or a combination of the two. For example, if a specific optimization task does not converge or is not stable, multiple instances of the optimization process can be run for all test cases but for different controller settings, e.g., different model parameter values weighting the machine learning model, different hyperparameter values, e.g., learning rate, batch size, etc., or both. The settings of the instance with the best performance, e.g., according to some performance metric, can be used in an adaptive controller and corresponding optimization process for producing the final design. The multiple instances can be run offline, e.g., when the number of test cases is small, or adapted online during the optimization process.

Although neural networks are given as an example machine learning technique for implementing adaptive controllers, any suitable technique can be used, e.g., fuzzy logic or any appropriate type of regression model. Moreover, adaptive controllers, as described in this document, can also have one or more extra inputs (other than just a measure of error) that provide more information about the trend and current state of the optimization process Constraint Normalization During Topology Optimization.

Controlled convergence can be combined with normalization of the constraint values, as described above in reference to the computing 424 of FIG. 4A. The constraint values can have different orders of magnitude, resulting in ill-conditioned optimization problems and gradients that do not exist or are very difficult to implement for complex constraints. For example, the starting value of the fatigue safety factor may be about 10,000, while the target value may be 1. In such situations, the sensitivity of the gradient diminishes as the solution nears the target and a final value of 10 (which has an error of 9/10000 with respect to the starting value) may be deemed acceptable due to the relatively small error. A moving reference value, as described below in the Normalization Algorithm, ameliorates the problem.

Normalization Algorithm

---

Input: $t_i$, t, n, $g_{T,n}$, $T_k$, $T_i$, $K_{th}$, $K_{cur}$, $K_g$
Output: $g_{ref,t}$
// initiate or update reference in every iteration t
1: if t = 0 then
    // initiate reference value
2: $\quad g_{ref,0} = \begin{cases} |g_0 - g_{T,n}| & \text{if } |g_0 - g_{T,n}| \neq 0 \\ 1 & \text{otherwise} \end{cases}$ 3: else
    // check if end of inner loop iteration
4: $\quad$ if $t_i \leq T_i$ and $n - t \leq T_i$ then
        // compute moving average for some fixed history length $T_k$ -continued 5: $$g_{avg,t} = \sum_{k=1}^{T_k} \frac{g_{t-k}}{T_k}$$

```
        // define threshold from moving average
 6:     Δ g_th = K_th |g_avg,t - g_T,n|
        // define the threshold from current difference
 7:     Δ g_cur = K_cur |g_i - g_T,n|
        // define the min/max allowable change in the reference value
 8:     Δ g_ref = K_g g_ref,t-1
        // count the number of oscillations (n_O) during the past t_i
        iterations
 9:     if n_O > 0 then
            // increase reference value
10:         g_ref,t = max{g_ref,t-1, min{Δ g_th, g_ref,t-1 +Δ g_ref}}
            // reset inner loop
11:         t_i = 0
12:     else if g_ref,t-1 >Δ g_th then
            // check if converged and decrease reference value
13:         g_ref,t = min {g_refint-1, max{Δ g_th,Δ g_cur, g_ref,t-1 -Δ g_ref}}
            // reset inner loop
14:         t_i = 0
15:     else if Δ g_cur > g_ref,t-1 then
            // check if excessive violation and increase reference value
16:         g_ref,t = max {g_ref,t-1, min{Δ g_th,Δ g_cur}}
            // reset inner loop
17:         t_i = 0
18:     else
            // increment inner loop iteration
19:         t_i ← t_i + 1
20:     end if
21: else
        // increment inner loop iteration
22:     t_i ← t_i + 1
23: end if
24: end if
```

Some features of the Normalization Algorithm are noted, as follows.

The reference value $g_{ref,t}$ should not be updated in every iteration. Sufficient time should be allowed for the constraint to stabilize after setting a new reference. This is achieved using the notion of an inner loop iteration (lines 3-22 of the Normalization Algorithm). The maximum length of inner loop iterations is given by $T_i \in \mathbb{Z}^+$ which can be dynamically adjusted for every design problem, for example, adjusted such that there are at least 6 inner loop iterations with a lower bound of 5 on the inner loop length.

The threshold $\Delta g_{th}$ used to determine if the existing reference is too far from the current value is computed using a multiplier $K_{th} \in \mathbb{R}^+$, e.g., 20, of the moving average of the constraint value. The length of the moving average computation is given by $T_K \in \mathbb{Z}^+$, e.g., 10. The threshold is increased if oscillations are detected during the last inner loop, otherwise it is reduced when the current reference value is above the threshold.

Any change to the reference value is bounded by a maximum change $\Delta g_{th} = K_g g_{ref,t-1}$ computed using a ratio $0 < K_g \leq 1$ of the existing value, e.g., 0.6. Any reduced reference value should also be larger than a multiplier of the current violation $|g_i - g_{T,n}|$. An example of the multiplier is given by $K_{cur} = 1.2$.

Figure 4G:
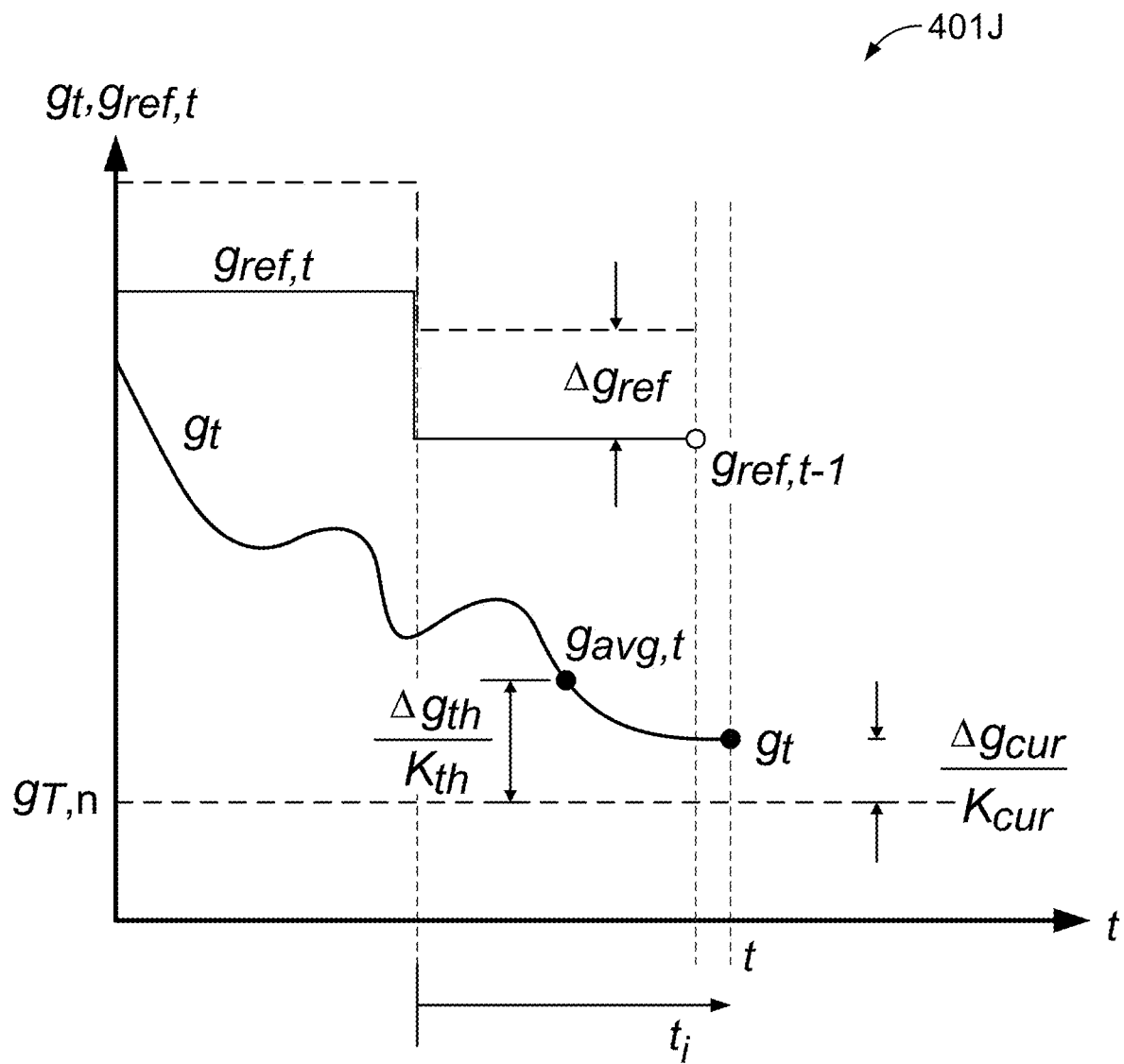
FIG. 4G shows an example of a graph that tracks different measures used in constraint normalization.

FIG. 4G shows an example of a graph 401J that tracks different measures used in constraint normalization, as detailed in the Normalization Algorithm and as described immediately above. Specifically, the graph 401J shows how the reference value $g_{ref,t}$ is updated over time as the constraint value approaches the next target value. The final target value is $g_{T,n}$, while $g_t$ represents the current value of the constraint as it approaches the final target value $g_{T,n}$ oscillating over time. The reference value $g_{ref,t}$ is larger than both the current and final value for the constraint, and does not change with each iteration. The reference value is adjusted over time, approaching the final target value without crossing the current target value.

In some implementations, a value computed from the Normalization Algorithm can be assigned to a target reference value $\tilde{g}_{ref,t}$ and an adaptive controller (e.g., a PID controller as described above with reference to FIGS. 4D-4F) can be used to enable a smooth transition of the applied reference $g_{ref,t}$, in situations in which sudden changes of the reference value might otherwise occur at the start of each inner loop iteration of the Normalization Algorithm. One example application is as follows, for a given iteration t:

$$\Delta \tilde{g}_{ref,t} \times \tilde{g}_{ref,t} - g_{ref,t-1}.$$

$$g_{ref,t} \leftarrow g_{ref,t} + f_{PID}(\Delta \tilde{g}_{ref,t}). \tag{94}$$

Arbitrary Constraint Handling

Arbitrary Constraint Handling is a general method that can be applied to any type of optimization constraint, even when exact shape derivatives are not available. Whether proxy or actual shape derivatives are implemented, more accuracy and control can be achieved over the generative design process.

Arbitrary Equality Constraints

Consider an equality constraint of type $g(\Omega, u(\Omega))=0$ in an optimization problem where compliance minimization is used as the objective function. In the absence of a shape derivative $$\frac{dg}{d\Omega},$$

the conventional practice in industry is to optimize while monitoring g and to terminate optimization when $g \approx 0$. This implies that the end result is an un-converged solution with a lack of control as the solution approaches zero as $g \to 0$.

However, adaptive controllers can be used to enforce equality constraints, without shape derivatives. Let $g^i(\Omega, u(\Omega))|j=1, \ldots, n_g$, denote a sequence of equality constraints that have been normalized as described above (e.g., using the Normalization Algorithm, above) such that $g^j(t) \in [0,1]$ $\forall t$. Consider the normalized error of each constraint, which can be used to define the error in the constraint for each iteration in a manner similar to Equation 91:

$$e_t^j = \frac{g_{t-1}^j - g_{T,t}^j}{g_{ref}^j}. \tag{95}$$

This can be substituted in Equation 93 to approximate the volume change needed to satisfy constraint $g_j$ in iteration t:

$$\Delta V_t^j \approx I^j f_{PID}(e_t^j). \tag{96}$$

where $I^j = -1$ when the constraint is inversely related to the volume change and $I_{g_j} = 1$ otherwise. Control is effectively applied over $\Delta_t^j$ to achieve a desirable outcome of the response parameter $e_t^j$. When multiple constraints are present, each constraint would recommend a different volume change needed to satisfy the constraint. The constraints are grouped into positive and negative values:

$$V_t^+ := \{x | x = I^j f_{PID}(e_t^j), x > 0, j=1, \ldots, n_g\}.$$

$$V_t^- := \{x | x = I^j f_{PID}(e_t^j), x > 0, j=1, \ldots, n_g\}. \tag{97}$$

Then, the single volume change applied in this iteration can be computed with $$\Delta V_t = \begin{cases} \max(V_t^+) & \text{if } V_t^- = \emptyset \\ \min(V_t^-) & \text{if } V_t^+ = \emptyset \\ \dfrac{avg(V_t^+ \cup V_t^-)}{2} & \text{if } V_t^- \neq \emptyset \text{ and } V_t^+ \neq \emptyset \\ 0 & \text{otherwise} \end{cases} \quad (98)$$

The μ value in the shape derivative for volume control for any non-zero $\Delta V_t$ can be applied following the method described above for approximate volume control, with reference to Equations 71-87.

Arbitrary Inequality Constraints

The techniques described above with reference to arbitrary equality constraints and Equations 95-98 result in the volume change converging to zero as the constraint becomes satisfied, i.e., $\Delta V_t^j \to 0$ as $e_t^j \to 0$. When inequality constraints are used, this causes a potential problem as inequality constraints can be satisfied with $\Delta V_t^j \neq 0$. Therefore, when inequality constraints are used, a slack variable called an importance factor can be used to manage relative contribution of each violated constraint. An importance factor can mitigate uncontrolled changes in convergence and constraints interfering with the minimization objective when all constraints are given equal importance. The importance factor regulates the relative importance of different constraints during different iterations of the generative design process.

Let $p_t^1, \ldots, p_t^{n_g} \in \mathbb{R}^+$ denote the importance factor of each constraint, Equation 96 can be modified as follows:

$$\Delta V_t^j \approx p_t^j l^j f_{PID}(e_t^j) \quad (99)$$

where the applied importance factor is computed using predetermined, e.g., user-provided, importance factors $\tilde{p}^j$ as follows:

$$p_t^j = \frac{\tilde{p}^j}{\max_{k=0}^{n_g} s_t^k \tilde{p}^k} \quad (100)$$

where $s_t^k = 1$ if the inequality constraint $g^k$ is violated at iteration t, otherwise $s_t^k = 0$. At each iteration, the applied importance factor is updated according to the sign of $s_t^k$ of all constraints. This allows constraint violations to impact the applied importance factor and hence, the volume change $\Delta V_t$.

To prevent sudden changes to $i_t^j$ due to the change of status of constraint from violated to non-violated, and vice versa, a PID controller can be used, e.g., as described above with reference to Equations 96 and 97 and FIGS. 4D-4F, to stabilize the change in importance factor, as follows:

$$\Delta p_t^j = p_t^j - p_{t-1}^j$$

$$p_t^j \leftarrow p_t^j + f_{PID}(\Delta p_t^j). \quad (101)$$

Complex generative design problems can be solved according to a combination of the techniques described above, e.g., with controlled convergence, a combination of inequality and equality constraints, and using PID controllers.

Modified Augmented Lagrangian Method for Constraint Handling

The augmented Lagrangian algorithm introduced with reference to Equations 28-30 can be modified as follows to accommodate constraint handling for arbitrary equality and inequality constraints, as described above.

Controlled convergence: The classical augmented Lagrangian method computes the constraint violation term $e^j$ as the difference between the current value of the constraint and the final value, e.g., as follows:

$$e^j(\Omega, u(\Omega)) = \frac{g^j(\Omega, u(\Omega)) - g_T^j}{g_{ref}^j} \quad (102)$$

Controlled constraint convergence is applied as described above, e.g., with reference to FIGS. 4B-4C. Some constraints may converge earlier than others, therefore the amount of changes being made to the design can be gradually reduced, i.e., large changes made during the initial phase with progressively smaller changes later.

Constraints without shape derivatives: Although the shape derivatives for many objectives and constraints can be mathematically computed using the adjoint method (Equations 14-25), implementation of the adjoint method in a commercial finite element solver can be a difficult task. Additionally, sometimes optimization constraints can be assessed by black-box evaluators provided by users. Therefore, proxy shape derivatives can be used following the techniques described above, e.g., with reference to Arbitrary Constraint Handling and FIGS. 4B-4E.

Precise Volume Control: Precise control of volume is often quite important for obtaining a good design output from complex engineering examples. The μ calculation methods introduced above with reference to Approximate Volume Control, Volume Control using Adaptive Controllers, and Equations 71-93 can be integrated into the augmented Lagrangian method, while further enhancing the accuracy using a line search algorithm.

First, constraints can be placed into two groups $\mathcal{G}_v$, $\mathcal{G}_{nv}$ where the former contains all constraints that are affected by volume changes, and the latter contains constraints that are not, e.g., min/max thickness or centroid constraints. The shape derivative from the augmented Lagrangian method is then modified as follows:

$$\frac{d\mathcal{L}}{d\Omega} = \frac{d\mathcal{J}}{d\Omega} + \mu^* \Sigma_{g^j \in \mathcal{G}_v} (\mu^j + \lambda^j e^j) \frac{dg^j}{d\Omega} + \sum_{g^j \in \mathcal{G}_{nv}} (\mu^j + \lambda^j e^j) \frac{dg^j}{d\Omega} \quad (103)$$

where the constraint error $e^j$ is computed using a PID stabilized version of Equation 95 with the importance factor term from Arbitrary Inequality Constraints, described above with reference to Equations 99-101:

$$e_t^j = p_t^j f_{pid}\left(\frac{g_{t-1}^j - g_{T,t}^j}{g_{ref,t}^j}\right) \quad (104)$$

When the shape derivative $dg^j/d\Omega$ is unavailable, it may be approximated using a suitable proxy shape derivative. For example, any such constraint from the set $\mathcal{G}_v$ may be approximated using the volume shape derivative as follows:

$$\frac{dg^j}{d\Omega} \approx l^j \frac{dV}{d\Omega} = l^j 1 \quad (105)$$

where $I^j=-1$ when the constraint is inversely related to the volume change and $I_{g_i}=1$ otherwise. Note that the derivative of the volume in the normal direction is unity.

Next, $\mu^*$ is computed using the concepts described above with reference to Approximate Volume Control, Volume Control using Adaptive Controllers, and Equations 71-93. A target volume change $\Delta v_t$ is computed for each iteration t using Arbitrary Constraint Handling, using all constraints in $\mathcal{G}_v$. Next, $\mu^*$ is computed using the method described above with reference to Approximate Volume Control and Equations 71-87. Note that Equation 87 needs to be modified as follows to account for arbitrary constraints and objectives:

$$\mu^* = \frac{\frac{\Delta V_t}{T} - \int_\Gamma a\left[\frac{d\mathcal{J}}{d\Omega} + \sum_{g^j \in \mathcal{G}_{nv}}(\mu^j + \lambda^j e^j)\frac{dg^j}{d\Omega}\right] d\Gamma}{\int_\Gamma a\left[\Sigma_{g^j \in \mathcal{G}_v}(\mu^j + \lambda^j e^j)\frac{dg^j}{d\Omega}\right] d\Gamma}. \quad (106)$$

In some cases, a pitfall should be accounted for: $\mu^* \to \infty$ when $$\Sigma_{g^j \in \mathcal{G}_v}(\mu^j + \lambda^j e^j)\frac{dg^j}{d\Omega} \to \infty.$$

When this is detected, $\mu^*$ should be set to 1 in such cases. This usually happens as constraints converge towards the target value, i.e., $e_j \to 0$.

Updating augmented Lagrangian parameters $\mu^j$, $\lambda^j$ for iteration t can be stabilized using Adaptive, e.g., PID controllers, as described above with respect to FIG. 4F. For example, see below for the $\mu_j$ update rule:

$$\Delta\mu_t^j = \mu_t^j - \mu_{t-1}^j$$

$$\mu_t^j \leftarrow \mu_t^j + f_{PID}(\Delta\mu_t^j). \quad (107)$$

As earlier mentioned, a line search algorithm, e.g., gradient descent or Newton's Method, can be applied to ensure the volume change achieved after advecting the level-set is within some acceptable tolerance with respect to the target volume change $\Delta v_t$. Line search is done to find the optimal multiplier $l_t$ such that the advection velocity is given by $l_t\, d\mathcal{L}/d\Omega$. Note that disabling line search is equivalent to setting $l_t=1$.

Figure 4H:
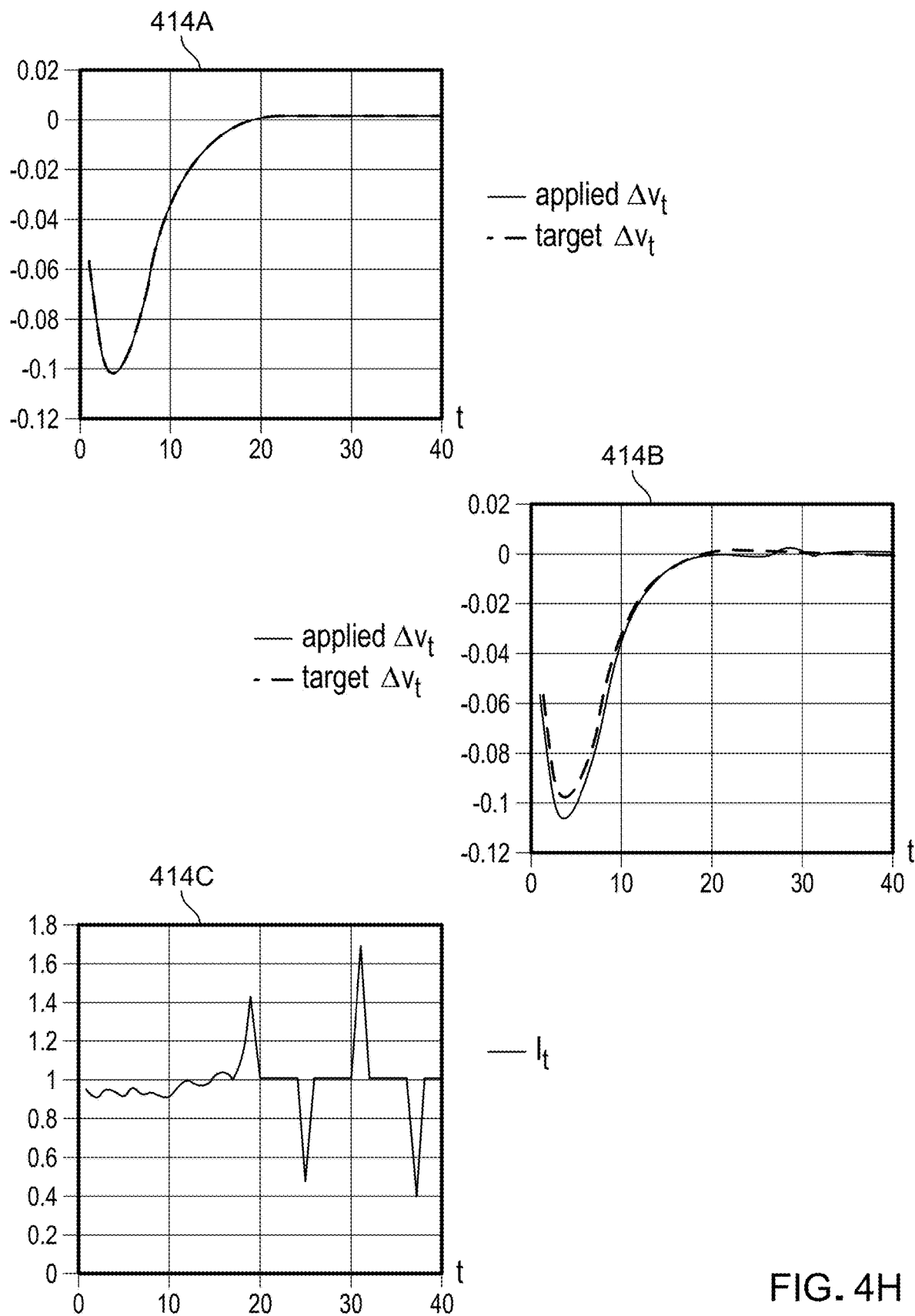
FIG. 4H shows examples of graphs tracking convergence history of constraints with and without line search.

FIG. 4H shows examples of graphs 414A-C tracking convergence history of constraints with and without line search. Graph 414A shows applied versus target volume change $\Delta v_t$ with line search. Graph 414B shows applied versus target volume change $\Delta v_t$ without line search. Graph 414C shows the history of velocity multiplier $l_t$ during convergence.

Returning to FIG. 4A, in some implementations, the one or more design criteria include multiple design constraints, which include the first inequality constraint and the second inequality constraint. In these implementations, the design constraints are grouped into a first group and a second group, the first group containing all of the multiple design constraints that are effected by volume changes, and the second group containing one or more remaining ones of the multiple design constraints that are not effected by volume changes. Computing 424 the shape change velocities includes using an augmented Lagrangian method, e.g., as described above, that applies an adjustment factor to a sum of shape change contributions from the first group but does not apply the adjustment factor to a shape change contribution from the second group.

In some implementations, the at least one design constraint without a defined shape gradient includes a first inequality constraint and a second inequality constraint. The first inequality constraint has a first input control parameter to a first proportional-integral-derivative controller and has a first importance factor that is multiplied with a shape change amount provided by the first proportional-integral-derivative controller, e.g., as described above with reference to Arbitrary Inequality Constraints and Equations 99-101. The second inequality constraint has a second input control parameter to a second proportional-integral-derivative controller and has a second importance factor that is multiplied with a shape change amount provided by the second proportional-integral-derivative controller.

Computing 424 the shape change velocities for the implicit surface in accordance with the proxy shape gradient can therefore include adjusting both the first and second importance factors based on whether or not one or more other constraints were violated in a prior iteration of the iteratively modifying. For example, the importance factor can be modified by multiplying the factor with a violation multiplier with respect to the other constraints in prior iterations of the iteratively modifying. In some implementations and as described above, e.g., generally with reference to FIGS. 4D-4F and with reference to Equations 99-101, proportional-integral-derivative control can be used to stabilize adjustments of the first and second importance factors.

Also as described above with reference to FIGS. 4A, 4F, 4G, the oscillation can be more than two pairs of consecutive successes or failures to satisfy the normalized next target value. Further, the repetition of success or failure to satisfy the normalized next target value can be repetition that occurs over a number of iterations equal to or greater than ten percent of the iteration amount and where the threshold is ten percent. In some implementations, the adjusting in response to the oscillation includes reducing the proportional component, reducing the integral component, and reducing or resetting the derivative component. In some implementations, the adjusting in response to the repetition of success or failure includes increasing the proportional component, reducing the integral component, and setting the derivative component to zero. In some implementations, the adjusting in response to the relative error exceeding the threshold includes increasing the integral component and setting the derivative component to zero.

As described above with reference to Adaptive Controllers and FIGS. 4D-4F, the at least one design constraint may not have a defined shape gradient. Therefore, in some implementations, the computing 424 includes computing the shape change velocities for the implicit surface in accordance with a proxy shape gradient output that is adjusted by adaptive control. Specifically, an input control parameter is used that is a measure of error between a normalized current value for the at least one design constraint without the defined shape gradient and a normalized next target value from the respective ones of the target values in the series of target values. The measure of error changes with a reference value that is changed at least once during the iteratively modifying, which can allow for controlled convergence while meeting the critical constraint smoothly.

In some implementations, the at least one design constraint includes a first equality constraint and a second equality constraint, the first equality constraint having a first input control parameter to a first adaptive controller, and the second equality constraint having a second input control parameter to a second adaptive controller, e.g., as described above with reference to Arbitrary Equality Constraints and Equations 95-98. Then, the computing 424 the shape change velocities for the implicit surface in accordance with the proxy shape gradient includes using a maximum shape change amount provided by the first and second adaptive controllers when none of the first and second equality constraints are inversely proportional to shape change and using a minimum shape change amount provided by the first and second adaptive controllers when none of the first and second equality constraints are proportional to shape change. When one constraint is inversely proportional to shape change and at least one constraint is proportional to shape change, an average shape change amount is used.

After the computing 424, the level-set representation(s) are updated 426 using the shape change velocities to produce an updated version of the three dimensional shape of the modeled object. The performing 422, the computing 424, and the updating 426 are repeated until a check 428 determines that a predefined number of shape modification iterations have been performed or that the generatively designed three dimensional shape of the modeled object in the design space converges to a stable solution for the one or more design criteria and the one or more in-use load cases. The updating 426 and the check 428 can be performed, e.g., as described above with reference to FIG. 3A. Then, the computer-aided design program can provide the generatively designed three dimensional shape of the modeled object for use in manufacturing the physical structure corresponding to the modeled object using one or more computer-controlled manufacturing systems.

Fatigue Constraint

Next, a description of optimizing a design based on provided fatigue constraints on the designed body is provided. In addition to the techniques described above, e.g., FIGS. 3A-4H and accompanying description for Controlled Convergence, Seeding, and Arbitrary Constraint Handling, a designed body can be optimized to satisfy fatigue constraints specifying a total life expectancy of the body, or a number of cycles per load case imposed on the body. The process can be performed automatically in addition to an optimization process, e.g., a generative design process as described above.

Two main methods of evaluating this constraint are described: safe life calculation and the damage tolerant approach. The former is about preventing fatigue damage by keeping stresses below an allowable threshold. The latter accepts that there is fatigue damage and aims to ensure a fatigue crack does not cause catastrophic failure before a specific inspection point in time.

Safe Life Fatigue

Figure 5A:
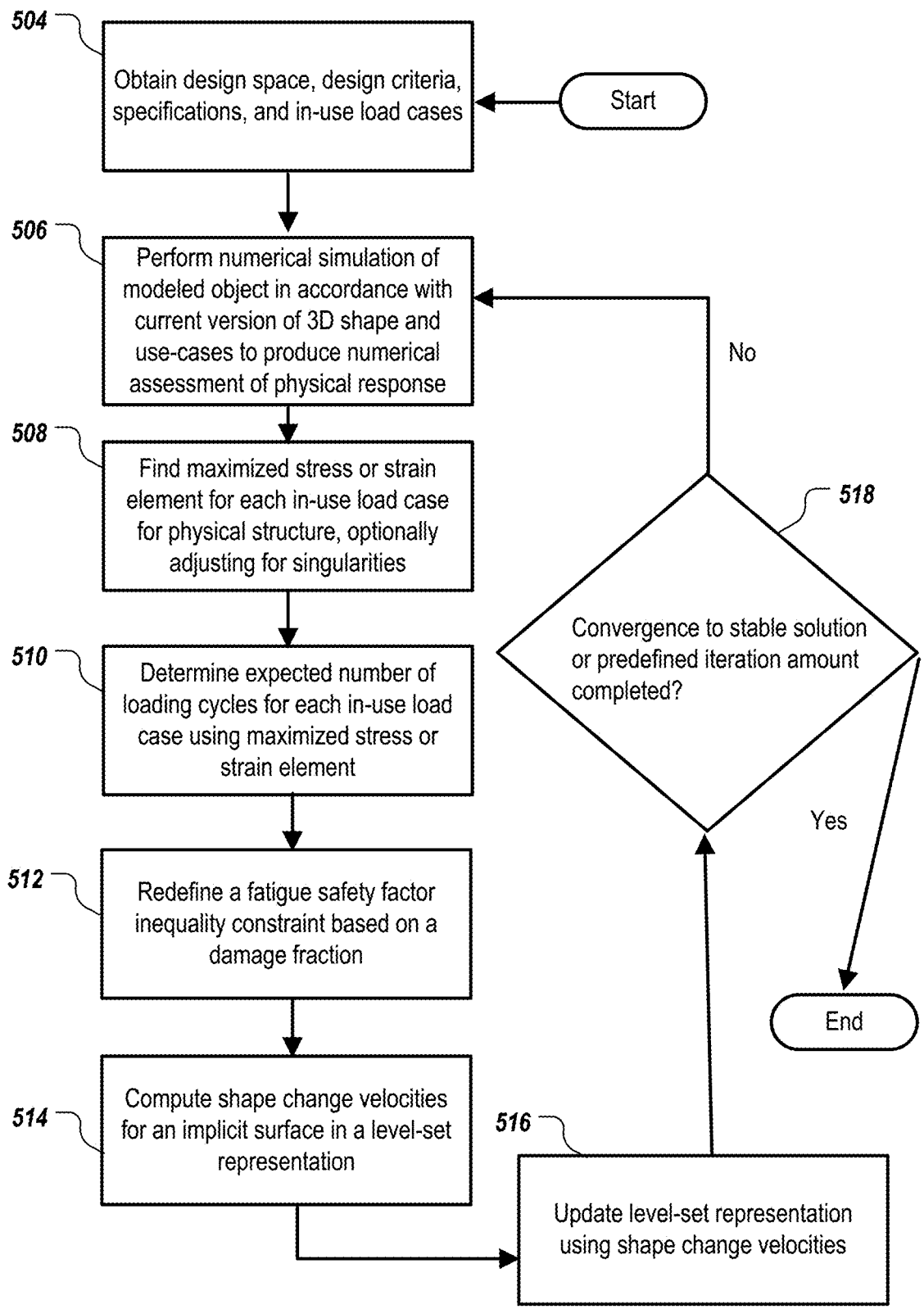
FIG. 5A shows an example of a process that generates one or more portions of a 3D model of an object to be manufactured, using one or more generative design processes that solve for safe life fatigue constraints on the body.

FIG. 5A shows an example of a process that generates one or more portions of a 3D model of an object to be manufactured, using one or more generative design processes that solve for safe life fatigue constraint(s) on the body. A computer-aided design program obtains 504 a design space for a modeled object, for which a corresponding physical structure will be manufactured, one or more design criteria for the modeled object, one or more in-use load cases for the physical structure, and one or more specifications of material from which the physical structure will be manufactured. The obtaining 504 can be done, for example, as described above with reference to FIG. 3A.

Safe life optimization is based on a material's fatigue properties. Samples are tested to obtain SN-curves available in material databases. The designer can specify the expected amount of loading cycles over the lifetime of the part for each relevant load case. Their cumulative effect guides the allowable design stress. Usually, stress-based safe life fatigue is used. However, in low cycle loading problems, strain life fatigue may be preferred.

Treatment of SN-Curves.

Figure 5B:
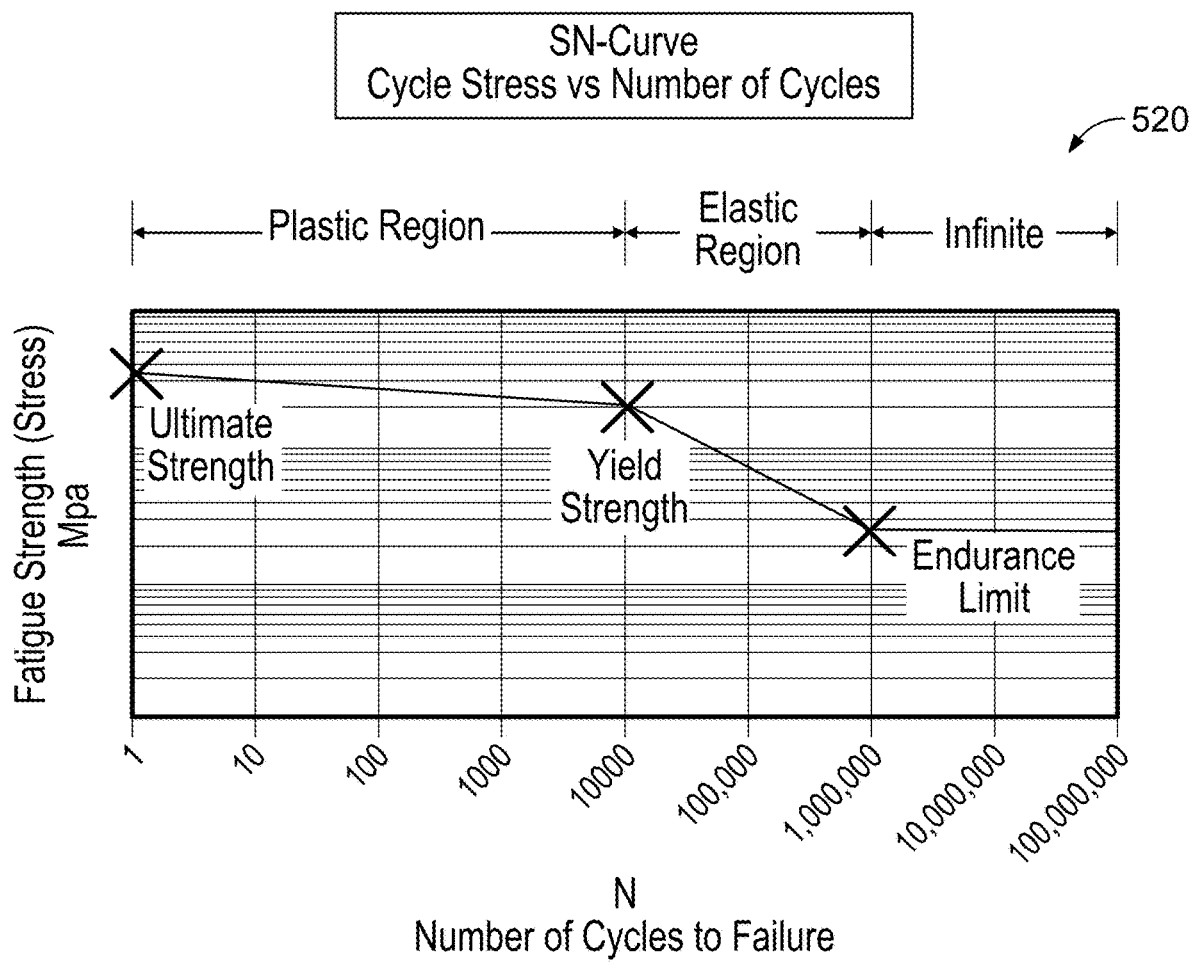
FIG. 5B shows an example of an SN-curve tracking fatigue strength (stress) on a body over a number of cycles.

FIG. 5B shows an example of an SN-curve 520 tracking fatigue strength (stress) on a body over a number of cycles. For bodies that include multiple materials, multiple SN-curves can be used, as described in more detail below.

Both damage tolerant and safe life fatigue approaches described herein can make use of material SN-curves. Due to their potential flat and infinite regions, these pose computational challenges and should be interpreted with caution during the optimization process.

SN-curves normally place stress on the y-axis and cycles on the x-axis, as the typical fatigue workflow involves going from a known number of cycles limit to finding the appropriate maximum stress constraint. This makes it natural for SN-curve user-input to be [cycles, stress] points. Such point definition fits the damage tolerant optimization method well and thus only a sorting of points from lowest to highest cycles need be used. However, in the case of safe-life fatigue, the optimization approach goes from stress to cycle data. Simulation of the object being designed provides stress data, for which the predicted number of cycles should be found from the SN-curve. Thus, an important aspect of the method is to invert the user-provided data points into [stress, cycles] pairs and sort those from lowest to highest stresses. Additionally, when an endurance section is detected, i.e., there exists a flat region of the curve at an endurance stress (below which the number of cycles is effectively infinite), the set of points corresponding to that section of the curve is re-sorted from highest stress to lowest stress. The curve reading algorithm then readily returns the highest reported cycle value instead of interpolating to infinity.

When the input data includes data for different materials, a separate number of expected loading cycles is provided for each of the different materials. This includes returning a number of loading cycles from one or more curves fit to the set of data points in a plastic region and an elastic region of the data relating fatigue strength to loading cycles; and then, returning a highest load cycles number from the set of data points in an endurance region of the data relating fatigue strength to loading cycles.

Stress-Based Safe Life Fatigue

Returning to FIG. 5A, the one or more design criteria include a required number of loading cycles for the modeled object for each of the one or more in-use load cases for the physical structure. The input can be provided as cycles for each load case, or as a period of time, e.g., in seconds, minutes, hours, days, weeks, months, years, etc. that can be optionally converted into cycles. The one or more specifications include data relating fatigue strength to loading cycles. The data can be provided as SN-curves for the material. The data can measure stress as an indicator of fatigue stress, but in some implementations strain is used, e.g., when the in-use load cases have a low number of cycles as a requirement.

The program iteratively modifies a generatively designed three dimensional shape of the modeled object in the design space in accordance with the one or more design criteria, the one or more in-use load cases for the physical structure, and the one or more specifications. The iteratively modifying can include modifying both a geometry and a topology for the three dimensional shape of the object.

The iteratively modifying includes performing 506 numerical simulation of the modeled object in accordance with a current version of the three dimensional shape and the one or more in-use load cases to produce a current numerical assessment of a physical response of the modeled object, e.g., as described above with reference to FIGS. 3A & 4A.

A maximized stress or strain element is found 508 for each of the one or more in-use load cases for the physical structure, from the current numerical assessment of the physical response of the modeled object. The element can be a value at a point, location or region of the physical structure. In some implementations and as described below with reference to FIGS. 8A-8C, the finding 508 includes calculating a maximum stress value for an in-use load case based on at least a standard deviation of a stress distribution in the current numerical assessment of the physical response of the modeled object.

Specifically, during topology optimization, each element's stress can be computed at every iteration. After optionally adjusting for singularities (described below in reference to FIGS. 8A-8C, the maximum principal stress across all elements for a given load case can be found and the corresponding number of cycles obtained from the SN curve(s). The ratio of cycles obtained to cycles required represents the damage fraction. Using Miner's rule, the overall safety factor is computed from the damage fractions of all load cases. The fatigue constraint has to work with multi-material problems. Each material's fatigue safety factor is calculated separately and the minimum guides optimization, as shown below:

$$S^f = \min_i S_{m_i}^f. \tag{108}$$

where $S_{m_i}^f$ is the fatigue safety factor of a material computed using:

$$S_{m_i}^f = \left[\sum_{lc=1}^n \frac{C_\sigma}{C_{lc}^{req}}\right]^{-1} \tag{109}$$

where the fatigue safety factor $S^f$ is given by the minimum fatigue safety factor of all materials used, $C_\sigma$ is the number of cycles obtained from the SN-curve for the max principal stress ($\max_\Omega \sigma^p$), and $C_{lc}^{req}$ is the required number of cycles for the given load case lc.

During optimization, the fatigue constraint is defined as $S^f - S_T^f \geq 0$ where $S_T^f$ is the target fatigue safety factor. This can be enforced using methods described above with reference to Controlled Convergence, Arbitrary Constraint Handling, and FIGS. 4A-4H with the shape derivative $dS^f/d\Omega$ derived below. In some implementations, the volume shape derivative can be used as the proxy shape derivative, as shown in Equation 105.

Shape Derivative of Aggregated Fatigue Metric

Let $\Omega$ be a domain in $\mathbb{R}^3$. In this specification, a stress-based fatigue metric for $\Omega$ with respect to a number of load cases that are applied repetitively over time is assessed at each point $x \in \Omega$ independently. For purposes of topology optimization, these pointwise measurements are aggregated into a global measurement called an aggregated fatigue metric that approximates the maximum value of the pointwise measurements.

The aggregated fatigue metric takes the following form. Let $C: \mathbb{R} \to \mathbb{R}$ be the inverse of the SN curve of the material including $\Omega$ and let $C_l \in \mathbb{R}$ be a reference value for the $l^{th}$ load case. This aggregated fatigue metric enables the summation of damage caused by cyclic loading. A target value of 1/(safety factor) is optimized for, where the damage the part can withstand and the actual damage from the load (stress or strain and number of cycles) are summed.

The aggregated fatigue measurement of $\Omega$ is defined as:

$$S(\Omega) := \left(\sum_{l=1}^L \frac{C(\bar{\sigma}_l(\Omega))}{C_l}\right)^{-1} \tag{110}$$

where $\sigma_l(\Omega)$ is an approximation of the maximum of the magnitude of the stress tensor in $\Omega$ under the $l^{th}$ load case. In other words, $$\bar{\sigma}_l(\Omega) := \left(\int_\Omega \|\sigma(u_l)\|^{2p}\right)^{1/2p} \tag{111}$$

where $u_l: \Omega \to \mathbb{R}^3$ is the displacement function that satisfies the equations of linear elasticity in $\Omega$ with respect to the $l^{th}$ load case, and $\sigma(u_l)$ is the associated stress tensor.

The shape derivative of the aggregated fatigue metric S is described in more detail, below.

Proposition 1. The shape derivative of the shape function S with respect to the variation of a shape $\Omega$ generated by the normal speed $\Theta: \partial\Omega \to \mathbb{R}$ is given by:

$$DS_\Omega \cdot \Theta = \tag{112}$$

$$-[S(\Omega)]^2 \sum_{l=1}^L \frac{C'(\bar{\sigma}_l(\Omega))}{C_l} [\bar{\sigma}_l(\Omega)]^{1-2p} \left(\int_{\partial\Omega} \left[\|\sigma(u_l)\|^{2p} + \sigma(u_l): e(\lambda_l)\right] \Theta\right)$$

where $\lambda_l: \Omega \to \mathbb{R}^3$ is the adjoint displacement function of the $l^{th}$ load case. This is the solution of the linear elastic equations with adjoint force term given in weak form as the linear integral form:

$$\mathcal{F}_{adj}(\Omega, \delta u) := \int_\Omega \|\sigma(u_l)\|^{2p-1} \sigma(u_l): \sigma(\delta u) \tag{113}$$

Since S can be decomposed into a sequence of operations applied to the stress integral $\int_\Omega \|\sigma(u_l)\|^{2p}$ this computation breaks down as follows. First, the derivative of this sequence of operations is computed using the chain rule from ordinary calculus. Then, the shape derivative of the stress integral is computed, for which Céa's method is used and described below.

Let $\Omega_\varepsilon$ denote the variation of $\Omega$ generated by the normal speed function $\Theta$. The computation of the desired shape derivative, denoted as $DS_\Omega \cdot \Theta$, begins as:

$$DS_\Omega \cdot \Theta = \frac{d}{d\varepsilon} S(\Omega_\varepsilon)\big|_{\varepsilon=0} = \frac{d}{d\varepsilon} \left(\sum_{l=1}^L \frac{c(\bar{\sigma}_l(\Omega_\varepsilon))}{c_l}\right)^{-1}\bigg|_{\varepsilon=0} \tag{114}$$

First, the chain rule from ordinary calculus is used to bring the derivative $d/d\varepsilon$ onto the stress integral, where then the techniques of shape differentiation take over, as shown below:

$$DS_\Omega \cdot \Theta = \quad (115)$$

$$-\left(\sum_{l=1}^{L}\frac{C(\tilde{\sigma}_l(\Omega_\varepsilon))}{C_l}\right)^{-2}\sum_{l=1}^{L}\frac{C'(\tilde{\sigma}_l(\Omega))}{C_l}\frac{d}{d\varepsilon}\tilde{\sigma}_l(\Omega_\varepsilon)|_{l=0} =$$

$$-[S(\Omega)]^2\sum_{l=1}^{L}\frac{c'(\tilde{\sigma}_l(\Omega))}{c_l}\frac{[\tilde{\sigma}_l(\Omega)]^{1-2p}}{2p}\frac{d}{d\varepsilon}\int_{\Omega_\varepsilon}\|\sigma(u_{l,\varepsilon})\|^{2p}\Big|_{l=0}$$

where $u_{l,\varepsilon}$ is the displacement function for the $l^{th}$ load case in the domain $\Omega_\varepsilon$.

To continue, shape differentiation is used. Céa's method is used to compute the shape derivative of the stress integral remaining in Equation 115. The subscripted l is suppressed in the description below because it is the same for all load cases. The Lagrangian follows:

$$\mathcal{L}(\Omega,u,\lambda) := \int_\Omega \|\sigma(u)\|^{2p} + A(\Omega,u,\lambda) + \mathcal{F}(\Omega,\lambda). \quad (116)$$

where $$A(\Omega,u,\lambda) := \int_\Omega \sigma(u):e(\lambda) \quad (117)$$

is the integral form appearing in the weak form of the elasticity equations in $\Omega$.

Here, $\sigma(u)$ is the stress tensor of the displacement u and $e(\lambda)$ is the "virtual strain" of the "virtual displacement" $\lambda$. Thus, $\mathcal{A}(\Omega, u, \lambda)$ is the "virtual work" associated to the pair of displacements. Also, $\mathcal{F}(\Omega, \lambda)$ is the integral linear form appearing in the weak form of the elasticity equations in $\Omega$ which encodes the "virtual work" done by the applied body and boundary tractions. Now Céa's method proceeds in three steps.

Step 1. Setting the variation of the Lagrangian with respect to $\lambda$ equal to zero yields the linear elasticity equations satisfied by u. This is by design, since $\mathcal{A}(\Omega, u, \lambda) + \mathcal{F}(\Omega, \lambda)$ is precisely the left-hand-side of the weak elasticity equations.

Step 2. Setting the variation of the Lagrangian with respect to u yields a related system of equations for $\lambda$ called the adjoint state equations. The solution of these equations is called the adjoint state. The weak version of these equations is:

$$0 = \int_\Omega 2p\|\sigma(u)\|^{2p-1}\sigma(u):\sigma'(\delta n) + A(\Omega,u,\lambda) \quad (118)$$

for all variations $\partial u$ of u. Here, $\sigma'(\delta n)$ is the derivative of the stress tensor with respect to the displacements. This has a simple form, because stress is linearly related to strain which is in turn linearly related to u—the gradient is a linear operator, or quite simply, $\sigma' = \sigma$. The symmetry of $\mathcal{A}$ is also used. The above shows that $\lambda$ satisfied the linear elastic equations but with a new "adjoint force" term encoded in the integral linear form:

$$\mathcal{F}_{adj}(\Omega,\delta u) := \int_\Omega 2p\|\sigma(u)\|^{2p-1}\sigma(u):\sigma'(\delta u) \quad (119)$$

Step 3. Céa's method hinges on the following fact, which can be proven: the shape derivative of the Lagrangian, computed by ignoring the shape dependence of u and $\lambda$ and then plugging in the state for u and the adjoint state for $\lambda$, is equal to the shape derivative of $\int_\Omega \|\sigma(u)\|^{2p}$ itself. Since all expressions in the Lagrangian are volumetric integrals, only the formula for the shape derivative of such an integral of a shape-independent function over $\Omega$ is needed.

Next, assume that $\Theta$ vanishes on the Dirichlet and in the homogeneous Neumann boundary of $\Omega$ (otherwise the shape derivative would include other terms). Finally, assume that body forces are absent, for instance by ignoring the effects of gravity in the given load case. Together, these last two assumptions have the effect of dropping the $\mathcal{F}$ term from the formula for the shape derivative (Equation 116). Therefore, the following results after all assumptions:

$$\frac{d}{d\varepsilon}\int_{\Omega_\varepsilon}\|\sigma(u_\varepsilon)\|^{2p}|_{\varepsilon=0} = \int_{\partial\Omega}\left(\|\sigma(u)\|^{2p} + \sigma(u):e(\lambda)\right)\Theta \quad (120)$$

where u is the state and $\lambda$ is the adjoint state.

Strain-Based Safe Life Fatigue

The strain-based safe life calculation also uses Equations 108 and 109, however the $C_\sigma$ parameter becomes $C_\varepsilon$. A strain versus cycles form of the SN-curve is used as input. The strain value is computed from the max principal stress ($\max_\Omega \sigma^p$) according to Neuber's rule, below:

$$\varepsilon = \frac{K^2 * \sigma}{2E}. \quad (121)$$

where K is the concentration factor specified by a user (defaults to 1) and E is the material's Young's Modulus.

Returning to FIG. 5A, as described above with reference to the Treatment of SN-Curves and FIG. 5B, an expected number of loading cycles for each of the one or more in-use load cases for the physical structure is determined 510 using the maximized stress or strain element and the data relating fatigue strength to loading cycles. A fatigue safety factor inequality constraint for the modeled object is redefined 512 based on a damage fraction calculated from the required number of loading cycles for the modeled object and the expected number of loading cycles for each of the one or more in-use load cases for the physical structure. In some implementations, the inequality constraint can be normalized and adjusted using adaptive controllers, e.g., as described above with reference to FIGS. 4D-4F.

In some implementations, the one or more specifications include two or more specifications of respective different materials from which the physical structure will be manufactured. Accordingly, the data for the specifications include data relating fatigue strength to loading cycles for each of the different materials. As such, the determining 510 includes determining a separate number of expected loading cycles for each of the different materials. Further, the redefining 512 includes calculating a separate fatigue safety factor for each of the different materials based on respective damage fractions calculated from respective ones of the numbers of expected loading cycles for the different materials. From the separate safety factors, a minimum value of the fatigue safety factors for the different materials is used to redefine the fatigue safety factor inequality constraint for the modeled object.

In some implementations, the one or more in-use load cases for the physical structure includes two or more in-use load cases for the physical structure and the one or more design criteria include a required number of loading cycles for the modeled object for each of the two or more in-use load cases for the physical structure. Calculating the separate safety factor for each respective one of the different materials includes summing load-specific damage fractions corresponding to the two or more in-use load cases, wherein each load-specific damage fraction includes a number of expected loading cycles, for one of the different materials and one of the in-use load cases, divided by the required number of loading cycles for the one of the in-use load cases.

The separate safety factor is obtained by inverting the sum of the load-specific damage fractions to obtain the separate safety factor. See e.g., Equation 109.

The shape change velocities for an implicit surface in a level-set representation of the three dimensional shape are computed 514 in accordance with at least the fatigue safety factor inequality constraint. The shape change velocities can be computed with respect to other constraints, and proxy derivatives can be computed where a shape derivative is unavailable or not well defined, e.g., as described above with reference to Arbitrary Constraint Handling and FIGS. 4A-4H. Then, the level-set representation is updated 516 using the shape change velocities to produce an updated version of the three dimensional shape of the modeled object. The shape derivative for the Aggregated Fatigue Metric described above with respect to Equations 110-120 can be used to compute the shape change velocity for the fatigue safety factor inequality constraint.

In some implementations, the computing 514 includes computing at least one shape change velocity using an amount determined from a shape derivative formula that approximates a shape derivative of the fatigue safety factor, e.g., the volume shape derivative described above with reference to Equation 105, The formulation is modified to include the stress shape derivative instead of the volume shape derivative.

In some implementations, an importance factor is used for handling the at least one design constraint, including the fatigue safety factor, which is adjusted based on whether or not one or more other constraints were violated in a prior iteration of the iteratively modifying, e.g., as described above with respect to FIG. 4A, and generally with respect to Arbitrary Inequality Constraint Handling and Equations 53-60.

In some implementations, a target value of the volume fraction is adjusted using adaptive controllers, e.g., as described above with reference to FIGS. 4D-4F. Specifically, a target value of the volume fraction or a minimum thickness based inequality constraint is adjusted between an initial target value and a final target value across multiple iterations of the iteratively modifying. The adaptive control is used to stabilize changes made in the amount determined from the shape derivative formula as the target value is adjusted across the multiple iterations.

In some implementations, adaptive control is used to adjust a total contribution of the amount determined from the shape derivative formula to the shape change velocities used in the updating. Adaptive controllers can be used to adjust the contribution of the proxy shape derivative to the total advection velocity, i.e., according to a modified version of the Augmented Lagrangian method for constraint handling, as described above with reference to Equations 102-107.

The performing 506, the finding 508, the determining 510, the redefining 512, the computing 514 and the updating 516 repeat until a check 518 determines that a predefined number of shape modification iterations have been performed or that the generatively designed three dimensional shape of the modeled object in the design space has converged to a stable solution for the one or more design criteria and the one or more in-use load cases.

The check 518 can be a check as described above with reference to FIGS. 3A & 4A. Then, the generatively designed three dimensional shape of the modeled object can be provided, e.g., for use in manufacturing the physical structure corresponding to the modeled object using one or more computer-controlled manufacturing systems. The techniques can be combined with hybrid, hollow, and hybrid-hollow methods for topological optimization.

Damage Tolerant Fatigue

Safe Life Fatigue constraints as described above help to ensure that an object does not fail under user-specified load cases by preventing fatigue damage during a specified number of loading cycles. In contrast, damage tolerant fatigue techniques focus on limiting fatigue damage to be within an allowable limit to help ensure the fatigue damage will be detected in the field before the part fails. The key objective is to compute the critical fatigue crack length and ensure that it does not exceed the thickness of the design component during the service inspection interval. Hence, a key requirement of this method is the ability to enforce thickness constraints on topology optimized designs. The thickness constraint can be enforced implicitly, for example by increasing the volume of the design which results in all parts of the design increasing in thickness.

It is noted that, like the Safe Life Fatigue approach, the Damage Tolerant Fatigue techniques described below can be used in any combination with the above-described techniques, e.g., Controlled Convergence, Seeding, and Arbitrary Constraint Handling. Further, in some implementations, the Safe Life Fatigue and Damage Tolerant Fatigue approaches are both available where fatigue design constraints for a given problem are solved with the Safe Life approach in some cases, while in other cases, fatigue design constraints are solved using the following Damage Tolerant Fatigue techniques. An appropriate approach can be selected based on the intended use of a part being designed. For example, in aerospace applications, a part is commonly designed according to a damage tolerant approach. The availability of the two modes together allow for addressing a greater range of design problems.

Figure 6A:
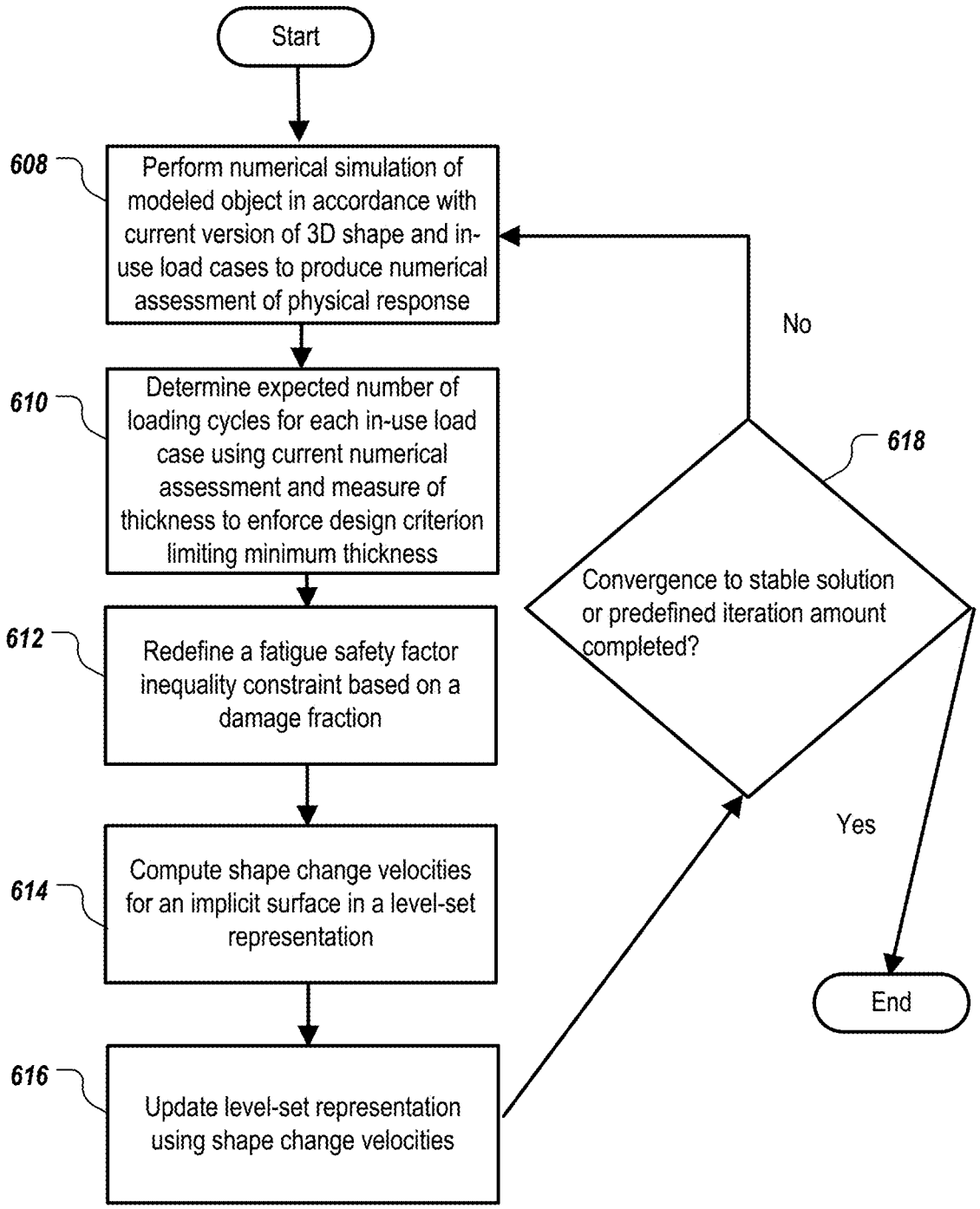
FIG. 6A shows an example of a process of iteratively modifying a generatively designed three dimensional shape of a modeled object in the design space in accordance with the one or more design criteria, including at least one damage tolerant fatigue constraint.

FIG. 6A shows an example of a process of iteratively modifying a generatively designed three dimensional shape of a modeled object in the design space in accordance with the one or more design criteria, including at least one damage tolerant fatigue constraint. The three dimensional shape includes a level-set representation of an implicit surface and the one or more design criteria include a required number of loading cycles for the modeled object for each of the one or more in-use load cases for the physical structure.

Numerical simulation of the modeled object is performed 608 in accordance with a current version of the three dimensional shape and the one or more in-use load cases to produce a current numerical assessment of a physical response, e.g., a structural response, of the modeled object, as described above with reference to FIGS. 3A, 4A, and 5A.

An expected number of loading cycles for each of the one or more in-use load cases for the physical structure is determined 610 using the current numerical assessment and the measure of thickness to enforce the design criterion that limits the minimum thickness. The point with the maximum strain or stress from the current numerical assessment can be used to determine the expected number of loading cycles. Computing a current thickness and enforcing the minimum thickness is described below.

Thickness Constraint

First, a thickness constraint is computed and enforced. One or more of multiple methods can be used to measure and enforce thickness, e.g., a combination of at least two distinct thickness measures, as described below. Also, it is to be appreciated that the described Damage Tolerant Fatigue techniques can be implemented with density based topology optimization, e.g., using the SIMP method, rather than with a boundary based topology optimization, e.g., the level-set method, as described in connection with FIG. 6A.

Figure 6B:
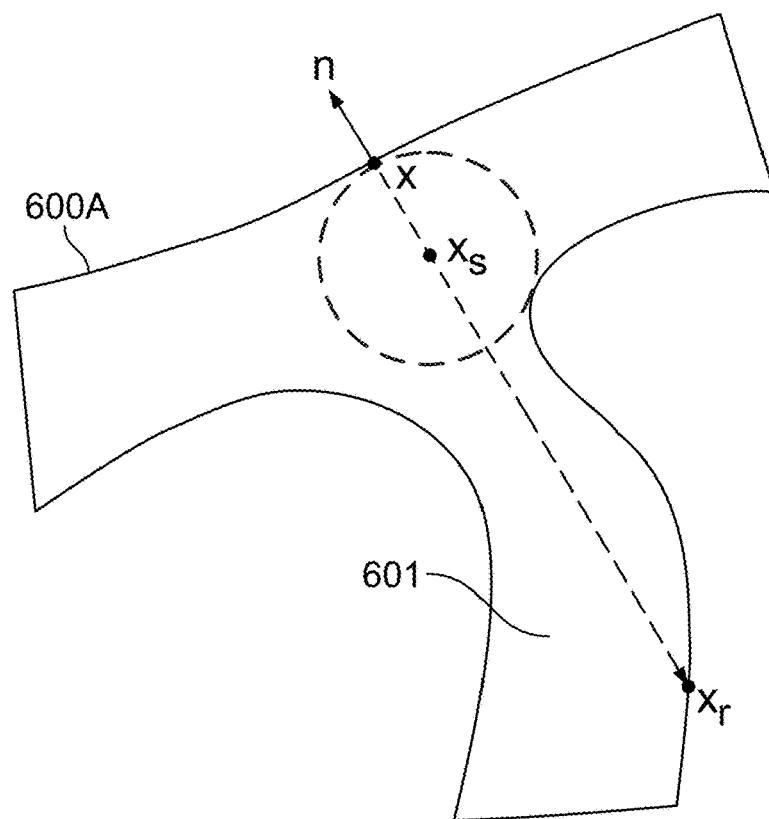
FIG. 6B shows graphical representations of geometries in which thickness of the geometries are computed according to different measuring techniques.
Figure 6B:
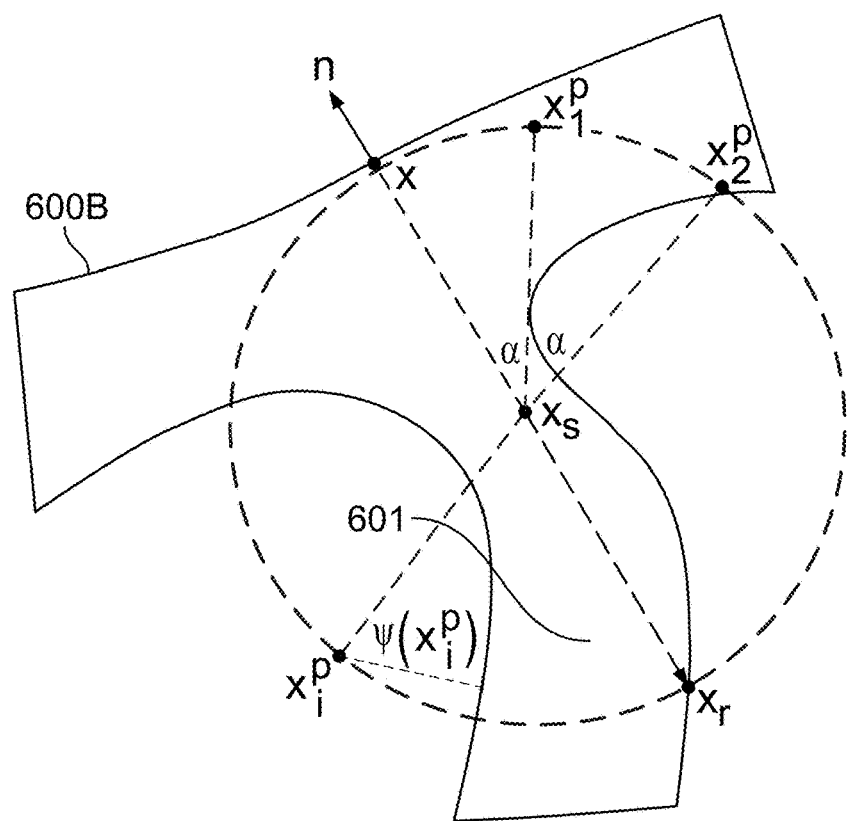

FIG. 6B shows graphical representations of geometries 600A, 600B in which thickness of the geometries 600A, 600B are computed according to different measuring techniques. Geometry 600A shows a body 601 measured using a ray casting method. Ray-cast thickness at point x in geometry 600A is defined as $h^r(x)=|x-x^r|$ where $x_r$ is the point where a ray cast in the negative direction of a vector n at point x hits the geometry 600A. Ray casting can be repeated for different directions of the vector n at point x, including when the vector n is normal to the geometry 600A.

By contrast, sphere-fitting method is shown in geometry 600B and involves finding the diameter of the largest sphere that can fit inside the domain while touching the measuring point x in the geometry 600B. This is done by running a bisection algorithm for locating the sphere centroid $x_s$ between points x and $x_r$. Discrete sampling locations $\{x_1^p, x_2^p, \ldots x_i^p\}$ are defined on the sphere perimeter/surface using the polar angle $\alpha$. The sphere with origin $x_s$ is deemed to fit inside the domain when the maximum level-set with respect to the domain is below a particular threshold $\Delta h$, i.e., the following condition is satisfied:

$$\max \psi(x_i^p) \leq \Delta h \tag{122}$$

The sphere-fitting thickness is then defined as $h^s(x)=2|x-x_s|$. In some implementations, thickness is defined as $h(x=\max\{h^s(x), h^r(x)\}$. If the thickness at a point not on the domain surface is required, it is first projected on to the surface using the normal of the level-set before thickness on the surface is measured. The sphere-fitting method can be repeated multiple times for multiple directions (resulting in multiple $x_r$ points, depending on the selected direction). The largest sphere computed can be used to define the thickness.

A minimum thickness constraint $g^t$ can be defined as $$g^t(\Omega) - h_{\min} \geq 0. \tag{123}$$

$$\min_{x \in \Gamma} h(x) - h_{\min} \geq 0$$

where $\Gamma$ is the domain surface and $h_{min}$ is the target minimum thickness. An approximate shape derivative is given by:

$$\frac{dg^t}{d\Omega}(x) \approx \begin{cases} h(x) - h_{\min} & \text{if } h(x) < h_{\min} \\ 0 & \text{otherwise.} \end{cases} \tag{124}$$

The thickness constraint can be applied using methods described above with respect to Arbitrary Constraint Handling and FIGS. 4A-4H. In some implementations, the importance factor for the thickness constraint is modified by a sigmoid function $S^r(\xi)$ such that the thickness constraint only comes into effect during the latter stages of optimization $$p_i^j \leftarrow S^r(\xi) p_i^j \tag{125}$$

The sigmoid function is defined as:

$$S^r(\xi) = \frac{1}{1 + e^{-(12\xi - 6)}} \tag{126}$$

with $\xi$ computed as follows $$\xi(t) = \frac{t - \hat{t}}{n - \hat{t}} \tag{127}$$

where $\hat{t}$ identifies the start of thickness constraint application which is taken as the maximum of volume reduction iterations $n_v$ and the first violation of thickness constraint.

Figure 6C:
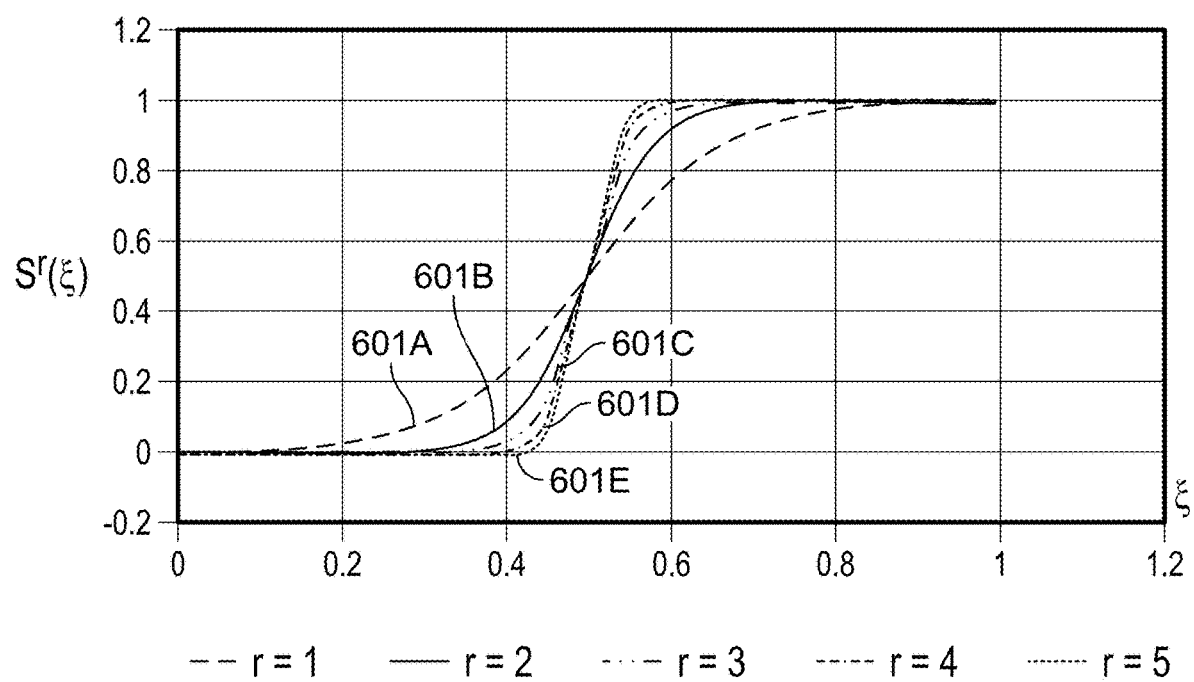
FIG. 6C shows an example of a graph tracking curves of sigmoid functions at different rates.

FIG. 6C shows an example of a graph tracking curves 601A-E of sigmoid functions at different rates. Curve 601A is curve of a sigmoid function with rate of 1; curve 601B is a curve of a sigmoid function with a rate of 2; curve 601C is a curve of a sigmoid function with a rate of 3; curve 601D is a curve of a sigmoid function with a rate of 4; and curve 601E is a curve of a sigmoid function with a rate of 5.

Although two techniques for measuring thickness are described here, it is understood that any suitable technique for measuring thickness of a body can be used, without loss of generality. Further, the techniques described can be combined, i.e., a combination of two distinct thickness measurements, to improve the results. For example, the two distinct thickness measures can include (i) a first distance measure being a length within the modeled object of a ray cast in a negative normal direction from a surface point of the modeled object, and (ii) a second distance measure being a diameter of a largest sphere that touches the surface point of the modeled object and fits inside the modeled object as determined by checking discrete sampling locations defined on the sphere's surface, such as described above with reference to FIG. 6B.

Damage Tolerant Fatigue Constraint

Next, the damage tolerant fatigue constraint is described. The material's critical fatigue crack length $h^d$ is defined as $$h^d = \left( \frac{1}{\frac{1}{\left(a\frac{\rho_g}{2} - 1\right)} - CI(Y\Delta\sigma\sqrt{\pi})^{\rho_g}\left(\frac{\rho_g}{2} - 1\right)} \right)^{\left(\frac{1}{\rho_g/2 - 1}\right)} \tag{128}$$

where C is the number of fatigue cycles, $\rho_g$ is the modulus of the material's fatigue crack growth curve and can be user-specified, e.g., 2.8, a is the initial crack length, which can be set as equal to the minimum defect detection size of the chosen part inspection method, with a default value of a=1 mm, I is a stress intensity factor, e.g., with a default value of I=1.22×10$^{-12}$), and Y describes the crack type, e.g., with a default value Y=1. The stress range $\Delta\sigma$ is derived from the stress ratio R, e.g., R=0.1 and maximum stress $\sigma_{max}$ as the following:

$$\Delta\sigma = (1-R)\sigma_{max}. \tag{129}$$

The minimum thickness of the material is then given by $$h_m^d = \frac{h^d}{R_T^d} S^f \tag{130}$$

where $R_T^d$ is the desired critical thickness to width ratio and $S^f$ is the prescribed design safety factor. The $R_T^d$ multiplier and Y crack type variables are related and can be found in engineering tables describing fatigue crack properties for a given material.

Figure 6D:
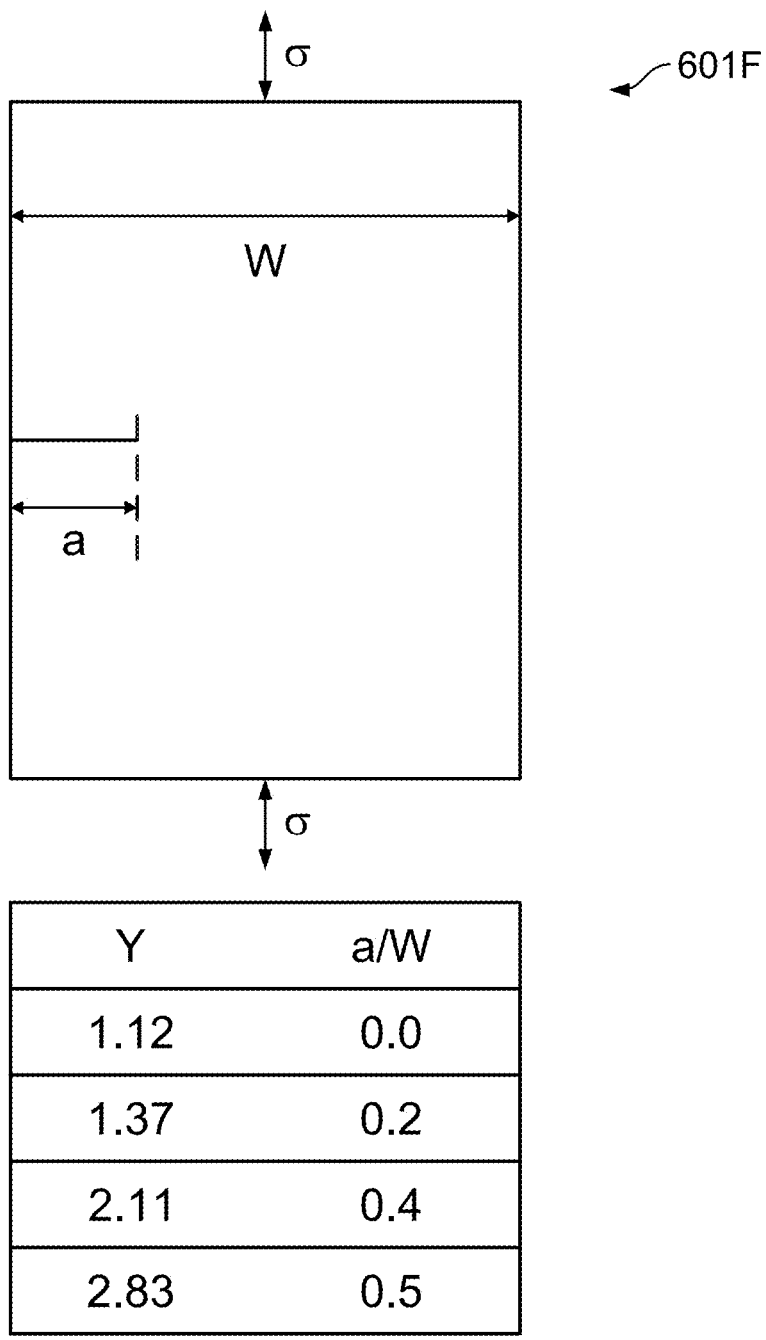
FIG. 6D shows an example of a table describing fatigue crack properties.

FIG. 6D shows an example of a table 601F describing fatigue crack properties. In the table 601F, the crack type variables Y are shown in relation to corresponding $R_T^d$ multipliers. Y is the geometry correction factor used in the stress intensity factor expression. The correction factor describes the link between the crack length a and the thickness of the feature W. The table 601F shows values of Y and a/W for different materials. The table 601F can be user-specified, with specified values for Y and the ratio a/W for different materials.

The crack length a is set equal to a critical crack length ac, which tends towards infinity, i.e., catastrophic failure of the part. During optimization, this gives a minimum thickness to optimize for, i.e., if the user desires an a/W ratio of 0.1 (i.e., the minimum thickness should be 10 times ac) then the ac value is calculated and a minimum thickness is applied as a multiple of this value. Generally, the value of Y is small and therefore represents a small crack thickness ratio, i.e., a large thickness of the part versus the critical crack length in the feature of the part. This has the effect of increasing the critical crack length in the feature so that it is easily detectable by the chosen inspection techniques.

One way to add an optimization constraint to satisfy damage tolerant fatigue requirements is to use a constant global thickness target. Assume the design is at the fatigue limit where C is equal to the number of fatigue cycles required and $\sigma_{max}$ is the corresponding stress from an SN-curve. Equation 128 is used to compute critical crack length $h_{m_i}^d$ for each material. The min thickness constraint (Equation 123) is modified with the target thickness set to the result of Equation 130 using the worst case crack length. The target thickness remains constant throughout the optimization:

$$h_{\min} = \min_i {}^{n_m} h_{m_i}^d \tag{131}$$

$$\min_{x \in \Gamma} h(x) - \min_i {}^{n_m} h_{m_i}^d \geq 0.$$

Alternatively, the damage tolerant fatigue safety factor can be computed for each point x on the surface of the design at each iteration. This uses the stress $\sigma_{lc}(x)$ and thickness $h(x)$ at each point to compute the supported number of cycles for each load case $C_{lc}(x)$:

$$C_{lc}(x) = \left[\frac{1}{(a^{pg/2-1})} - \frac{1}{(h(x)R_T^d)^{pg/2-1}}\right]\left[\frac{1}{I(Y(1-R)\sigma_{lc}(x)\sqrt{\pi})^{pg}\left(\frac{pg}{2}-1\right)}\right] \tag{132}$$

The damage tolerant fatigue safety factor of a material $S_d$ can now be worked out similarly to safe life fatigue method, using Miner's rule:

$$S^d = \min_{x \in \Gamma} \left[\sum_{lc=1}^n \frac{c_{lc}(x)}{c_{lc}^{req}}\right]^{-1} \tag{133}$$

where $C_{lc}(x)$ is the number of cycles obtained from Equation 132 and $c_{lc}^{req}$ is the required number of cycles for the given load case lc.

During optimization, the fatigue constraint is defined as $S^d - S_T^d \geq 0$ where $S_T^d$ is the target fatigue safety factor—the lowest of all material safety factors. This can be enforced using methods described above with respect to Arbitrary Constraint Handling and FIGS. 4A-4H. The volume or thickness shape derivative (Equation 124) can be used as a proxy shape derivative, as described above. In order to use the thickness shape derivative, an extra step should be taken of converting the point stress and thickness data corresponding to the critical safety factor $S_T^d$ into a thickness target $h_{min}$ using Equations 128 and 130. Note the importance factor should be multiplied by sigmoid type functions, as described above with reference to FIG. 6C.

Figure 6E:
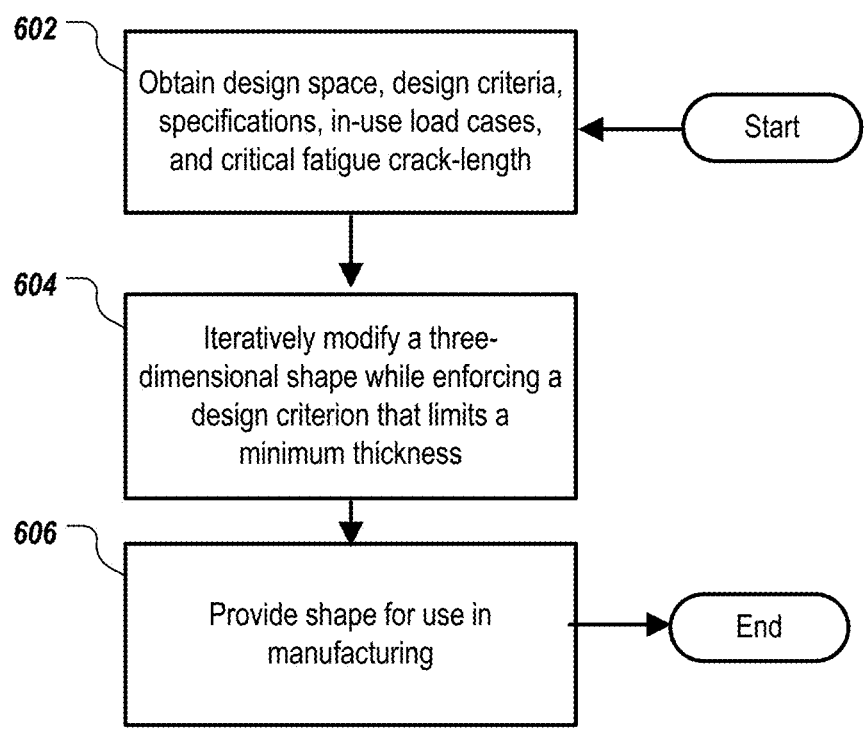
FIG. 6E shows an example of a process of generating one or more portions of a 3D model of an object to be manufactured, using one or more generative design processes that solve for damage tolerant fatigue constraints on the body.

FIG. 6E shows an example of a process of generating one or more portions of a 3D model of an object to be manufactured, using one or more generative design processes that solve for damage tolerant fatigue constraints on the body.

A computer aided design program obtains 602 a design space for a modeled object for which a corresponding physical structure will be manufactured, one or more design criteria for the modeled object, one or more in-use load cases for the physical structure, and a critical fatigue crack length for a material from which the physical structure will be manufactured. The obtaining 602 can be performed, e.g., as described above with reference to FIGS. 3A, 4A, and 5A. In some implementations, obtaining the critical fatigue crack length for the material includes obtaining one or more specifications of the material from which the physical structure will be manufactured, and calculating the critical fatigue crack length for the material from information in the one or more specifications, e.g., SN-curves and engineering tables as described above with reference to FIGS. 5B and 6D. The information can include a modulus of the material's fatigue crack growth curve.

The program iteratively modifies a generatively designed three dimensional shape of the modeled object in the design space in accordance with the one or more design criteria, the one or more in-use load cases for the physical structure, and the one or more specifications. The iteratively modifying can include modifying both a geometry and a topology of the three dimensional shape of the object, e.g., as described above with reference to FIGS. 3A, 4A, 5A, and 6A. The iteratively modifying includes enforcing 604 a design criterion that limits a minimum thickness of the generatively designed three dimensional shape of the modeled object, the minimum thickness being based on the critical fatigue crack length for the material. The minimum thickness can be a ratio of the critical fatigue crack length, such as a minimum thickness that is 10× the critical fatigue crack length. The thickness can be measured using a variety of techniques, e.g., as described above with reference to FIG. 6B.

The generatively designed three dimensional shape of the modeled object is provided 606 for use in manufacturing the physical structure corresponding to the modeled object using one or more computer-controlled manufacturing systems.

As described above with reference to Handling Arbitrary Inequality Constraints and FIGS. 4A-4H, enforcing a minimum thickness inequality constraint can include, in some implementations, using a volume fraction or a minimum thickness based inequality constraint as a proxy for the design criterion that limits the minimum thickness. Using the volume shape derivative results in the fatigue safety being met correctly, however in some implementations the thickness shape derivative replaces the volume shape derivative. The volume fraction or the minimum thickness based inequality constraint is modified using an importance factor, which is set to zero during an initial stage of the iteratively modifying and is adjusted during a subsequent stage of the iteratively modifying based on whether or not one or more other constraints were violated in a prior iteration of the iteratively modifying.

Also as described above with reference to FIGS. 4D-4F, PID control can be used to adjust the target value of the volume fraction or the minimum thickness based inequality constraint between an initial target value and a final target value across multiple iterations of the iteratively modifying. The PID control can also be used to adjust and stabilize changes made in an amount of modification for the modeled object, determined from evaluation of the volume fraction or the minimum thickness based inequality constraint, as the target value is adjusted across the multiple iterations.

Returning to FIG. 6A, a fatigue safety factor inequality constraint for the modeled object can be redefined 612 based on a damage fraction calculated from the required number of loading cycles for the modeled object and the expected number of loading cycles for each of the one or more in-use load cases for the physical structure.

In some implementations, the one or more in-use load cases for the physical structure includes two or more in-use load cases for the physical structure, and the one or more design criteria includes a required number of loading cycles for the modeled object for each of the two or more in-use load cases for the physical structure. In those implementations, the determining 610 the expected number of loading cycles includes determining a separate number of expected loading cycles for each of multiple points e.g., points identified as critical using one or more techniques. Alternatively, the determining 610 is done for each point x on the surface of the design at each iteration as detailed in Equations 132 and 133 on the implicit surface for each of the two or more in-use load cases.

In some implementations, the redefining 612 the fatigue safety factor inequality constraint includes summing, for each of the multiple points, load-specific damage fractions corresponding to the two or more in-use load cases. Each load-specific damage fraction includes an expected number of loading cycles, for one of the multiple points and one of the in-use load cases, divided by the required number of loading cycles for one of the in-use load cases, to produce a sum of the load-specific damage fractions for each of the multiple points. The sums are inverted, and a minimum value of the inverted sums is used to redefine the fatigue safety factor inequality constraint for the modeled object. See e.g., Equation 109.

Shape change velocities for the implicit surface are computed 614 in accordance with at least the fatigue safety factor inequality constraint. Then, the level-set representation is updated 616 using the shape change velocities to produce an updated version of the three dimensional shape of the modeled object. In some implementations, the computing 614 includes computing at least one shape change velocity using an amount determined from a shape derivative formula that approximates a shape derivative of the fatigue safety factor.

The performing 608, the determining 610, the redefining 612, the computing 614, and the updating 616 is repeated until a check 618 determines that a predefined number of shape modification iterations have been performed or that the generatively designed three dimensional shape of the modeled object in the design space has converged to a stable solution for the one or more design criteria and the one or more in-use load cases, e.g., as described above with reference to FIG. 3A.

Design Digital Twin

The relationship between a manufactured part and a designed part can be made into a digital twin so that the difference between the intended design and physical part is reduced. This is particularly prevalent in additively manufactured parts where effects of thickness and build angle can have significant effect on the performance of the part. It is difficult to account for this in the design process, particularly when applying other optimization techniques, e.g., as described above with reference to FIGS. 3A-6E. Therefore, known relationships between the thickness of a feature and its build angles can be applied on a per-element basis, whereas conventional techniques assume an equal strength across the entire part.

Figure 7A:
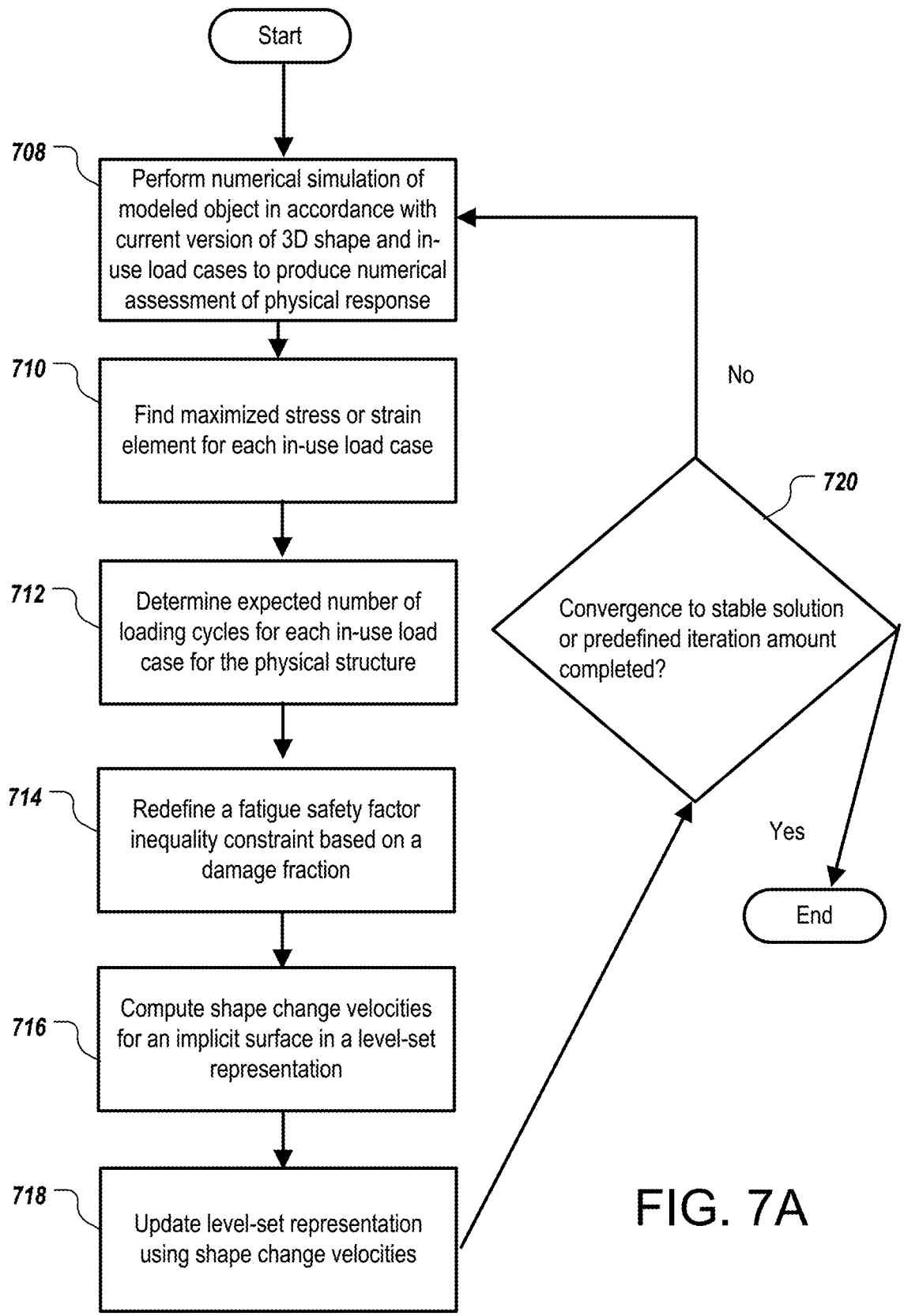
FIG. 7A is an example of a process of iteratively modifying a generatively designed three dimensional shape of a modeled object in the design space in accordance with the one or more design criteria, including a stress constraint.

FIG. 7A is an example of a process of iteratively modifying a generatively designed three dimensional shape of a modeled object in the design space in accordance with the one or more design criteria, including a stress constraint. Numerical simulation of the modeled object is performed 708 in accordance with a current version of the three dimensional shape and the one or more in-use load cases to produce a current numerical assessment of a physical response of the modeled object. The physical response can be a structural response of the modeled object under the one or more in-use load cases. The numerical simulation can be performed 708, for example, as described above with reference to FIG. 3A.

A maximized stress or strain element is found 710 for each of the one or more in-use load cases for the physical structure from the current numerical assessment of the physical response of the modeled object. The maximum stress or strain element can be the stress, strain, or both, of a point, location, or region of a modeled object. A description of Fatigue Constraints and calculating stress constraints is described above, in reference to FIGS. 5A and 6A.

Dependency on Feature Size and Build Angle

Additively manufactured components (e.g., metal components) have varying strength for different build angle and component thickness values. The Von Mises stress target at a point x is modified as a function of the thickness $h(x)$ and build angle $\beta(x)$ which is measured with respect to some constant build direction. Thickness can be measured by any suitable technique or combination of techniques, including the techniques described above with reference to FIG. 6B.

Figure 7B:
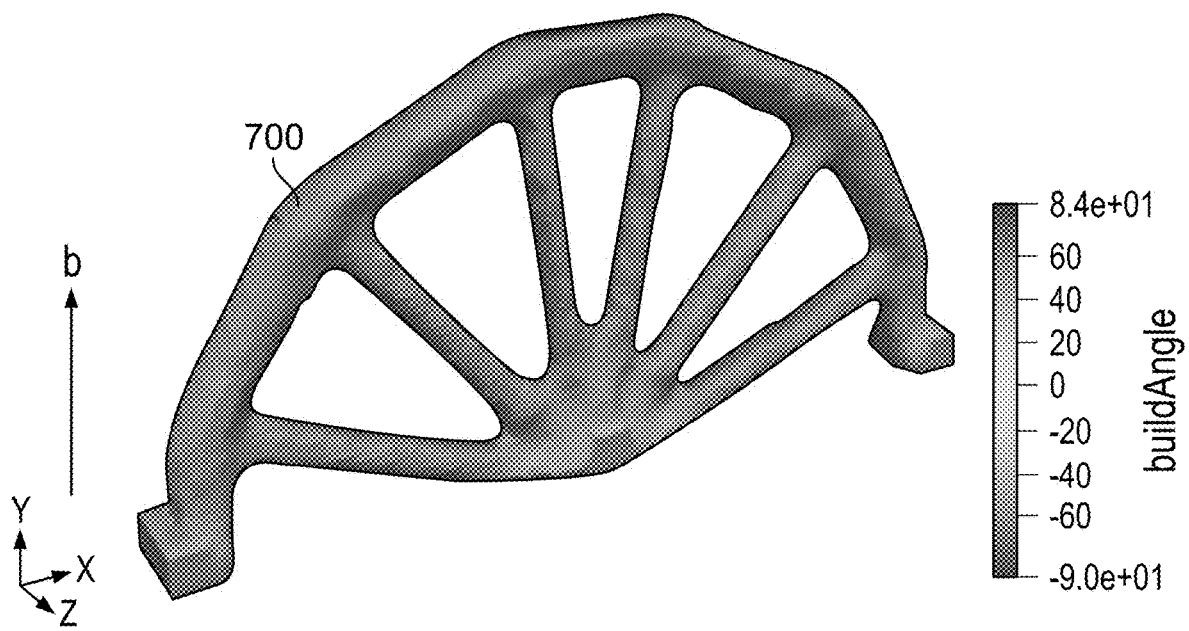
FIG. 7B shows a graphical representation of an example of a build angle measured on an object.

FIG. 7B shows a graphical representation of an example of a build angle measured on an object 700. The build angle at a point x on the surface is computed using $$\beta(x) = \frac{x}{2} - \cos^{-1}[n(x), b]$$

where $n(x)$ is the normal to the surface at x. An internal location for an object is a location that is not on the surface of the object. For those locations, a build angle can be computed by first projecting the internal location along a predetermined build direction, to a surface location of the three dimensional shape. Then, a build angle is determined for the internal location from an angle of the normal of the surface location with respect to the predetermined build direction, using the above-mentioned formula $\beta(x)$.

The Von Mises stress constraint is used and takes the following form:

$$\max_{\Omega} \sigma(x) - \sigma_T \leq 0. \tag{134}$$

where $\sigma_T$ is a fixed stress target for each material. This now varies as a function of thickness and build angle resulting in the stress constraint being modified as $$[\sigma(X) - \tilde{\sigma}_T(h(x), \beta(x))] \leq 0 \quad \forall x \in \Omega. \tag{135}$$

The variability on build angle and thickness is transferred from the stress target to the stress itself. For convenience, and while maintaining the same safety factor:

$$\frac{\sigma_T}{\bar{\sigma}_T(h(x), \beta(x))} \sigma(x) - \sigma_T \leq 0 \, \forall \, x \in \Omega. \quad (136)$$

The constraint can be enforced using methods described above with reference to Arbitrary Constraint Handling and FIGS. 4A-4H, with a shape derivative of a combined distance-normal-curvature penalty used and derived below. In some implementations, the volume shape derivative may be used as the proxy shape derivative, as shown in Equation 105.

Next, a derivative of a shape derivative for a distance-normal-curvature penalty is presented. First, derivations for the shape derivatives of signed distance functions, functions of unit normal vectors, and surface curvature functions are presented, respectively. Then, a derivation of the combined penalty from these three shape derivatives is presented.

Shape Derivative of the Signed Distance Function

Let $\Omega \subset \mathbb{R}^3$ be a domain with boundary $\partial \Omega$. In this specification the distance function of $\partial \Omega$, which is the mapping $d_{\partial \Omega}: \mathbb{R}^3 \to \mathbb{R}$ defined by:

$$d_{\partial \Omega}(x) := \min_{y \in \partial \Omega} \|x - y\| \quad (137)$$

For each $x \in \mathbb{R}^3$ define the set $\Pi_{\partial \Omega}(x) := \{y \in \partial \Omega : d_{\partial \Omega}(x) = \|x-y\|\}$ as the set of $y \in \Omega$ for which the minimum above is achieved. In the case where $\Pi_{\partial \Omega}(x)$ consists of exactly one point, that point is known as the nearest-point projection of x onto $\partial \Omega$ and is denoted by $\text{proj}_{\partial \Omega}(x)$. Also assign a sign to the distance function as follows: for $x \in \Omega$, $\text{sign}_{\partial \Omega}(x) = -1$ and for $x \in \mathbb{R}^3 \setminus \Omega$ $\text{sign}_{\partial \Omega}(x) = +1$. The signed distance function of $\partial \Omega$ can now be defined as $$sdf_{\partial \Omega}(x) := \text{sign}_{\partial \Omega}(x) \cdot d_{\partial \Omega}(x). \quad (138)$$

It is easy to see that $d_{\partial \Omega}$ is 1-Lipschitz, i.e., its difference quotients are uniformly bounded by one. Thus by Rademacher's theorem, it is differentiable almost everywhere, and this is true regardless of the nature of $\partial \Omega$. The medial axis of $\partial \Omega$ is defined as the set $S \subseteq \mathbb{R}^3$ where the square of the distance function is not differentiable. $d_{\partial \Omega}$ is never differentiable on $\partial \Omega$ whereas $d_{\partial \Omega}^2$ is differentiable on $\partial \Omega$ at least when $\partial \Omega$ is a differentiable surface. So the medial axis is defined using $d_{\partial \Omega}^2$ to exclude all but the exceptional points of $\partial \Omega$. By definition, S has a Lebesgue measure equal to zero. It can be shown that the set of points $x \in \mathbb{R}^3$ for which $\Pi_{\partial \Omega}(x)$ consists of at least two distinct points is a subset of S.

For support in the following description, the following facts in differential geometry are presented. For ease of description, assume that the boundary of $\Omega$ is "reasonable" in the sense that its tangent planes exist and vary differentiably so that the curvature of $\partial \Omega$ can be defined using the tangential derivatives of the unit normal vector field. Also assume $\partial \Omega$ is at least $C^2$, meaning that an can be expressed as the union of a finite collection of graphs of $C^2$ functions.

Let $n_{\partial \Omega}: \partial \Omega \to \mathbb{R}^3$ be the unit outward normal vector field of $\partial \Omega$. Let $k_1(y), k_2(y)$ be the principle curvatures at $y \in \partial \Omega$ with respect to $n_{\partial \Omega}$ and let $E_1(y), E_2(y)$ be an orthogonal basis of the tangent plane of $\partial \Omega$ at y aligned with the principle curvature directions at y.

Proposition 1. Let $\Omega$ be a domain with $C^2$ boundary. Suppose $x \notin S$. Then $sdf_{\partial \Omega}$ is twice-differentiable at x. If in addition, $x \notin \partial \Omega$, then $d_{\partial \Omega}$ is also twice-differentiable at x. A point $x \in \mathbb{R}^3$ has a unique projection onto $\partial \Omega$ if and only if $x \notin S$. In such a case, $d_{\partial \Omega} = \|x - \text{proj}_{\partial \Omega}(x)\|$ and the gradient of $sdf_{\partial \Omega}$ at x is $$\nabla sdf_{\partial \Omega}(x) = n_{\partial \Omega}(\text{proj}_{\partial \Omega}(x)) = \frac{x - \text{proj}_{\partial \Omega}(x)}{sdf_{\partial \Omega}(x)} \text{ when } \notin \partial \Omega \quad (139)$$

For every $x \in \mathbb{R}^3$ and every $y \in \Pi_{\partial \Omega}(x)$, the following holds:

$$-k_i(\text{proj}_{\partial \Omega}(x)) \times sdf_{\partial \Omega}(x) \leq 1 \quad \forall i = 1, 2 \quad (140)$$

Moreover, the closure of S consists of all points in S together with all points for which at least one of the inequalities above is strict.

Suppose x is not in the closure of S. Then $$\nabla^2 sdf_{\partial \Omega}(x) = \quad (141)$$

$$\sum_{i=1}^{2} \frac{k_i(\text{proj}_{\partial \Omega}(x))}{1 + k_i(\text{proj}_{\partial \Omega}(x)) \times sdf_{\partial \Omega}(x)} E_i(\text{proj}_{\partial \Omega}(x)) \otimes E_i(\text{proj}_{\partial \Omega}(x))$$

and $$\nabla \text{proj}_{\partial \Omega}(x) = \quad (142)$$

$$\sum_{i=1}^{2} \frac{1}{1 + k_i(\text{proj}_{\partial \Omega}(x)) \times sdf_{\partial \Omega}(x)} E_i(\text{proj}_{\partial \Omega}(x)) \otimes E_i(\text{proj}_{\partial \Omega}(x))$$

Let $T_\varepsilon : \mathbb{R}^3 \to \mathbb{R}^3$ be a one-parameter family of transformations of $\mathbb{R}^3$ arising as the flow of a vector field $\Theta: \mathbb{R}^3 \to \mathbb{R}^3$. This means: $T_\varepsilon$ satisfies the equations:

$$\frac{\partial T_\varepsilon}{\partial \varepsilon} = \Theta \circ T_\varepsilon \quad (143)$$

$$T_0 = \text{Identity} \quad (144)$$

Recall that the Lagrangian derivative of a shape-dependent function $f_\Omega: \mathbb{R}^3 \to \mathbb{R}$ with respect to this variation is defined as:

$$\dot{f}_{\Omega(x)} := \frac{\partial}{\partial \varepsilon} f_{T_\varepsilon(\Omega)}(T_\varepsilon(x))|_{\varepsilon=0} \quad (145)$$

and the Eulerian derivative of $f_\Omega$ with respect to this variation is defined as:

$$f_\Omega'(x) := \dot{f}_\Omega(x) - \langle \nabla f_\Omega(x), \theta(x) \rangle \quad (146)$$

The next result gives the Eulerian derivative of the signed distance function.

Proposition 2. If x does not belong to the closure of S, then the Eulerian derivative of the signed distance function with respect to the variation generated by a vector field $\Theta$ at x satisfies:

$$sdf_{\partial \Omega}'(x) = -\langle \theta(\text{proj}_{\partial \Omega}(x)), n_{\partial \Omega}(\text{proj}_{\partial \Omega}(x)) \rangle \quad (147)$$

A proof follows. First, compute the Lagrangian derivative of the signed distance function with respect to the variation generated by a vector field $\theta$ at x. For this $sdf_{T\varepsilon}(\partial\Omega)$ $(T_\varepsilon(x))=\|T_\varepsilon(x)-y_\varepsilon\|$ is used where $y_\varepsilon$ minimizes $\|T_\varepsilon(x)-y\|$ over all $y \in T_\varepsilon(\partial\Omega)$. The result is $$[sdf_{\partial\Omega}(x)]=\langle n_{\partial\Omega}(\text{proj}_{\partial\Omega}(x)), \theta(x)-\theta(\text{proj}_{\partial\Omega}(x))\rangle \quad (148)$$

which is obtained with the help of differentiating the condition $sdf_{\partial\Omega}(T_\varepsilon^{-1}(\mathcal{Y}_\varepsilon))=0$. Similarly, it can be shown that the gradient term in the definition of the Eulerian derivative is $\langle n_{\partial\Omega}(\text{proj}_{\partial\Omega}(x)), \theta(x)\rangle$. The desired formula follows.

Consider a shape function of the form:

$$\Phi(\Omega):=\int_\Omega \phi(x, sdf_{\partial\Omega}(x))dx \quad (149)$$

where $\phi$ is a smooth function of its arguments. The shape derivative of $\phi$ is computed using the standard tools of shape calculus, as well as the formula for the Eulerian derivative of the signed distance function.

Proposition 3. Let $T_\varepsilon: \mathbb{R}^3 \to \mathbb{R}^3$ be a one-parameter family of transformations of $\mathbb{R}^3$ arising as the flow of a vector field $\Theta: \mathbb{R}^3 \to \mathbb{R}^3$. Then $$\frac{d}{d\varepsilon}\phi(T_\varepsilon(\Omega))|_{\varepsilon=0} = -\int_\Omega \partial_2\phi(x, sdf_{\partial\Omega}(x))\Theta^{\perp}(\text{proj}_{\partial\Omega}(x))dx + \int_{\partial\Omega}\phi(x,0)\Theta^{\perp}(x)d\sigma(x) \quad (150)$$

where $\Theta^{\perp}$ is the normal component of $\Theta$ on $\partial\Omega$ and $\partial_{2\phi}$ is the partial derivative of $\phi$ with respect to its second argument. If the Eulerian derivative of a quantity is denoted by a prime, then $$\begin{aligned}\frac{d}{d\varepsilon}\phi(T_\varepsilon(\Omega))|_{\varepsilon=0} &= \int_\Omega [\phi(x, sdf_{\partial\Omega}(x))]'dx + \\ &\quad \int_{\partial\Omega}\phi(x, sdf_{\partial\Omega}(x))\Theta^{\perp}(x)d\sigma(x) \\ &= \int_\Omega \partial_2\phi(x, sdf_{\partial\Omega}(x))[sdf_{\partial\Omega}(x)]'dx + \\ &\quad \int_{\partial\Omega}\phi(x,0)\Theta^{\perp}(x)d\sigma(x) \\ &= -\int_\Omega \partial_2\phi(x, sdf_{\partial\Omega}(x))dx + \\ &\quad \int_{\partial\Omega}\phi(x,0)\Theta^{\perp}(x)d\sigma(x).\end{aligned} \quad (151)$$

Observe that the first integral appearing in the formula above is not in the standard form of the Hadamard-Zolésio structure theorem, namely a surface integral over $\partial\Omega$. The formula does still depend on $\Theta^{\perp}$ on $\partial\Omega$, so the theorem still holds. Using a change of variables based on the co-area formula, this integral can be expressed in the standard form. The following result is due to Dapogny et al., Geometric Constraints for Shape and Topology Optimization in Architectural Design. *Computational Mechanics*, Springer Verlag, (2017, 59(6), pp. 933-965).

Proposition 4. Let $\Omega$ be a domain with $C^2$ boundary. Then $$\int_\Omega \partial_2\phi(x, sdf_{\partial\Omega}(x))\Theta^{\perp}(\text{proj}_{\partial\Omega}(x))dx = \int_{\partial\Omega}\left(\int_0^{T(y)}\frac{\partial_2\phi(y-\tau n_{\partial\Omega}(y), \tau)}{J(y,\tau)}d\tau\right)\Theta^{\perp}(y)d\sigma(y) \quad (152)$$

where $T(y)$ is the distance to the medial axis of $\partial\Omega$ along the ray emanating inwards from $y \in \partial\Omega$ and $J(y, \tau)$ is the Jacobian factor of the change of variables, which is $$[J(y,T)]^{-1} = \Pi_{i=1}^2(1+\tau k_i(y)) \quad (153)$$

Note the Jacobian factor above has a particularly nice alternate form. Expanding the product yields:

$$\begin{aligned}[J(y,T)]^{-1} &= 1 + \tau(k_1(y)+k_2(y)) + \tau^2 k_1(y)k_2(y) \\ &= 1 + \tau H_{\partial\Omega(y)} + \tau^2 k_{\partial\Omega(y)}\end{aligned} \quad (154)$$

where $H_{\partial\Omega}$ and $K_{\partial\Omega}$ are the mean curvature and the Gauss curvature of $\partial\Omega$ respectively. This is because these are the invariants of the second fundamental form of $\partial\Omega$, of which the principal curvatures are the eigenvalues.

Shape Derivative of a Function of the Unit Normal Vector

Let $\Sigma$ be any oriented, smooth surface embedded in Euclidean space and let $Y: \mathbb{R}^3 \to \mathbb{R}^3$ be a smooth vector field defined on the background Euclidean space and that is completely independent of $\Sigma$. Consider shape functions of the form:

$$\Phi(\Sigma):=\int_\Sigma \phi(x,(Y(x), N_\Sigma(x))d\sigma(x)) \quad (155)$$

where $\phi: \mathbb{R}^3 \times \mathbb{R} \to \mathbb{R}$ is a smooth function of its arguments. The objects appearing in the integrand above are: the unit normal vector $N_\Sigma$ of $\Sigma$, the surface area element $d\sigma$ of $\Sigma$. The shape derivative of $\Phi$ at a given shape $\Sigma$ is calculated with respect to any given shape variation. This means: let $T_\varepsilon(\Sigma)$ be a variation of E generated by a one-parameter family of transformations $T_\varepsilon$ of Euclidean space; then the shape derivative with respect to this variation is $$\frac{d}{d\varepsilon}\Phi\left(T_\varepsilon\left(\sum\right)\right)\bigg|_{\varepsilon=0} \quad (156)$$

To calculate the shape derivative of $\Phi$, the transformation $T_\varepsilon$ is first described in more detail. There are a number of ways to proceed, and all are equivalent to first order in $\varepsilon$. The velocity method of Hadamard is chosen for the following description because it is well-suited to level set-based shape optimization, but it is understood that other methods can be used, such as those described in M. C. Delfour and J. P. Zolésio, *Shapes and Geometries: Metrics, Analysis, Differential Calculus, and Optimization*, ($2^{nd}$ Ed. 2011).

Suppose $T_\varepsilon: \mathbb{R}^3 \to \mathbb{R}^3$ is the transformation of $\mathbb{R}^3$ arising as the flow of a vector field $\Theta: \mathbb{R}^3 \to \mathbb{R}^3$. In other words, $T_\varepsilon$ satisfies the equations $$\begin{aligned}\frac{\partial T_\varepsilon}{\partial \varepsilon} &= \Theta \circ T_\varepsilon \\ T_0 &= \text{Identity}.\end{aligned} \quad (157)$$

$\nabla^{\|}$ is the tangential gradient operator, $\text{div}^{\|}$ is the tangential divergence operator, and $H_\Sigma$ is the mean curvature of $\Sigma$. Also, $\phi(x, \langle Y(x), N_\Sigma(x)\rangle)$ as $\phi(x,q(x))$ with $q(x):=\langle Y(x), N_\Sigma(x)\rangle$ is written to emphasize the structure of the integrand, and the partial derivative of $\phi$ is denoted with respect to its second argument as $$\frac{\partial \phi}{\partial q}.$$

Proposition 1. Let $\Sigma$ be an oriented, smooth surface embedded in Euclidean space and let $T_\varepsilon$ be a variation of $\Sigma$ generated by a vector field $\Theta : \mathbb{R}^3 \to \mathbb{R}^3$. The shape derivative of $\Phi$ at $\Sigma$ is given by $$\frac{d}{d\varepsilon}\Phi\big(T_\varepsilon(\Sigma)\big)\bigg|_{\varepsilon=0} = \int_\Sigma \left( div\Big\|\Big(\frac{\partial \phi}{\partial q}(x,q)Y\Big)\Big\| \right) + \frac{\partial \phi(x,q)}{\partial n} - \phi(x,q)H_\Sigma \right) \quad (158)$$

$$\Theta^\perp d\sigma$$

where $\Theta^\perp$ is the normal component of $\Theta$ on $\Sigma$, and $$\frac{\partial}{\partial n}$$

means the total directional derivative in the normal direction. A proof follows. Apply the calculus of Eulerian derivatives to obtain:

$$\frac{d}{d\varepsilon}\Phi\big(T_\varepsilon(\Sigma)\big)\bigg|_{\varepsilon=0} = \qquad (159)$$

$$\int_\Sigma \frac{\partial \phi}{\partial q}(x,q)q'd\sigma + \int_\Sigma \left(\frac{\partial \phi(x,q)}{\partial n} - \phi(s,q)H_\Sigma\right)\Theta^\perp d\sigma$$

where the prime denotes the Eulerian derivative.
$q' = \langle Y, N_\Sigma \rangle' = \langle Y', N_\Sigma \rangle + \langle Y', N_\Sigma \rangle + \langle Y, N_\Sigma' \rangle$, $= \langle Y^\|, \nabla^\|\Theta^\perp \rangle$, because $Y$ is shape-independent so its Eulerian derivative vanishes, and $N_\Sigma' = -\nabla^\|\Theta^\perp$. Thus $$\frac{d}{d\varepsilon}\Phi\big(T_\varepsilon(\Sigma)\big)\bigg|_{\varepsilon=0} = \qquad (160)$$

$$-\int_\Sigma \frac{\partial \phi}{\partial q}(x,q)\langle Y^\|, \nabla^\|\Theta^\perp\rangle d\sigma + \int_\Sigma \left(\frac{\partial \phi(x,q)}{\partial n} - \phi(x,q)H_\Sigma\right)\Theta^\perp d\sigma =$$

$$\int_\Sigma \left( div^\|\Big(\frac{\partial \phi}{\partial q}(x,q)Y^\|\Big) + \frac{\partial \phi(x,q)}{\partial n} - \phi(x,q)H_\Sigma \right)\Theta^\perp d\sigma$$

after integrating by parts.

Consider a specific application of the formula derived in the Equation 160. That is, the formula to the function $\phi$ in Dapogny et al., is applied, namely $$\phi(\langle X, N_\Sigma \rangle) := \|Y - N_\Sigma\|^2 = 2 - 2\langle X, N_\Sigma \rangle \qquad (161)$$

where $Y$ is a smooth, shape-independent unit vector field defined on Euclidean space. Since as a function of its argument, $\phi(x,q) = 2 - 2q$, then $$\frac{\partial \phi}{\partial q}$$

is the constant function $$\frac{\partial \phi}{\partial q}(q) = -2.$$

Therefore Proposition 1 yields in this case and:

$$\frac{d}{d\varepsilon}\Phi\big(T_\varepsilon(\Sigma)\big)\bigg|_{\varepsilon=0} = \qquad (162)$$

$$-2\int_\Sigma \left( div^\|(Y^\|) + \Big(\frac{\partial \langle Y, N_\Sigma\rangle}{\partial n} + (1 - \langle Y, N_\Sigma\rangle)H_\Sigma\Big)\right)\Theta^\perp d\sigma.$$

At this point the identity $$div(Y) = \frac{\partial Y^\perp}{\partial n} - Y^\perp H_\Sigma + div^\|(Y^\|)$$

is used that is valid for any vector field on the background Euclidean space and restricted to $\Sigma$. Therefore, $$\frac{d}{d\varepsilon}\Phi\big(T_\varepsilon(\Sigma)\big)\bigg|_{\varepsilon=0} = -2\int_\Sigma (div(Y) + H_\Sigma)\Theta^\perp d\sigma \qquad (163)$$

This formula is almost identical to the formula in the paper to Dapogny, et al. There are two differences: the first is that only the tangential divergence operator appears in paper to Dapogny; the second is that the mean curvature appears with the opposite sign in paper to Dapogny. The first difference is very likely due to an error, whereas the second difference is due to the fact that the paper to Dapogny, uses the opposite sign convention for the mean curvature. In the paper, $H_\Sigma$ is defined with respect to the inward unit normal, and here it is defined with respect to the outward unit normal. (The former convention has the advantage that the mean curvature of a sphere is positive and equal to 2, while the latter convention has the advantage that the theoretical formulas contain fewer minus signs in total despite the fact that the mean curvature of the unit sphere is $-2$.)

One can show that the mean curvature of a level set of the form $\{x \in \mathbb{R}^3 : F(x)=0\}$ for some level set function $F : \mathbb{R}^3 \to \mathbb{R}$ is equal to $-div(\nabla F/\|\nabla F\|)$ where $\nabla F/\|\nabla F\|$ is the unit normal vector field of the level set. Thus if the $Y$ in the formula of Proposition 1 is of this form, the shape derivative can be interpreted as the difference of the mean curvature of $\Sigma$ and the mean curvature of the level set.

A second example concerns the 2.5D manufacturability penalty. In this case, the penalty function $\Phi$ is used as before, but with integrand the function is $$\phi(x,q(x)) := [q(x)]^2 E(x) \qquad (164)$$

where $q(x) := \langle Y(x), N_\Sigma(x)\rangle$ as before but with a crucial difference—$Y$ is in fact a constant vector field which represents the milling direction, thus $$\frac{\partial \phi}{\partial q}(q) = 2qE(x).$$

The function $E(x)$ is a product of offset exponential bump functions. Therefore it follows that $$\frac{d}{d\varepsilon}\Phi\big(T_\varepsilon(\Sigma)\big)\bigg|_{\varepsilon=0} = \int_\Sigma \left( div^\|(2qEY^\|) + \frac{\partial}{\partial n}(q^2 E) - q^2 E H_\Sigma\right)\Theta^\perp d\sigma = \qquad (165)$$

-continued $$\int_\Sigma \left(2\langle \nabla''(qE), Y''\rangle + \frac{\partial}{\partial n}(q^2 E) - q^2 E H_\Sigma\right)\Theta^\perp d\sigma$$

since Y is constant.

Shape Derivative of Surface Curvature Functions

Let $\Sigma$ be a smooth oriented surface in $\mathbb{R}^3$. Consider shape functions which depend on the surface curvature invariants of $\Sigma$ (i.e. the mean curvature and the total curvature) of the form:

$$\Phi(\Sigma) := \int_\Sigma \phi(H_\Sigma, \|A_\Sigma\|^2) d\sigma \qquad (166)$$

where $H_\Sigma$ is the mean curvature of $\Sigma$, $\|A_\Sigma\|^2$ is the total curvature of $\Sigma$, and $\phi$ is a smooth function of its arguments.

A description follows for computing a shape derivative for shape functions of this form. In other words, it will be shown how to compute the derivative $$\left.\frac{d}{d\varepsilon}\Phi(T_\varepsilon(\Sigma))\right|_{\varepsilon=0} \qquad (167)$$

for any variation $T_\varepsilon(\Sigma)$ where $T_\varepsilon: \mathbb{R}^3 \to \mathbb{R}^3$ is a one-parameter family of transformations of $\mathbb{R}^3$ arising as the flow of a vector field $\theta: \mathbb{R}^3 \to \mathbb{R}^3$. This means: $T_\varepsilon$ satisfies the equations $$\frac{\partial T_\varepsilon}{\partial \varepsilon} = \Theta \circ T_\varepsilon \qquad (168)$$

$T_0$=Identity.

The principal geometric objects associated to the surface $\Sigma$ are the induced surface metric tensor $h_\Sigma$, i.e., the first fundamental form, the unit normal vector field $N_\Sigma$, and the second fundamental form $A_\Sigma$. A calculation of the derivatives of these components with respect to the variation introduced above is described above (or rather their components with respect to a local basis of the tangent bundle of $\Sigma$ because these quantities are tensorial).

To carry out the calculations, some preliminary notions are introduced in the context of embedded surfaces in Riemannian geometry. First, a local parametrization of $\Sigma$ is used near an arbitrary point $x \in \Sigma$ to parametrize a sufficiently small tubular neighborhood of $\Sigma$ near x by means of the mapping $(\varepsilon, x) \mapsto T_\varepsilon(x)$. Under this parametrization, the $\varepsilon$-direction maps to the vector field $\theta$. A pair of vector fields $\tilde{E}_1$, $\tilde{E}_2$ is introduced that are linearly independent sufficiently near $\Sigma$ and tangent to $T_\varepsilon(\Sigma)$ for every $\varepsilon$. This is achieved by pushing the local coordinate basis for the tangent bundle of $\Sigma$ with respect to the parametrization forward to a sufficiently small tubular neighborhood of $\Sigma$. This means: if $\Sigma^\circ_1$, $E^\circ_2$ denotes this basis, then the following definition is used $E_i(y) := DT_\varepsilon(E^\circ_i(x))$ for any y sufficiently near $\Sigma$ of the form $y = T_\varepsilon(x)$ for some $x \in \Sigma$. Here $DT_\varepsilon$ is the matrix of partial derivatives of $T_\varepsilon$. Second, a vector field N is defined on this tubular neighborhood with the property that if y sufficiently near $\Sigma$ is of the form $y = T_\varepsilon(x)$ for some $x \in \Sigma$, then N(y) is the unit normal vector field of $T_\varepsilon(\Sigma)$ at y. The notation $X = X^\parallel + X^\perp N$ for the orthogonal decomposition of a vector field X defined on this tubular neighborhood with respect to N. Note that if $y = T_\varepsilon(x)$ for some $x \in \Sigma$, then $X^\parallel(y)$ is tangent to $T_\varepsilon(\Sigma)$.

Let $h_\varepsilon$ and $A_\varepsilon$ be the pull-backs of the induced surface metric tensor and second fundamental form of $T_\varepsilon(\Sigma)$, respectively, to $\Sigma$. Then their components with respect to the local basis $\tilde{E}_1$, $\tilde{E}_2$ satisfy $$[h_\varepsilon]_{ij} = \langle \tilde{E}_i, \tilde{E}_j\rangle \circ T_\varepsilon \text{ and } [A_\varepsilon]_{ij} = \langle N, \nabla_{\tilde{E}_i}\tilde{E}_j\rangle \circ T_\varepsilon \qquad (169)$$

Let $[h_\varepsilon]^{ij}$ denote the components of the inverse of the matrix $h_\varepsilon$. Note that the sub scripted $\varepsilon$ is dropped when referring to these quantities on $\Sigma$.) Next, the vector field N satisfies $$\langle N, N\rangle \equiv 1 \text{ and } \langle N, \tilde{E}_i\rangle \equiv 0. \qquad (170)$$

Finally, by differentiating the defining equations for N, the following is deduced:

$$\langle \nabla_{\tilde{E}_i} N, N\rangle \equiv 0 \text{ and } \langle \tilde{E}_i, \nabla_{\tilde{E}_j} N\rangle = -[A_\varepsilon]_{ij} \qquad (171)$$

These two equations uniquely determine the vector field $\nabla_{\tilde{E}_i} N$. In fact, one can see that these equations establish $\nabla_{\tilde{E}_i} N = -\Sigma_{jk}[h_\varepsilon]^{jk}[A_\varepsilon]_{ij}\tilde{E}_k$ on $T_\varepsilon(\Sigma)$ A related result is the following lemma 1.

Lemma 1. The following formula holds:

$$\nabla_\Theta N = -\Sigma_{kl} h^{kl}(A_\Sigma(E_k, \Theta^\parallel) + E_k(\Theta^\perp))E_l. \qquad (172)$$

Proof. The equation $\langle N, N\rangle \equiv 1$ is differentiated in the $\Theta$-direction to deduce that $\nabla_\Theta N$ must be tangential. Then the equations $\langle N, \tilde{E}_i\rangle \equiv 1$ for i=1, 2 are differentiated in the $\Theta$-direction to deduce $$\langle \nabla_\Theta N, E_i\rangle = -\langle N, \nabla_\Theta \tilde{E}_i\rangle = -\langle N, \nabla_{\tilde{E}_i}\Theta\rangle = -\langle N, \nabla_{\tilde{E}_i}(\Theta^\parallel + \Theta^\perp N)\rangle = \qquad (173)$$

$$-\langle N, \nabla_{\tilde{E}_i}\Theta^\parallel + \tilde{E}_i(\Theta^\perp)N + \Theta^\perp \nabla_{\tilde{E}_i} N\rangle = -A_\Sigma(E_i, \Theta^\parallel) - E_i(\Theta^\perp)$$

for i=1, 2. This implies the result.

Lemma 2. Suppose $T_\varepsilon$ is the variation of $\Sigma$ generated by the vector field $\Theta$ and let $[h_\varepsilon]_{ij}$ be the components of the pull-back of the induced surface metric tensor of $T_\varepsilon(\Sigma)$ to $\Sigma$ with respect to any local basis $E_1$, $E_2$ for the tangent bundle of $\Sigma$. Then $$\left.\frac{\partial [h_\varepsilon]_{ij}}{\partial \varepsilon}\right|_{\varepsilon=0} = \langle \nabla^\parallel_{E_i} \Theta^\parallel, E_j\rangle + \langle \nabla^\parallel_{E_j} \Theta^\parallel, E_i\rangle - 2[A_\Sigma]_{ij}\Theta^\perp \qquad (174)$$

where $A_{ij}$ are the components of the second fundamental form of $\Sigma$ with respect to the local basis and $\nabla^\parallel$ denotes the surface covariant derivative operator.

Proof. The calculations can be performed in any local basis since it can be shown that the results are independent of the basis (this is a foundational principle of differential geometry). Therefore the local basis introduced above is used at an arbitrary $x \in \Sigma$. Hence by the definition and properties of covariant derivatives in $\mathbb{R}^3$ the following results $$\left.\frac{\partial [h_\varepsilon]_{ij}}{\partial \varepsilon}\right|_{\varepsilon=0} = \Theta\langle \tilde{E}_i, \tilde{E}_j\rangle = \langle \nabla_\Theta \tilde{E}_i, E_j\rangle + \text{same but with } i \leftrightarrow j = \qquad (175)$$

$$\langle \nabla_{\tilde{E}_i} \Theta, E_j\rangle + \text{same but with } i \leftrightarrow j$$

since the difference between the covariant derivatives above is the Lie bracket $[\Theta, \tilde{E}_i]$ which vanishes because both $\Theta$ and $\tilde{E}_i$ are push-forwards of coordinate basis vector fields. (In this calculation the notation $$Xf := \sum_k X^k \frac{\partial f}{\partial x^k}$$

is used, where $f:\mathbb{R}^3 \to \mathbb{R}$ is any differentiable function; this notation reflects the standard differential geometric practice of conflating the concept of a vector field X and the directional derivative operator in the X-direction.) Next, using the definition of the second fundamental form of $\Sigma$, the following is obtained:

$$\frac{\partial [h_\varepsilon]_{ij}}{\partial \varepsilon}\Big|_{\varepsilon=0} = \tilde{E}_i\langle\Theta, \tilde{E}_j\rangle - \langle\Theta, \nabla_{\tilde{E}_i}\tilde{E}_j\rangle + \text{same but with } i \leftrightarrow j \quad (176)$$
$$= E_i\langle\Theta^{\shortparallel}, E_j\rangle - \langle\Theta^{\shortparallel}, \nabla^{\shortparallel}_{\tilde{E}_i}E_j\rangle - \Theta^{\perp}\langle N_\Sigma, \nabla_{\tilde{E}_i}\tilde{E}_j\rangle +$$
$$= \text{same but with } i \leftrightarrow j$$
$$= \langle\nabla^{\shortparallel}_{\tilde{E}_i}\Theta^{\shortparallel}, E_j\rangle + \langle\nabla^{\shortparallel}_{\tilde{E}_j}\Theta^{\shortparallel}, E_i\rangle - 2\Theta^{\perp}A_{ij}$$

Lemma 3. Suppose $T_\varepsilon$ is the variation of $\Sigma$ generated by the vector field $\Theta$ and let $[A_\varepsilon]_{ij}$ be the components of the pull-back of the second fundamental form of $T_\varepsilon(\Sigma)$ to $\Sigma$ with respect to the local basis introduced above. Then $$\frac{\partial [A_\varepsilon]_{ij}}{\partial \varepsilon}\Big|_{\varepsilon=0} = E_i(E_j(\Theta^{\perp})) - \nabla^{\shortparallel}_{\tilde{E}_i}E_j(\Theta^{\perp}) - [A_\Sigma^2]_{ij}\Theta^{\perp} + \quad (177)$$
$$\nabla^{\shortparallel}_{E^i}A_\Sigma(E_j, \Theta^{\shortparallel}) + A_\Sigma(E_i, \nabla^{\shortparallel}_{E_j}\Theta^{\shortparallel}) + A_\Sigma(E_j, \nabla^{\shortparallel}_{\tilde{E}_i}\Theta^{\shortparallel}).$$

Proof. Again, the calculations can be performed in any local basis since it can be shown that the results are independent of the basis. Therefore the local basis introduced above is used at an arbitrary $x \in \Sigma$. By the definition of the pull-back of the second fundamental form of $T_\varepsilon(\Sigma)$, its components with respect to this local basis satisfy $[A_\varepsilon]_{ij} = \langle N, \nabla_{\tilde{E}_i}\tilde{E}_j\rangle \circ T_\varepsilon$. Hence by the definition and properties of covariant derivatives in $\mathbb{R}^3$ the following results:

$$\frac{\partial [A_\varepsilon]_{ij}}{\partial \varepsilon}\Big|_{\varepsilon=0} = \Theta\langle N, \nabla_{\tilde{E}_i}\tilde{E}_j\rangle = \langle\nabla_\Theta N, \nabla_{\tilde{E}_i}\tilde{E}_j\rangle + \langle N, \nabla_\Theta\nabla_{\tilde{E}_i}\tilde{E}_j\rangle. \quad (178)$$

Using Lemma 1 in the first term of Equation 178 gives
$$\langle\nabla_\Theta N, \nabla_{\tilde{E}_i}\tilde{E}_j\rangle = A_\Sigma(\nabla_{E_i}^{\shortparallel}E_j, \Theta^{\shortparallel}) - \nabla^{\shortparallel}_{E_i}E_j(\Theta^{\perp}). \quad (179)$$

The following deductions are made for the second term of Equation 178:

$$\langle N, \nabla_\Theta\nabla_{\tilde{E}_i}\tilde{E}_j\rangle = \langle N, \nabla_{\tilde{E}_i}\nabla_{\tilde{E}_j}\Theta\rangle \quad (180)$$
$$= \langle N, \nabla_{\tilde{E}_i}(\nabla^{\shortparallel}_{\tilde{E}_j}\Theta^{\shortparallel} + E_j(\Theta^{\perp})N + \Theta^{\perp}\nabla_{\tilde{E}_j}N)\rangle$$
$$= \langle N, \nabla_{\tilde{E}_i}(\nabla^{\shortparallel}_{\tilde{E}_j}\Theta^{\shortparallel} + A_\Sigma(E_j, \Theta^{\shortparallel})N + E_j(\Theta^{\perp})N + \Theta^{\perp}\nabla_{\tilde{E}_j}N)\rangle$$
$$= A_\Sigma(E_i, \nabla^{\shortparallel}_{\tilde{E}_j}\Theta^{\shortparallel}) + E_i(A_\Sigma(E_j, \Theta^{\shortparallel})) +$$
$$E_i(E_j(\Theta^{\perp})) - [A_\Sigma^2]_{ij}\Theta^{\perp}$$

since $\langle N, N\rangle = 1$ and the equations uniquely characterizing $\nabla_{\tilde{E}_i}N$ together imply that $$\langle N, \nabla_{\tilde{E}_i}\nabla_{\tilde{E}_j}N\rangle = -\langle\nabla_{\tilde{E}_i}N, \nabla_{\tilde{E}_j}N\rangle = -\Sigma_{kl}h^{kl}A_{ik}A_{jl} = -[A_\Sigma^2]_{ij} \quad (181)$$

Substituting the two derivations into Equation 178 now yields $$\frac{\partial [A_\varepsilon]_{ij}}{\partial \varepsilon}\Big|_{\varepsilon=0} = E_i(E_j(\Theta^{\perp})) - \nabla^{\shortparallel}_{\tilde{E}_i}E_j(\Theta^{\perp}) - [A_\Sigma^2]_{ij}\Theta^{\perp} - \quad (182)$$
$$A_\Sigma(\nabla^{\shortparallel}_{\tilde{E}_i}E_j, \Theta^{\shortparallel}) + A_\Sigma(E_i, \nabla^{\shortparallel}_{\tilde{E}_j}\Theta^{\shortparallel}) + E_i(A_\Sigma(E_j, \Theta^{\shortparallel}))$$
$$= E_i(E_j(\Theta^{\perp})) - \nabla^{\shortparallel}_{\tilde{E}_i}E_j(\Theta^{\perp}) - [A_\Sigma^2]_{ij}\Theta^{\perp} +$$
$$\nabla^{\shortparallel}_{\tilde{E}_i}A_\Sigma(E_j, \Theta^{\shortparallel}) + A_\Sigma(E_i, \nabla^{\shortparallel}_{\tilde{E}_j}\Theta^{\shortparallel}) + A_\Sigma(E_j, \nabla^{\shortparallel}_{\tilde{E}_i}\Theta^{\shortparallel})$$

using the definition $\nabla^{\shortparallel}_{E_i}A_\Sigma(E_j, \Theta^{\shortparallel}) = -A_\Sigma(\nabla^{\shortparallel}_{E_i}E_j, \Theta^{\shortparallel}) - A_\Sigma(E_j, \nabla^{\shortparallel}_{E_i}\Theta^{\shortparallel}) + E_i(A_\Sigma(E_j, \Theta^{\shortparallel}))$ of the surface covariant derivative of a covariant two-tensor.

The surface curvature invariants of $\Sigma$ are: the total curvature, i.e., the squared norm of the second fundamental form with respect to the induced surface metric tensor, denoted $\|A_\Sigma\|^2$; and the mean curvature, i.e., the trace of the second fundamental form with respect to the induced surface metric tensor, denoted $H_\Sigma$. Note that the Gauss curvature or intrinsic curvature of $\Sigma$ is given in terms of these invariants by the formula $G_\Sigma := (H_\Sigma^2 - \|A_\Sigma\|^2)/2$. The derivatives of these quantities are now given with respect to the variation introduced above.

Proposition 4. Suppose $T_\varepsilon$ is the variation of $\Sigma$ generated by the vector field $\Theta$ and let $H_\varepsilon$ be the mean curvature of $T_\varepsilon(\Sigma)$. Then $$\frac{\partial h_\varepsilon \circ T_\varepsilon}{\partial \varepsilon}\Big|_{\varepsilon=0} = \Delta^{\shortparallel}\Theta^{\perp} + \|A_\Sigma\|^2\Theta^{\perp} + \sum_{ij}h^{ij}\nabla^{\shortparallel}_{\tilde{E}_i}A_\Sigma(E_j, \Theta^{\shortparallel}) \quad (183)$$

where $\Delta^{\shortparallel}$ is the surface Laplace-Beltrami operator.

Proof. Lemma 2 and 3 is applied to the definition $H_\varepsilon \circ T_\varepsilon := [h_\varepsilon]^{ij}[A_\varepsilon]_{ij}$. That is, $$\frac{\partial H_\varepsilon \circ T_\varepsilon}{\partial \varepsilon}\Big|_{\varepsilon=0} = \frac{\partial [h_\varepsilon]^{ij}}{\partial \varepsilon}\Big|_{\varepsilon=0}A_{ij} + h^{ij}\frac{\partial [A_\varepsilon]_{ij}}{\partial \varepsilon}\Big|_{\varepsilon=0} \quad (184)$$
$$= -h^{ik}h^{jl}(\langle\nabla^{\shortparallel}_{\tilde{E}_k}\Theta^{\shortparallel}, E_l\rangle + \langle\nabla^{\shortparallel}_{\tilde{E}_l}\Theta^{\shortparallel}, E_k\rangle - 2\Theta^{\perp}A_{kl})A_{ij} +$$
$$\sum_{ij}h^{ij}\left(E_i(E_j(\Theta^{\perp})) - \nabla^{\shortparallel}_{\tilde{E}_i}E_j(\Theta^{\perp}) - [A_\Sigma^2]_{ij}\Theta^{\perp}\right) +$$
$$\sum_{ij}h^{ij}\left(\nabla^{\shortparallel}_{\tilde{E}_i}A_\Sigma(E_j, \Theta^{\shortparallel}) + A_\Sigma(E_i, \nabla^{\shortparallel}_{\tilde{E}_j}\Theta^{\shortparallel}) + A_\Sigma(E_j, \nabla^{\shortparallel}_{\tilde{E}_i}\Theta^{\shortparallel})\right)$$
$$= \nabla^{\shortparallel}\Theta^{\perp} + \|A_\Sigma\|^2\Theta^{\perp} + \sum_{ij}h^{ij}\nabla^{\shortparallel}_{\tilde{E}_i}A_\Sigma(E_j, \Theta^{\shortparallel})$$
$$= \Delta^{\shortparallel}\Theta^{\perp} + \|A_\Sigma\|^2\Theta^{\perp} + \langle\nabla^{\shortparallel}H_\Sigma, \Theta^{\shortparallel}\rangle$$

As required, $\lambda^{\shortparallel}$ is simply identified where it appears and the Codazzi equation is used to replace the $\nabla^{\shortparallel}A_\Sigma$ with the $\nabla^{\shortparallel}H_\Sigma$ term.

Proposition 5. Suppose $T_\Sigma$ is the variation of $\Sigma$ generated by the vector field $\Theta$ and let $\|A_\varepsilon\|^2$ be the total curvature of $T_\varepsilon(\Sigma)$ Then $$\frac{\partial \|A_\varepsilon\|^2 \circ T_\varepsilon}{\partial \varepsilon}\Big|_{\varepsilon=0} = 2A_\Sigma : (\nabla^{\shortparallel}\nabla^{\shortparallel}\Theta^{\perp}) + \quad (185)$$
$$2Tr(A_\Sigma^3)\Theta^{\perp} + 2\sum_{ijkl}h^{ij}h^{kl}[A_\Sigma]_{kl}A_\Sigma(\nabla^{\shortparallel}_{\tilde{E}_i}A_\Sigma(E_j, \Theta^{\shortparallel}))$$

Proof. Apply Lemma 2 and 3 to the definition $\|A_\varepsilon\|^2 \circ T_\varepsilon := [h_\varepsilon]^{ik}[h_\varepsilon]^{jl}[A_\varepsilon]_{ij}[A_\varepsilon]_{kl}$. The required calculations are similar to those of the proof of the previous lemma.

Variation of Integrated Surface Curvatures

In this section, surface integrals of the surface curvature invariants of $\Sigma$ are considered. First, the following preliminary result is described.

Lemma 6. Suppose $T_\varepsilon$ is the variation of E generated by the vector field $\Theta$ and let $[h_{249}]_{ij}$ be the components of the pull-back of the induced surface metric tensor of $T_\varepsilon(\Sigma)$ to $\Sigma$ with respect to any local basis $E_1$, $E_2$ for the tangent bundle of $\Sigma$. Let $\phi_\Sigma : \Sigma \to \mathbb{R}$ be a surface-dependent scalar function that is shape-differentiable. Then $$\frac{d}{d\varepsilon} \int_{T_\varepsilon(\Sigma)} \phi_\Sigma d\sigma_\varepsilon \Big|_{\varepsilon=0} = \tag{186}$$

$$\int_\Sigma \frac{\partial \phi_{\Sigma_\varepsilon} \circ T_\varepsilon}{\partial \varepsilon} \Big|_{\varepsilon=0} d\sigma + \int_\Sigma \phi_\Sigma (div^\|(\Theta^\|) - H_\Sigma \Theta^\perp) d\sigma$$

where $div^\|$ is the surface divergence operator and $H_\Sigma$ is the mean curvature of $\Sigma$.

Proof. By the change of variables formula for surface integrals, $$\frac{d}{d\varepsilon} \int_{T_\varepsilon(\Sigma)} \phi_\Sigma d\sigma_\varepsilon \Big|_{\varepsilon=0} = \int_\Sigma \frac{1}{\sqrt{\det(h)}} \frac{\partial}{\partial \varepsilon} \tag{187}$$

$$(\phi_{\Sigma_\varepsilon} \circ T_\varepsilon \sqrt{\det(h_\varepsilon)})\Big|_{\varepsilon=0} d\sigma$$

$$= \int_\Sigma \frac{\partial \phi_{\Sigma_\varepsilon} \circ T_\varepsilon}{\partial \varepsilon} \Big|_{\varepsilon=0} d\sigma +$$

$$\int_\Sigma \frac{\phi_\Sigma}{\sqrt{\det(h)}} \frac{\partial \sqrt{\det(h_\varepsilon)}}{\partial \varepsilon} \Big|_{\varepsilon=0} d\sigma$$

To conclude, Lemma 2 and the following calculation is used:

$$\frac{\partial \sqrt{\det(h_\varepsilon)}}{\partial \varepsilon} \Big|_{\varepsilon=0} = \frac{1}{2} \sqrt{\det(h)} \, Tr\left(\sum_{ij} h^{ij} \frac{\partial [h_\varepsilon]_{ij}}{\partial \varepsilon} \Big|_{\varepsilon=0}\right) \tag{188}$$

$$= \frac{1}{2} \sqrt{\det(h)} \, Tr\left(\sum_{ij} h^{ij} (\langle \nabla^\|_{E_i} \Theta^\|, E_j\rangle + \langle \nabla^\|_{E_j} \Theta^\|, E_i\rangle - 2\Theta^\perp A_{ij})\right)$$

$$= \sqrt{\det(h)} \, (div^\|(\Theta^\|) - H_\Sigma \Theta^\perp)$$

Proposition 7. Let $\phi$ be a surface integral operator of the form stated in the Introduction. Suppose $T_\varepsilon$ is the variation of $\Sigma$ generated by the vector field $\Theta$. Then $$\frac{d}{d\varepsilon} \Phi(T_\varepsilon(\Sigma)) \Big|_{\varepsilon=0} = \int_\Sigma \partial_1 \phi(H_\Sigma, \|A_\Sigma\|^2) \frac{\partial H_{\Sigma_\varepsilon} \circ T_\varepsilon}{\partial \varepsilon} \Big|_{\varepsilon=0} d\sigma + \tag{189}$$

$$\int_\Sigma \partial_2 \phi(H_\Sigma, \|A_\Sigma\|^2) \frac{\partial \|A_{\Sigma_\varepsilon}\|^2 \circ T_\varepsilon}{\partial \varepsilon} \Big|_{\varepsilon=0} d\sigma +$$

$$\int_\Sigma \phi(H_\Sigma, \|A_\Sigma\|^2)(div^\|(\Theta^\|) - H_\Sigma \Theta^\perp) d\sigma.$$

Substituting the results of Propositions 4 and 5:

$$\frac{d}{d\varepsilon} \Phi(T_\varepsilon(\Sigma)) \Big|_{\varepsilon=0} = \int_\Sigma \partial_1 \phi(H_\Sigma, \|A_\Sigma\|^2)(\Delta^\| \Theta^\perp + \|A_\Sigma\|^2 \Theta^\perp) d\sigma + \tag{190}$$

$$\int_\Sigma \partial_1 \phi(H_\Sigma, \|A_\Sigma\|^2)\langle \nabla^\| H_\Sigma, \Theta^\|\rangle d\sigma +$$

$$2 \int_\Sigma \partial_2 \phi(H_\Sigma, \|A_\Sigma\|^2)(A_\Sigma : (\nabla^\| \nabla^\| \Theta^\perp) +$$

$$Tr(A_\Sigma^3) \Theta^\perp) d\sigma +$$

$$2 \int_\Sigma \partial_2 \phi(H_\Sigma, \|A_\Sigma\|^2)$$

$$\sum_{ijkl} h^{ij} h^{kl} [A_\Sigma]_{kl} A_\Sigma (\nabla^\|_{E_i} A_\Sigma (E_j), \Theta^\|) d\sigma +$$

$$\int_\Sigma \phi(H_\Sigma, \|A_\Sigma\|^2)(div^\|(\Theta^\|) - H_\Sigma \Theta^\perp) d\sigma$$

$$= \int_\Sigma \partial_1 \phi(H_\Sigma, \|A_\Sigma\|^2)(\Delta^\| \Theta^\perp + \|A_\Sigma\|^2 \Theta^\perp) d\sigma +$$

$$2 \int_\Sigma \partial_2 \phi(H_\Sigma, \|A_\Sigma\|^2)(A_\Sigma : (\nabla^\| \nabla^\| \Theta^\perp) +$$

$$Tr(A_\Sigma^3) \Theta^\perp) d\sigma -$$

$$\int_\Sigma \phi(H_\Sigma, \|A_\Sigma\|^2) H_\Sigma \Theta^\perp d\sigma$$

since all terms containing $\Theta^\|$ can be shown to equal $\int_\Sigma div^\|(\phi(H_\Sigma, \|A_\Sigma\|^2) \Theta^\|) d\sigma$ which vanishes by the generalized Stokes' Theorem.

Shape Derivative of a Combined Distance-Normal Curvature Penalty

Let $\Omega$ be a domain in $\mathbb{R}^3$. The general form of a class of shape functions for penalizing geometric features of $\Omega$, based on the signed distance function, as well as the normal vector field and the curvature invariants of the boundary surface $\partial\Omega$. Specifically, consider the shape function:

$$\mathcal{J}(\Omega) := \int_\Omega \phi(\chi, d_{\partial\Omega}(\chi)) d\chi + \int_{\partial\Omega} \psi(\chi, d_{\partial\Omega}(\chi) \cdot n_{\partial\Omega}(\chi) \cdot H_{\partial\Omega}(x)) dx \tag{191}$$

where $\phi$ and $\psi$ are smooth functions of their arguments, and $d_{\partial\Omega}$, $n_{\partial\Omega}$, $H_{\partial\Omega}$ are the signed distance function, the normal vector field, and the mean curvature of $\partial\Omega$, respectively. Most of the geometric performance functions, e.g., surface area, Willmore energy for shape smoothing, thickness penalty, overhang angle penalty can be cast in this form.

The calculation of the shape derivative of Equation 191 breaks up into pieces thanks to the Chain Rule for shape differentiation. Let $\Omega_\varepsilon$ be a variation of $\Omega$ generated by the boundary velocity function $\Theta : \partial\Omega \to \mathbb{R}^3$, with tangential and normal parts denoted by $\Theta^\|$ and $\Theta^\perp$ respectively. Then, $$\frac{d}{d\varepsilon} \mathcal{J}(\Omega_\varepsilon) \Big|_{\varepsilon=0} = \tag{192}$$

$$\int_\Omega \partial_1 \phi \cdot \Theta + \partial_2 \phi \cdot [d_{\partial\Omega}] + \phi div(\Theta) + \int_{\partial\Omega} \partial_1 \psi \cdot (\Theta^\| + n_{\partial\Theta}\Theta^\perp) +$$

$$\partial_2 \psi \cdot [d_{\partial\Omega}] + \partial_3 \psi \cdot [n_{\partial\Omega}] + \partial_4 \psi \cdot [H_{\partial\Omega}] + \int_{\partial\Omega} \psi(div^\|(\Theta^\|) - H_{\partial\Omega}\Theta^\perp)$$

where ● denotes the so-called Lagrangian derivative and $\partial_k$ denotes taking the partial derivative with respect to the $k^{th}$ slot of the operand. The Lagrangian derivative of a function $f$ is defined as the derivative of $f$ along the variation induced by $\theta$. The Lagrangian derivative of a vector field is defined similarly.

Each of the Lagrangian-differentiated expressions above has a formula in terms of $\Theta^\|$ and $\Theta^\perp$ which have been derived above. Moreover, it can be shown that the dependence on $\Theta^{\|}$ drops out of the final expression entirely (this result is known as the Hadamard-Zolésio Structure Theorem). This is shown by introducing the Eulerian derivative defined by $f':=f^{\bullet}-\nabla f\cdot\Theta$ for volumetric integrands, and $f':=f^{\bullet}-\nabla^{\|}f\cdot\Theta^{\|}$ for surface integrands. Now thanks to Stokes' Theorem, all the explicit dependence on $\Theta^{\|}$ disappears:

$$\frac{d}{d\varepsilon}\mathcal{J}(\Omega_\varepsilon)\Big|_{\varepsilon=0} = \int_\Omega div(\phi\Theta) + \partial_2\phi\cdot[d_{\partial\Omega}]' + \int_{\partial\Omega} \partial_1\psi\cdot n_{\partial\Omega}\Theta^\perp + \qquad (193)$$
$$\partial_2\psi\cdot[d_{\partial\Omega}]' + \partial_3\psi\cdot[n_{\partial\Omega}]' + \partial_4\psi\cdot[H_{\partial\Omega}]' +$$
$$\int_{\partial\Omega} div^{\|}(\psi\Theta^{\|}) - \psi H_{\partial\Omega}\Theta^\perp$$
$$= \int_{\partial\Omega}\phi\Theta^\perp + \int_{\partial\Omega}(\partial_1\psi\cdot n_{\partial\Omega} - \psi H_{\partial\Omega})\Theta^\perp +$$
$$\int_\Omega \partial_2\phi\cdot[d_{\partial\Omega}]' + \int_{\partial\Omega}\partial_2\psi\cdot[d_{\partial\Omega}]' +$$
$$\partial_3\psi\cdot[n_{\partial\Omega}]' + \partial_4\psi\cdot[H_{\partial\Omega}]'$$

The remaining Eulerian-differentiated terms can be handled using the following equations derived-above. These are:

$$[d_{\partial\delta}]'=-\Theta^\perp\circ\text{proj}_{\partial\delta} \qquad (194)$$

$$[n_{\partial\delta}]'=-\nabla^{\|}\Theta^\perp \qquad (195)$$

$$[H_{\partial\delta}]'=\Delta^{\|}\theta^{\|}+\|A_{\partial\delta}\|^2\Theta^\perp \qquad (196)$$

where $\text{proj}_{\partial\delta}$ is the nearest-point projection onto $\partial\delta$, and $\Delta^{\|}$ is the Laplace-Beltrami operator of $\partial\delta$, and $\|A_{\partial\delta}\|^2$ is the squared Frobenius norm of the second fundamental form of $\partial\delta$ (a.k.a. the total curvature or sum of the squared principal curvatures). Substituting these into the Equation 193 yields the shape derivative formula.

Figure 7C:
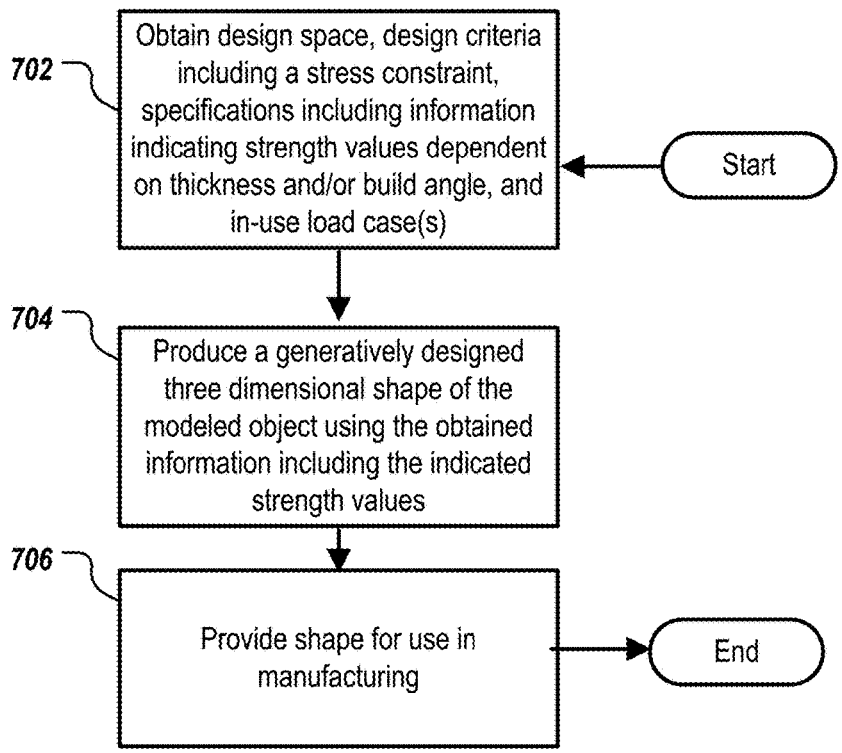
FIG. 7C shows an example of a process of generating one or more portions of a three dimensional model of an object to be manufactured, using a stress constraint.

FIG. 7C shows an example of a process of generating one or more portions of a three dimensional model of an object to be manufactured, using a stress constraint. A computer aided design program obtains 702 a design space for a modeled object, for which a corresponding physical structure will be additively manufactured, design criteria for the modeled object including at least one stress constraint, at least one in-use load case for the physical structure, and a specification of one or more materials from which the physical structure will be additively manufactured.

The specification includes information, e.g., dataset or a function of thickness, build angle, or both, to generate a corresponding strength for the material. The specification indicates multiple strength values for the one or more materials, that are each dependent upon one or both of a thickness of the physical structure to be built using the one or more materials, and a build angle. The object to be manufactured is additively manufactured using the one or more materials.

A generatively designed three dimensional shape of the modeled object is produced 704, including modifying both a geometry of the three dimensional shape and a topology of the three dimensional shape, in accordance with the design criteria, the at least one in-use load case, and the specification of one or more materials. The producing 704 includes varying, during object shape and topology modification of the modeled object, evaluation of the stress constraint at different locations on or in the modeled object in accordance with respective values from the multiple strength values. In some implementations, other constraints are used, e.g., a strain constraint or a displacement constraint. Each strength value corresponds to one or both of the thickness and the build angle at each one of the different locations. Note that the described Design Digital Twin techniques can be implemented with density based topology optimization, e.g., using the SIMP method, rather than a boundary based topology optimization, e.g., the level-set method as described in connection with FIG. 7A. In either case, the generatively designed three dimensional shape of the modeled object is provided 706 for use in additively manufacturing the physical structure.

In some implementations, each strength value corresponds to the thickness or both the thickness and the build angle at each one of the different locations. Further, the producing 704 includes: measuring the thickness at each one of the different locations; and computing a respective strength value based on at least the measured thickness at each one of the different locations. As described above with reference to FIG. 6B, measuring the thickness can include using a measure of thickness for the generatively designed three dimensional shape of the modeled object that is a combination of at least two distinct thickness measures. The two distinct measures can include a combination of at least (i) a first distance measure being a length within the modeled object of a ray cast in a negative normal direction from a surface point of the modeled object, and (ii) a second distance measure being a diameter of a largest sphere that touches the surface point of the modeled object and fits inside the modeled object as determined by checking discrete sampling locations defined on the sphere's surface.

In some implementations, modifying both the geometry and the topology of the three dimensional shape includes enforcing a design criterion that limits a minimum thickness of the generatively designed three dimensional shape of the modeled object, e.g., a minimum thickness being based on the critical fatigue crack length for the material, as described with reference to FIGS. 6A-6E. A minimum thickness can be a ratio of the critical fatigue crack length, such as a minimum thickness that is 10× the critical fatigue crack length.

Returning to FIG. 7A, an expected number of loading cycles is determined 712 for each of the one or more in-use load cases for the physical structure using the maximized stress or strain element and data relating fatigue strength to loading cycles. The data relating fatigue strength to loading cycles can be empirical, i.e., from a table of previously measured strengths for a corresponding material, e.g., as shown in FIG. 6D, or the data can be generated based on a function that generates, as output, a fatigue strength for an input number of loading cycles for a given load case of the object constructed using a corresponding material.

A fatigue safety factor inequality constraint is redefined for the modeled object based on a damage fraction calculated from the required number of loading cycles for the modeled object and the expected number of loading cycles for each of the one or more in-use load cases for the physical structure. Techniques for Handling Arbitrary Constraints, including inequality constraints can be applied, as described above with reference to FIGS. 4A-4H.

Shape change velocities for an implicit surface in a level-set representation of the three dimensional shape are computed 716 in accordance with at least the fatigue safety factor inequality constraint. The level-set representation is updated 718 using the shape change velocities to produce an updated version of the three dimensional shape of the modeled object. In some implementations, computing the shape change velocities includes computing at least one shape change velocity using a gradient determined from a shape derivative of one or both of the thickness and the build angle at each of the different locations, e.g., the shape derivative shown in Equation 193 and derived above.

Alternatively or in combination, i.e., where there are multiple shape change constraints, shape change velocities can be computed using at least one shape change velocity with an amount determined from a shape derivative formula that approximates a shape derivative of one or both of the thickness and the build angle at each of the different locations. One example shape derivative formula is the volume shape derivative formula, described above with reference to Equation 105.

As described above with reference to Arbitrary Inequality Constraints and Equations 91-102, importance factors can be applied to inequality constraints to modify a volume fraction based inequality constraint using a shape derivative formula that includes the volume fraction based inequality constraint. This constraint can also be a minimum thickness inequality constraint described above with reference to Equations 123-127, or a stress based inequality constraints, as described above with reference to FIGS. 5A-6E. The constraints can be modified using an importance factor, which is adjusted based on whether or not one or more other constraints were violated in a prior iteration of the iteratively modifying. An example of the modification of the importance factor is multiplying with a violation multiplier.

The performing 708, the finding 710, the determining 712, the redefining 714, the computing 716 and the updating 718 is repeated until a check 720 determines that a predefined number of shape modification iterations have been performed or that the generatively designed three dimensional shape of the modeled object in the design space has converged to a stable solution for the one or more design criteria and the one or more in-use load cases, as described above with reference to FIG. 3A. Any constraint can be run with design digital twin as long as numerical simulation is run during the process, e.g., any constraint handled as described above with reference to FIGS. 4A-4H. Therefore, digital twin is not exclusive to damage tolerance fatigue. Similarly, any number of constraints could co-exist alongside design digital twin as it only affects the material model used in the numerical simulation.

Singularities and Disconnections

Stress constraints, including Von Mises stress constraints, can be essential for running generative design, but they are hard to implement due to few elements in a Finite Element Analysis model showing very high stresses. A probabilistic method is provided, below, that can mitigate or outright eliminate such high stresses. Although the examples below refer to stress constraints, these techniques can be applied to avoiding singularities and preventing disconnections during generative design for any constraint. Singularities can occur, for example due to sharp re-entrant corners or bad meshing. The process described below can be implemented to be performed automatically as part of a generative design process, e.g., including the techniques described above with reference to FIGS. 3A-7C.

Figure 8A:
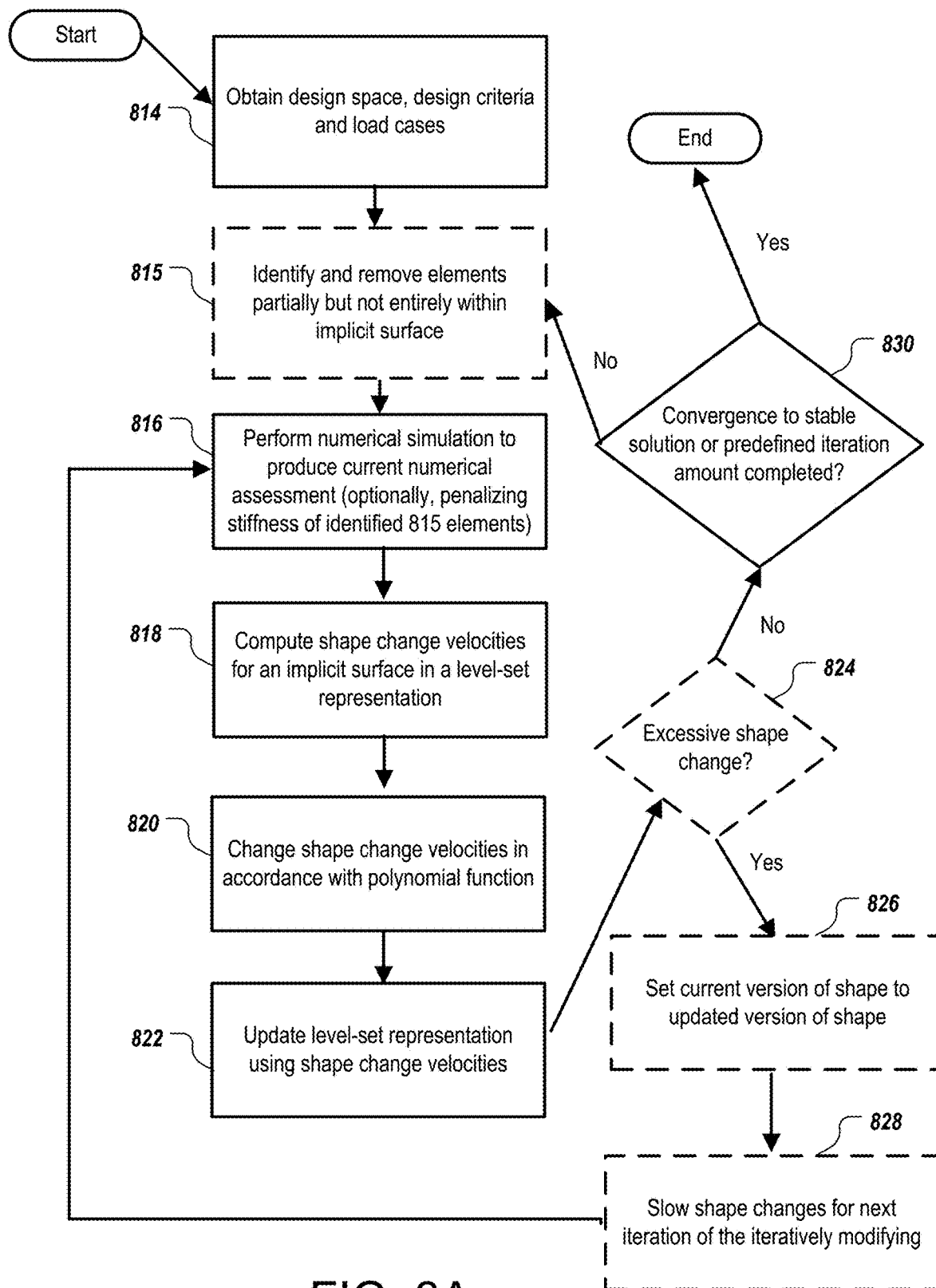
FIG. 8A shows an example of a process of iteratively modifying a generatively designed three dimensional shape of a modeled object in the design space in accordance with the one or more design criteria, while avoiding excessive sudden changes and minimizing the likelihood of disconnections.

FIG. 8A shows an example of a process of iteratively modifying a generatively designed three dimensional shape of a modeled object in the design space in accordance with the one or more design criteria, while avoiding excessive sudden changes and minimizing the likelihood of disconnections. A computer aided design program obtains 814 a design space for a modeled object, for which a corresponding physical structure will be manufactured, one or more design criteria for the modeled object, and one or more in-use load cases for the physical structure. A generatively designed three dimensional shape of the modeled object is iteratively modified in the design space in accordance with the one or more design criteria and the one or more in-use load cases for the physical structure, e.g., as described above with reference to FIGS. 3A, 4A, 5A, 6A, and 7A.

One solution for avoiding singularities is to replace the maximum stress by a simple percentile value $\sigma^x$ in Equation 134, modified below.

$$\max_{\Omega} \sigma \leftarrow \sigma^x x \in \{0.9, 0.95, 0.99, 0.999 \text{ etc}\} \tag{197}$$

where $\sigma^x$ denotes the stress of the element in the $x^{th}$ percentile when elements are sorted in increasing order of $\sigma$. However, this results in the maximum stress in the domain max no-being too sensitive to the value of x. Instead, the percentile x is converted into a standard normal deviate z using the inverse of the error function $$z = erf^{-1}(x) = \frac{1}{2}\sqrt{\pi}\left(x + \frac{\pi}{12}x^3 + \frac{7\pi^2}{480}x^5 + \frac{127\pi^3}{40320}x^7 + \ldots\right) \tag{198}$$

Next, the maximum stress is computed from $$\max_{\Omega} \sigma \leftarrow \mu(\sigma) + z\chi(\sigma) \tag{199}$$

where $\mu(\sigma)$ and $\chi(\sigma)$ denote the mean and standard deviation of the stress distribution, both of which can be computed according to any conventional technique.

TABLE 1, below, shows stress singularities for an object that are avoided based on the techniques described in this section:

TABLE 1

| Percentile x | Maximum Stress based on Percentile $\sigma^x$ | Maximum Stress Based on Standard Deviation $\mu(\sigma) + erf^{-1}(x) \chi(\sigma)$ |
|---|---|---|
| .95 | 133.87 | 123.597 |
| .99 | 224.08 | 144.41 |
| .999 | 500.315 | 168.56 |
| .9999 | 815.34 | 188.84 |

The percentile based method brings stability to the oscillatory nature of global stress, by smoothing the maximum stress at a point based on the standard deviation of stress values for points on the object in the same percentile.

High Velocity Smoothing

The previous section described regulating the maximum value of constraint values in the domain, i.e., $\max_{\Omega} g^i$. The same is true for the constraint derivative $dg_r/d_\Omega$, denoted by $dg_r$ for clarity.

Figure 8B:
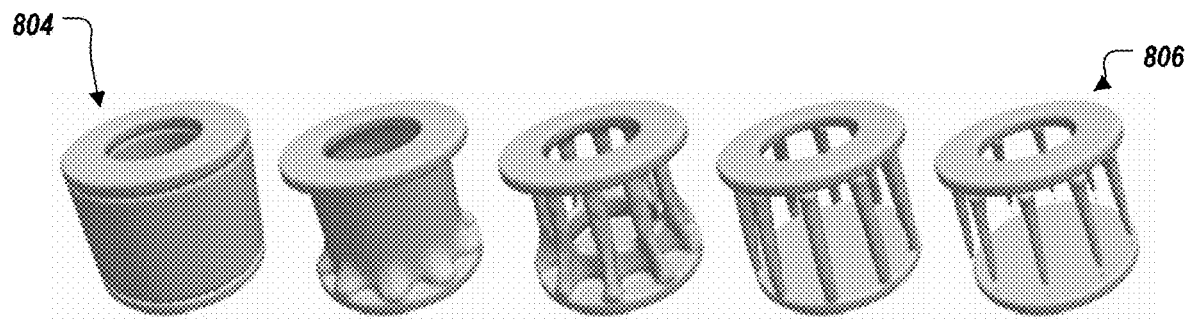
FIG. 8B is a graphical representation of an example of geometry disconnection during optimization.

FIG. 8B is a graphical representation of an example of geometry disconnection during optimization. Object 804 is shown at different stage of optimization. Typically, geometric ports can disconnect (shown at 806) from the main body of the design where the load path is taken by the Ersatz material. Having a small region with very high advection velocity causes disconnections and localized shape changes. A combination of velocity clamping and high velocity smoothing can be used to prevent this.

Normalization: all shape derivatives can be normalized such that the magnitude of the maximum value on the surface of the current design $\Gamma$ approximates the voxel size $\Delta s$ $$(dg_t(x_K))_{normalised} = \Delta s \frac{dg_t(x_k)}{|\max_{x_k \in \Gamma} dg_t(x_k)|} \quad (200)$$

This implies an advection time of $T=1/\Delta s$ is sufficient to prevent the geometry from advecting beyond one voxel. An easy way to achieve this is through velocity clamping.

Velocity clamping: the first step in velocity clamping is computing a reference value for the shape derivative following the percentile approach described above with reference to Equations 197-199.

$$(dg_t)_{ref} = \mu(dg_t) + \text{erf}^{-1}(x)\chi(dg_t) \quad (201)$$

where $\mu$ and $\chi$ denote the mean and standard deviation of the shape derivative on the surface and $x \in \{0.9, 0.95, 0.99, 0.999$ etc.$\}$ is a user-given percentile. Note that the percentile value x could be much higher for well behaved shape derivatives (without excessive highs) such as strain energy and lower for widely fluctuating shape derivatives, such as stress.

Next, for all grid points $x_k$ in the inner narrow band, i.e., a narrow band width equal to $w_{nb}\Delta s$, velocity values higher than the reference value $(dg_t)_{ref}$ are clamped while preserving the sign $\beta$ as follows:

$$(dg_t(x_k))_{clamped} = \beta \min\left[|dg_t(x_k)|, \left|(dg_{t_{ref}})\right|\right] - w_{nb}\Delta s \leq \psi(x_k) \leq 0 \quad (202)$$

$$\beta = \frac{dg_t(x_k)}{[dg_t(x_k)]}$$

where $\psi(x_t)$ denotes the level-set of the grid point. However, this results in a sudden change in the velocity profile. Velocity clamping should be done in such a manner that there is a smooth transition in the velocity profile.

High velocity smoothing: The objective in high velocity smoothing is to smooth all high velocities $(|dg_t| > |(dg_t)_{ref}|)$ such that there is a gradual smoothing of all values above the reference velocity computed from Equation 201. A user given parameter $\rho$, e.g., $\rho = 0.85$, is used to scale all velocity values less than the reference velocity $$(dg_t(x_k))_{smooth} = \rho\beta|dg_t(x_k)|\frac{|dg_t(x_n)|}{|(dg_t)_{ref}|} k < k_{ref} \quad (203)$$

where $k_{ref}$ denotes the position index of the grid point once they are sorted in order of the shape derivative.

The smoothed velocity of all grid points with velocity greater than the reference velocity are found by fitting a cubic polynomial, as follows:

$$(dg_t(x_k))_{smooth} = a\xi^3 + b\xi^2 + c\xi + d k_{ref} \leq k \leq n \quad (204)$$

where $\xi$ denotes the shifted index $\tau = k - k_{ref}$. The unknown coefficients $\{a, b, c, d\}$ can be found solving the linear system of equations obtained by settings the appropriate boundary conditions at $\xi = 0$ and $\xi = \xi_{max} = n - k_{ref}$ $$\begin{bmatrix} (0)^3 & (0)^2 & (0)^1 & 1 \\ (\xi_{max})^3 & (\xi_{max})^2 & (\xi_{max})^1 & 1 \\ 3(0)^2 & 2(0)^1 & 1 & 0 \\ 3(\xi_{max})^2 & 2(\xi_{max})^1 & 1 & 0 \end{bmatrix} \begin{bmatrix} a \\ b \\ c \\ d \end{bmatrix} = \begin{bmatrix} dg_t(x_{k_{ref}}) \\ dg_t(x_n) \\ \nabla(dg_t(x_{k_{ref}}))_{smooth} \\ 0 \end{bmatrix} \quad (205)$$

The gradient of the smooth velocity at $\xi = 0$ can be obtained as $$\nabla\left(dg_t\left(x_{k_{ref}}\right)\right)_{smooth} = \rho\nabla\left(dg_t\left(x_{k_{ref}}\right)\right)\frac{|dg_t(x_n)|}{|(dg_t)_{ref}|}. \quad (206)$$

Finally, the smoothed normalized velocity is given by $$(dg_t(\chi_k))_{smooth\ normalized} = \Delta s \frac{(dg_t(x_k))_{smooth}}{|\max_{x_k \in \Gamma}(dg_t(x_k))_{smooth}|}. \quad (207)$$

Returning to FIG. 8A, within the iteratively modifying, a numerical simulation of the modeled object in accordance with a current version of the three dimensional shape and the one or more in-use load cases is performed 816 to produce a current numerical assessment of a physical response, e.g., a structural response, of the modeled object. Shape change velocities are computed 818 for an implicit surface in a level-set representation of the three dimensional shape, e.g., as described above with reference to FIG. 3A.

Then, the shape change velocities are changed 820 in accordance with a polynomial function that has been fit to at least a portion of the shape change velocities above a reference velocity. For example, the polynomial function can be a cubic polynomial, as described above with reference to Equation 204. Although the example given is a cubic polynomial, other different-order polynomials can be used.

The level-set representation is updated 822 using the shape change velocities to produce an updated version of the three dimensional shape of the modeled object, e.g., as described above with reference to FIG. 3A. In some implementations, the reference velocity is set based on a mean and a standard deviation of a shape derivative on the implicit surface, e.g., as described above.

The performing 816, the computing 818, the changing 820, and the updating 822 is repeated in the iteratively modifying until check 830 determines that a predefined number of shape modification iterations have been performed or that the generatively designed three dimensional shape of the modeled object in the design space has converged to a stable solution for the one or more design criteria and the one or more in-use load cases, e.g., as described above with reference to FIG. 3A. Finally, the generatively designed three dimensional shape of the modeled object can be provided for use in manufacturing the physical structure corresponding to the modeled object using one or more computer-controlled manufacturing systems.

Backup and Restore

Another technique for preventing geometric disconnections is backing up of all critical data, including the geometric level-set at each iteration, and restoring the data when the result of advection is not desirable. Thus, in some implementations, after the updating 822 but before the repeating, excessive changes can be checked 824 for that were made during the updating. In those cases, the current version of the three dimensional shape can be set 826 as the updated version of the three dimensional shape for a next iteration to undue the excessive change, i.e., the excessive change is undone. Then, shape changes for the next iteration of the iteratively modifying can be slowed 828, as described below. Slowing the changes for the next iteration can include reducing a target volume change for the generatively designed three dimensional shape of the modeled object for the next iteration of the iteratively modifying.

To prevent a repeat of the same undesirable outcome, the volume change $\Delta v_t$ computed for each iteration t, as described above with reference to FIGS. 4A-4H is modified as follows and using a multiplier $\beta$ which slows down the convergence by applying a smaller volume change:

$$\Delta v_t \leftarrow \beta \Delta v_t. \quad (208)$$

This multiplier can be initiated as $\beta=1$ at the start and updated in every iteration depending on the outcome of each advection using a fixed increment $\Delta\beta(>0)$:

$$\beta \leftarrow \max(0, \beta - \Delta\beta) \text{ if advection undesirable} \quad (209)$$

$$\beta \leftarrow \min(1, \beta - \Delta\beta) \text{ otherwise} \quad (210)$$

The next task is to classify the outcome of each advection as desirable/undesirable. One way to achieve this is to monitor the change in the Lagrangian, i.e., as described above with reference to Equations 15-25. This can be implemented in a more granular manner by imposing limits on allowable relative changes for objectives. The relative change in an objective/constraint for a given iteration t is defined as $$\Delta \mathcal{J}_t = \left| \frac{\mathcal{J}_t - \mathcal{J}_{t-1}}{\mathcal{J}_{ref,t}} \right| \quad (211)$$

$$\Delta g_t^j = p_t^j \left| e_t^j - e_{t-1}^j \right| \quad (212)$$

where the constraint error $e_t^j$ is computed using a PID stabilized version of Equation 95 with the importance factor term $p_t^j$ computed using techniques described above with reference to Arbitrary Inequality Constraints and FIGS. 4A-4H. The reference value of the objective, denoted by $\mathcal{J}_{ref,t}$ is given by $$\mathcal{J}_{ref,t} = \max_{i=0}^{t} |\mathcal{J}_i|. \quad (213)$$

The maximum allowable change in objectives is limited to $\mathcal{J}_{max}^-, \mathcal{J}_{max}^+$ for objective decrease and increase, respectively. The maximum allowable change in constraints is limited to $\mathcal{G}_{max}^p, \mathcal{G}_{max}^n$ for positive (good), negative (bad) changes in constraints respectively. The sign of the constraint inequality needs to be checked to determine the appropriate limit.

Thus, in some implementations, before the performing 816 is done, elements that are generated from the current version of the three dimensional shape for the numerical simulation, but that are partially but not entirely within the implicit surface with Dirichlet boundary conditions are identified and removed 815 before performing the numerical simulation. The element and nodes refer to how the design geometry is represented during the performing 816. In finite element simulation, the domain is replaced by a collection of elements. Each element is defined by a set of nodes along the boundary of the element and, in some cases, inside the element. Generally, the more elements and nodes in the model, the higher the accuracy of the simulation. The set of techniques for creating these nodes and elements is referred to as meshing.

During optimization, the shape of the current domain repeatedly changes. The model can be re-meshed at every iteration for the finite element model to accurately represent the current domain. Since this is computationally expensive, some generative design processes deactivate the elements that lie outside the current domain at each iteration. The representation of the current design can be improved in the numerical simulation model by removing elements not entirely within the implicit surface. The overall accuracy can be improved by considering such cut elements as having partial stiffness.

Further, in some implementations, the checking 824 for the excessive change can include comparing a change in the one or more design criteria resulting from the updating with a predefined limit on an amount of change allowed for the one or more design criteria in a single iteration of the iteratively modifying.

Ersatz Materials

A common practice in the SIMP method of topology optimization is to use variable density materials or ersatz materials. Elements with density $\rho=1$ are deemed to be inside the domain whereas those with $\in < \rho < 1$ are on the boundary with $\in$ (typically set to a small value such as 0.001) denoting the density of materials outside the design. During finite element analysis, the stiffness of each element is multiplied by the density along with a penalty factor p to penalize intermediate densities $$K \leftarrow \rho^p K. \quad (214)$$

The level-set method often uses only two states ($\rho \in \{\in, 1\}$) as the boundary and therefore is more clearly defined. The penalty factor is not required as there are no intermediate densities, i.e., $K \leftarrow \rho^p K$. However, this sometimes leads to disconnections as elements outside the domain with $\rho=\in$ can support the load path.

Additionally, it has been observed that having material with $\rho=\in$ severely affects the buckling safety factor predicted from the finite element model. Ersatz material can be removed completely from the finite element model where there is a significant impact on the predicted buckling factor. This is achieved by grouping all elements with $\rho=E$ at each iteration and removing all such groups that are not connected to any nodes with Dirichlet boundary conditions.

As noted above, in some implementations of the process shown in FIG. 8A, before the performing 816, elements generated from the current version of the three dimensional shape for the numerical simulation are identified 815 that are partially but not entirely within the implicit surface. Then, densities of the identified elements can be set equal to respective volume fractions of the identified elements, where a volume fraction of an identified element is a fractional amount of the identified element that falls within the implicit surface. In some implementations, the performing 816 can include penalizing stiffness of the identified elements according to the densities, as described below.

As another solution to severe disconnection problems, a tetrahedral-cutting algorithm can be applied, which reinstates the use of ersatz materials for elements on the boundary of the current domain. Essentially, the stiffness of such elements are better approximated by setting the density equal to the volume fraction of the element inside the domain. The stiffness is then penalized according to the density, as in the SIMP method, with a penalty factor of p=1:

$$\rho(e_i) = \frac{v(e_i \cap \Omega)}{v(e_i)} \quad (215)$$

$$K(e_i) \leftarrow \rho(e_i) K(e_i).$$

Computing the volume of each element inside the domain is not trivial as some elements with valid overlap with the domain may have all nodes outside the elements.

Figure 8C:
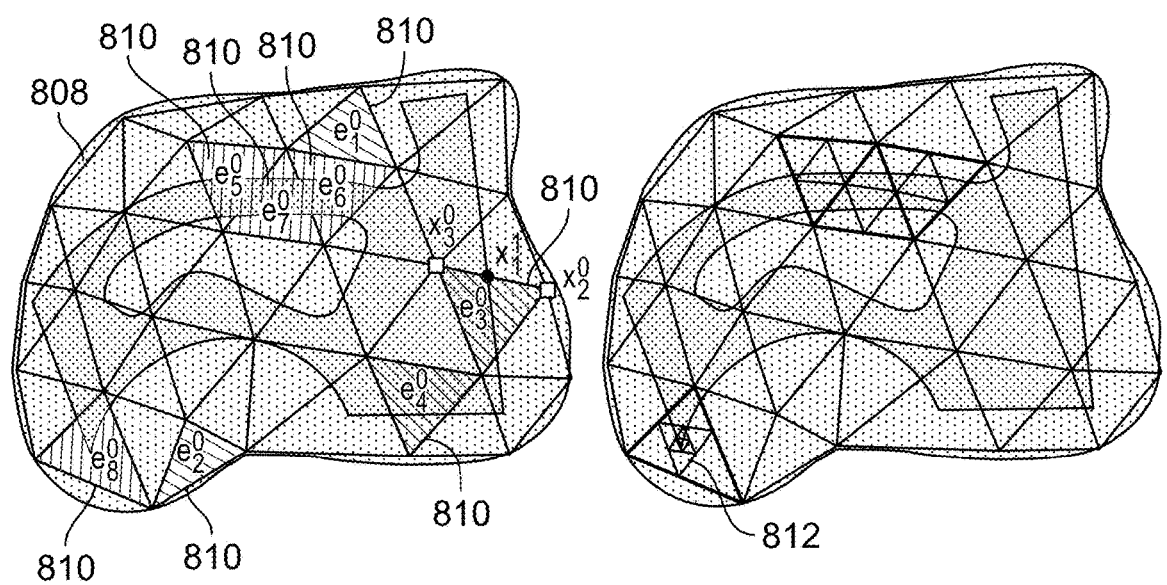
FIG. 8C is a graphical representation of an example of a geometry with simulation elements classified based on intersection of the elements with the geometry.

FIG. 8C is a graphical representation of an example of a geometry 808 with simulation elements 810 classified based on intersection of the elements 810 with the geometry 808. The problem is illustrated below with respect to elements 810 $e_5^0$, $e_6^0$, $e_7^0$. Such elements can be subdivided 812 until nodes are on either side of the $0^{th}$ iso-contour, i.e., $$\min_{x_i \in e} \psi(x_i) \max_{x_i \in e} \psi(x_i) < 0 \tag{216}$$

where $x_i$ denotes the nodal coordinates of element e. Note that certain elements (e.g., element 810 $e_8^0$) may have to be subdivided multiple times until they satisfy the condition of Equation 216. The required depth of subdivision l can be determined by recursively subdividing the element and comparing the total volume inside the domain $$V(e_i^l \cap \Omega) = \sum_{j \in C(e_i^l)} V(e_j^{l+1} \cap \Omega) \tag{217}$$

where $C(e_i^l)$ denotes the indices of the children of element $e_i^l$. The recursive subdivision can be stopped when the above condition is true. In some implementations, the voxel size $\Delta s$ is set to half the average edge length of solid elements. Given the smallest feature size≈$\Delta s$, only 1 level of subdivision is typically sufficient.

The volume fraction of a tetrahedron element can be cut by the domain. When computing the intersection point of an element edge with the $0^{th}$ iso-contour, linear interpolation can be used $$x_1^1 = \frac{\psi(x_1^0)x_2^0 - \psi(x_2^0)x_1^0}{\psi(x_1^0) - \psi(x_2^0)} \tag{218}$$

Figure 9:
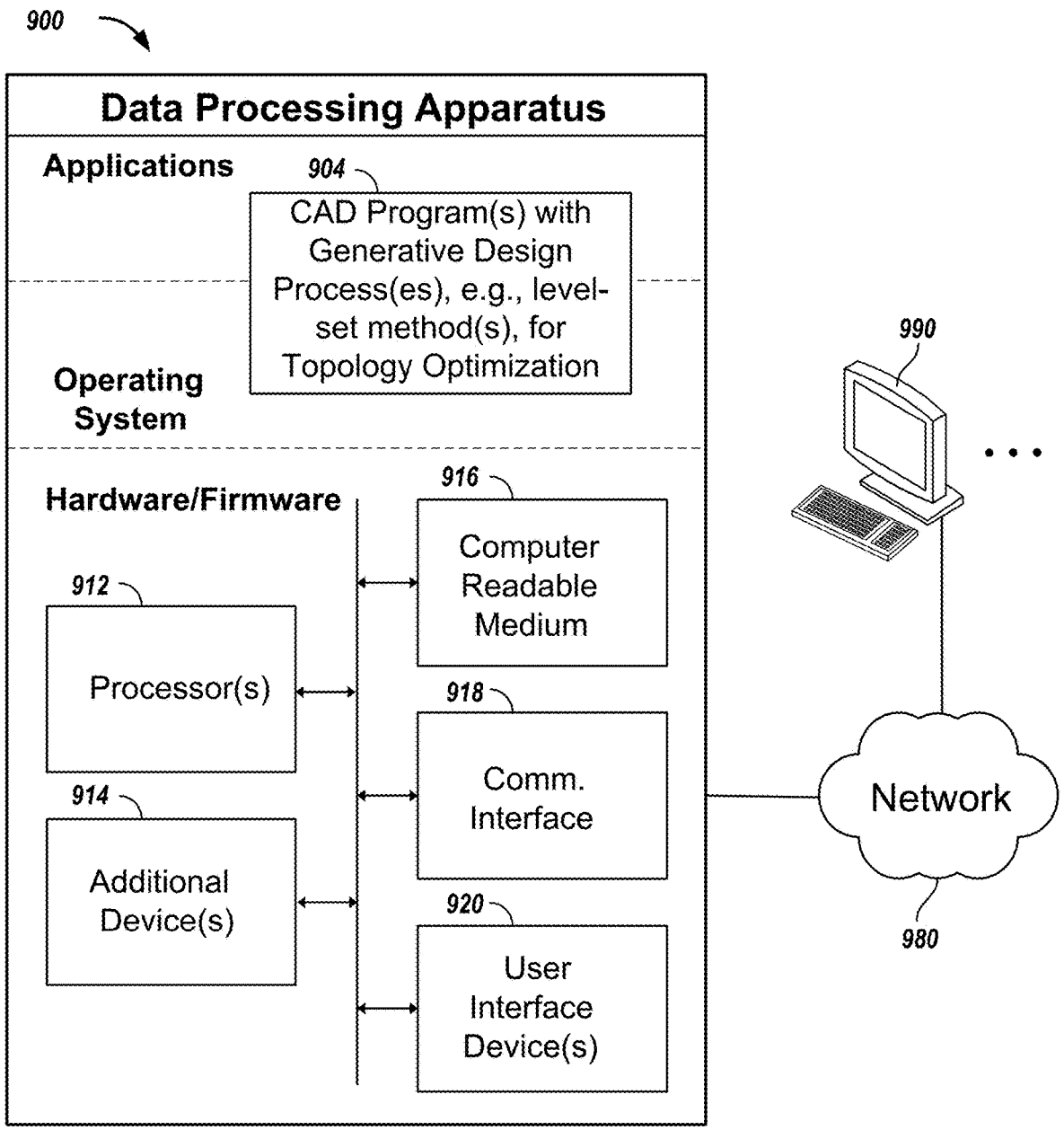
FIG. 9 shows a schematic diagram of a data processing system including a data processing apparatus, which can be programmed as a client or as a server.

FIG. 9 is a schematic diagram of a data processing system including a data processing apparatus 900, which can be programmed as a client or as a server. The data processing apparatus 900 is connected with one or more computers 990 through a network 980. While only one computer is shown in FIG. 9 as the data processing apparatus 900, multiple computers can be used. The data processing apparatus 900 includes various software modules, which can be distributed between an applications layer and an operating system. These can include executable and/or interpretable software programs or libraries, including tools and services of one or more 3D modeling programs 904 that implement the systems and techniques described above. Thus, the 3D modeling program(s) 904 can be CAD program(s) 904 and can implement one or more generative design processes (e.g., using level-set based method(s) for generative design) for topology optimization and numerical simulation operations (finite element analysis (FEA) or other). Further, the program(s) 904 can potentially implement manufacturing control operations (e.g., generating and/or applying toolpath specifications to effect manufacturing of designed objects). The number of software modules used can vary from one implementation to another. Moreover, the software modules can be distributed on one or more data processing apparatus connected by one or more computer networks or other suitable communication networks.

The data processing apparatus 900 also includes hardware or firmware devices including one or more processors 912, one or more additional devices 914, a computer readable medium 916, a communication interface 918, and one or more user interface devices 920. Each processor 912 is capable of processing instructions for execution within the data processing apparatus 900. In some implementations, the processor 912 is a single or multi-threaded processor. Each processor 912 is capable of processing instructions stored on the computer readable medium 916 or on a storage device such as one of the additional devices 914. The data processing apparatus 900 uses the communication interface 919 to communicate with one or more computers 990, for example, over the network 980. Examples of user interface devices 920 include a display, a camera, a speaker, a microphone, a tactile feedback device, a keyboard, a mouse, and VR and/or AR equipment. The data processing apparatus 900 can store instructions that implement operations associated with the program(s) described above, for example, on the computer readable medium 916 or one or more additional devices 914, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A method comprising:
    obtaining, by a computer program, one or more load cases and one or more design criteria for a modeled object;
    iteratively modifying, by the computer program, a three dimensional shape of the modeled object in accordance with the one or more design criteria and the one or more load cases, wherein the iteratively modifying comprises regulating shape change velocities for an implicit surface representation of the three dimensional shape that exceed a reference velocity, wherein the reference velocity is set based on a mean and a standard deviation of a shape derivative on the implicit surface; and
    providing, by the computer program, the three dimensional shape of the modeled object for use in manufacturing a physical structure corresponding to the modeled object using one or more computer-controlled manufacturing systems.

2. The method of claim 1, wherein regulating the shape change velocities comprises changing the shape change velocities in accordance with a polynomial function.

3. The method of claim 2, comprising generating the polynomial function by fitting a cubic polynomial to velocity values above the reference velocity.

4. The method of claim 1, wherein the iteratively modifying comprises slowing shape changes for a next iteration of the iteratively modifying in response to an excessive change having been made and undone in a current iteration of the iteratively modifying.

5. The method of claim 4, comprising detecting the excessive change based on a predefined limit on an amount of change allowed for the one or more design criteria in a single iteration of the iteratively modifying.

6. The method of claim 4, wherein slowing the shape changes for the next iteration comprises reducing a target volume change for the three dimensional shape of the modeled object for the next iteration of the iteratively modifying.

7. The method of claim 1, wherein the iteratively modifying comprises:
identifying elements that are partially but not entirely within the implicit surface; and
removing any of the identified elements that are not connected to any nodes of a current version of the three dimensional shape with Dirichlet boundary conditions.

8. The method of claim 1, wherein the iteratively modifying comprises:
identifying elements that are partially but not entirely within the implicit surface;
setting densities of the identified elements equal to respective fractional amounts of each identified element that falls within the implicit surface; and
penalizing stiffness of the identified elements according to the densities during numerical simulation.

9. The method of claim 1, wherein the iteratively modifying comprises computing shape change velocities using an amount determined from a shape derivative formula that approximates a shape derivative for multiple locations on or in the modeled object.

10. The method of claim 9, wherein the shape derivative formula comprises a volume fraction or a stress based inequality constraint that is modified using an importance factor, which is adjusted based on whether or not one or more other constraints were violated in a prior iteration of the iteratively modifying.

11. The method of claim 10, wherein the iteratively modifying comprises:
adjusting a target value of the inequality constraint between an initial target value and a final target value across multiple iterations of the iteratively modifying; and
using a proportional-integral-derivative controller to stabilize changes made in the amount determined from the shape derivative formula as the target value is adjusted across the multiple iterations.

12. The method of claim 10, wherein the iteratively modifying comprises using a proportional-integral-derivative controller to adjust a total contribution of the amount determined from the shape derivative formula to shape change velocities used during the iteratively modifying.

13. A system comprising:
a first computer communicatively coupled with a network, the first computer comprising a first non-transitory storage medium having instructions of a computer program stored thereon; and
a second computer communicatively coupled with the network, the second computer comprising a second non-transitory storage medium having instructions of the computer program stored thereon;
wherein the instructions of the computer program are configured to cause the first and second computers to operate cooperatively to
obtain one or more load cases and one or more design criteria for a modeled object,
iteratively modify a three dimensional shape of the modeled object in accordance with the one or more design criteria and the one or more load cases, wherein the iterative modification comprises regulating shape change velocities for an implicit surface representation of the three dimensional shape that exceed a reference velocity, wherein the reference velocity is set based on a mean and a standard deviation of a shape derivative on the implicit surface, and
provide the three dimensional shape of the modeled object for use in manufacturing a physical structure corresponding to the modeled object using one or more computer-controlled additive manufacturing systems.

14. The system of claim 13, wherein regulating the shape change velocities comprises changing the shape change velocities in accordance with a polynomial function.

15. The system of claim 14, wherein the instructions of the computer program are configured to cause the first and second computers to operate cooperatively to generate the polynomial function by fitting a cubic polynomial to velocity values above the reference velocity.

16. The system of claim 13, wherein the iterative modification comprises slowing shape changes for a next iteration of the iterative modification in response to an excessive change having been made and undone in a current iteration of the iterative modification.

17. The system of claim 16, wherein the instructions of the computer program are configured to cause the first and second computers to operate cooperatively to detect the excessive change based on a predefined limit on an amount of change allowed for the one or more design criteria in a single iteration of the iterative modification.

18. The system of claim 16, wherein slowing the shape changes for the next iteration comprises reducing a target volume change for the three dimensional shape of the modeled object for the next iteration of the iterative modification.

19. The system of claim 13, wherein the iterative modification comprises:
identifying elements that are partially but not entirely within the implicit surface; and
removing any of the identified elements that are not connected to any nodes of a current version of the three dimensional shape with Dirichlet boundary conditions.

20. The system of claim 13, wherein the iterative modification comprises:
identifying elements that are partially but not entirely within the implicit surface;
setting densities of the identified elements equal to respective fractional amounts of each identified element that falls within the implicit surface; and
penalizing stiffness of the identified elements according to the densities during numerical simulation.

21. The system of claim 13, wherein the iterative modification comprises computing shape change velocities using an amount determined from a shape derivative formula that approximates a shape derivative for multiple locations on or in the modeled object.

22. The system of claim 21, wherein the shape derivative formula comprises a volume fraction or a stress based inequality constraint that is modified using an importance factor, which is adjusted based on whether or not one or more other constraints were violated in a prior iteration of the iteratively modifying.

23. The system of claim 22, wherein the iterative modification comprises:
adjusting a target value of the inequality constraint between an initial target value and a final target value across multiple iterations of the iteratively modification; and
using a proportional-integral-derivative controller to stabilize changes made in the amount determined from the shape derivative formula as the target value is adjusted across the multiple iterations.

24. The system of claim 23, wherein the iterative modification comprises using a proportional-integral-derivative controller to adjust a total contribution of the amount determined from the shape derivative formula to shape change velocities used during the iteratively modification.

25. A non-transitory computer-readable medium encoding a computer aided design program operable to cause one or more data processing apparatus to perform operations comprising:
obtaining one or more load cases and one or more design criteria for a modeled object;
iteratively modifying a three dimensional shape of the modeled object in accordance with the one or more design criteria and the one or more load cases, wherein the iteratively modifying comprises regulating shape change velocities for an implicit surface representation of the three dimensional shape that exceed a reference velocity, wherein the reference velocity is set based on a mean and a standard deviation of a shape derivative on the implicit surface; and
providing the three dimensional shape of the modeled object for use in manufacturing a physical structure corresponding to the modeled object using one or more computer-controlled manufacturing systems.

26. The non-transitory computer-readable medium of claim 25, wherein regulating the shape change velocities comprises changing the shape change velocities in accordance with a polynomial function.

27. The non-transitory computer-readable medium of claim 26, the operations comprising generating the polynomial function by fitting a cubic polynomial to velocity values above the reference velocity.

28. The non-transitory computer-readable medium of claim 25, wherein the iteratively modifying comprises slowing shape changes for a next iteration of the iteratively modifying in response to an excessive change having been made and undone in a current iteration of the iteratively modifying.

29. The non-transitory computer-readable medium of claim 28, the operations comprising detecting the excessive change based on a predefined limit on an amount of change allowed for the one or more design criteria in a single iteration of the iteratively modifying.

30. The non-transitory computer-readable medium of claim 28, wherein slowing the shape changes for the next iteration comprises reducing a target volume change for the three dimensional shape of the modeled object for the next iteration of the iteratively modifying.

31. The non-transitory computer-readable medium of claim 25, wherein the iteratively modifying comprises:
identifying elements that are partially but not entirely within the implicit surface; and
removing any of the identified elements that are not connected to any nodes of a current version of the three dimensional shape with Dirichlet boundary conditions.

32. The non-transitory computer-readable medium of claim 25, wherein the iteratively modifying comprises:
identifying elements that are partially but not entirely within the implicit surface;
setting densities of the identified elements equal to respective fractional amounts of each identified element that falls within the implicit surface; and
penalizing stiffness of the identified elements according to the densities during numerical simulation.

33. The non-transitory computer-readable medium of claim 25, wherein the iteratively modifying comprises computing shape change velocities using an amount determined from a shape derivative formula that approximates a shape derivative for multiple locations on or in the modeled object.

34. The non-transitory computer-readable medium of claim 33, wherein the shape derivative formula comprises a volume fraction or a stress based inequality constraint that is modified using an importance factor, which is adjusted based on whether or not one or more other constraints were violated in a prior iteration of the iteratively modifying.

35. The non-transitory computer-readable medium of claim 34, wherein the iteratively modifying comprises:
adjusting a target value of the inequality constraint between an initial target value and a final target value across multiple iterations of the iteratively modifying; and
using a proportional-integral-derivative controller to stabilize changes made in the amount determined from the shape derivative formula as the target value is adjusted across the multiple iterations.

36. The non-transitory computer-readable medium of claim 34, wherein the iteratively modifying comprises using a proportional-integral-derivative controller to adjust a total contribution of the amount determined from the shape derivative formula to shape change velocities used during the iteratively modifying.

* * * * *